United States Patent
Chen et al.

(10) Patent No.: US 7,440,753 B2
(45) Date of Patent: Oct. 21, 2008

(54) COMMUNICATION NETWORK SWITCHING SYSTEM AND METHOD THEREOF

(75) Inventors: Albert Chen, Hsinchu County (TW); Keh-Lih Chiang, No. 139 Talung Street, 2nd Floor-2, Taipei City (TW)

(73) Assignees: Integrated System Solution Corp., Hsinchu (TW); Keh-Lih Chiang, Taipei (TW)

( * ) Notice: Subject to any disclaimer, the term of this patent is extended or adjusted under 35 U.S.C. 154(b) by 608 days.

(21) Appl. No.: 11/024,800

(22) Filed: Dec. 30, 2004

(65) Prior Publication Data

US 2005/0181785 A1 Aug. 18, 2005

(30) Foreign Application Priority Data

| Jan. 2, 2004 | (TW) | ................... | 93200060 U |
| Feb. 27, 2004 | (TW) | ................... | 93105124 A |
| Mar. 4, 2004 | (TW) | ................... | 93105769 A |
| Dec. 22, 2004 | (TW) | ................... | 93140091 A |

(51) Int. Cl.
 *H04Q 7/20* (2006.01)
 *H04M 1/00* (2006.01)
 *H04B 7/00* (2006.01)

(52) U.S. Cl. .............. 455/426.1; 455/426.2; 455/428; 455/436; 455/552.1; 455/41.2

(58) Field of Classification Search ............. 455/426.1, 455/426.2, 428, 436, 552.1, 41.2
See application file for complete search history.

(56) References Cited

U.S. PATENT DOCUMENTS

2003/0139180 A1* 7/2003 McIntosh et al. ............ 455/426
2005/0036476 A1* 2/2005 Eaton et al. ................. 370/349

* cited by examiner

*Primary Examiner*—Barry W Taylor
(74) *Attorney, Agent, or Firm*—Bacon & Thomas, PLLC

(57) ABSTRACT

A communication network switch system, comprising: a first phone number database accessed by a cable telephony network service provider; a second phone number database accessed by an internet service provider; a plurality of communication network switch devices conducting audio and/or data communications therebetween through a cable telephony network or an internet, the communication network switch devices switching audio and/or data communications between the cable telephony network or an internet telephony system and a short-range wireless communication network; and a plurality of mobile communication devices each of which including a long-range wireless network system transceiver module, a short-range wireless network system transceiver module and a switch device module. The communication network switch device includes a short-range wireless communication network transceiver module, a cable telephony network transceiver module, an internet telephony system drive module, a first switch module and a second switch module. The first switch module of the communication network switch device stores a communication number of a long-range wireless communication network of the mobile communication device and an assigned phone number of the switch device module in the cable telephony network in the first phone number database. The second switch module of the communication network switch device stores a communication number of a long-range wireless communication network of the mobile communication device and an IP address of the second switch module in the second phone number database.

20 Claims, 44 Drawing Sheets

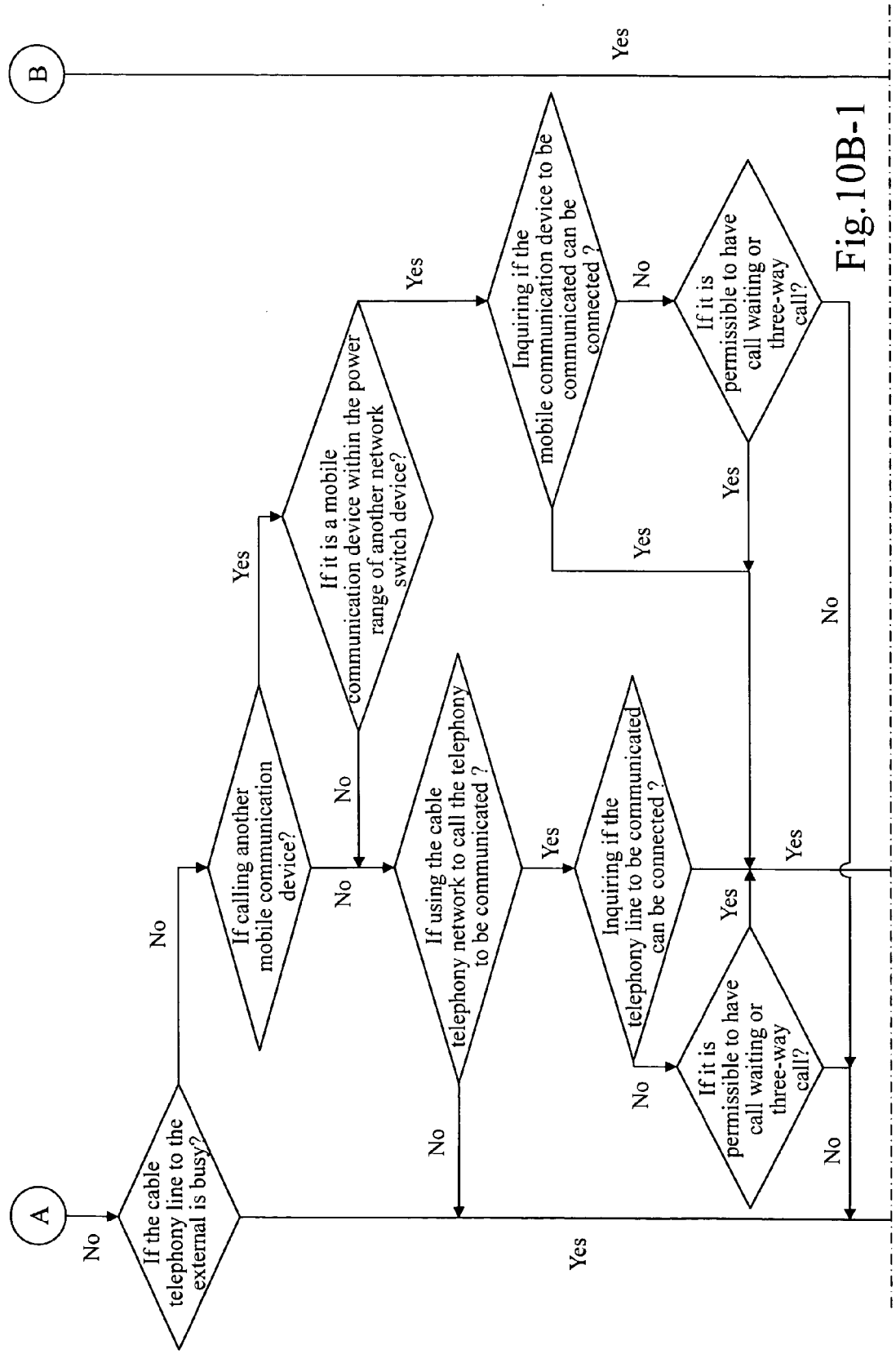

COMMUNICATION NETWORK SWITCHING SYSTEM AND METHOD THEREOF

BACKGROUND OF THE INVENTION

1. Field of the Invention

The present invention relates to a communication network switch device between communication systems, which coordinates with a cable telephony network and an internet to transmit audio and data information. More specifically, the present invention integrates a multitude of short-range wireless network systems (for example Bluetooth wireless network system and 802.11 wireless local area network system, etc.), a cable telephony network and an internet telephony system for communication between two different mobile communication devices which are within power ranges of their own communication network switch devices, and instead of use of a long-range wireless communication system for communication between a mobile communication device and a cable telephony and an internet telephony such that a cable telephony network system and an internet telephony system can be sufficiently employed for communication.

2. Description of the Related Art

In accordance with H.323 and SIP communication protocols, audio and data information can be real-time transmitted in an internet to form an internet telephony system. When terminals of two mobile communication devices communicate with each other, in accordance with existing techniques, requiring a long-range wireless network system (for example GSM, CDMA, 3G systems, etc.) as their communication route. However, the short-range wireless network system, cable telephony network and the internet telephony system are widely used at the present time. Using the communication network switch device as a communication channel, and associating with the above systems, it is possible to create a new communication route between the terminals of two mobile communication devices when communicating with each other.

SUMMARY OF THE INVENTION

In accordance with the current long-range wireless network system, the mobile communication device and internet telephony can not directly communicate with each other. The communication of the mobile communication device and the cable telephony requires the long-range wireless network system and cable telephony network system as communication channels. The communication of two mobile communication devices requires the long-range wireless network system as the communication channel. In comparison with the cable telephony network system and internet telephony system, the charged fee of the long-range wireless network system is more expensive. The present invention provides an implement conditionally instead of the use of the long-range wireless network system to eliminate the frequency of the use of the long-range wireless network system, and reducing the charged fee of the user. The signal flow of the mobile communication devices passing through base stations can be shared due to elimination of the frequency of using the long-range wireless network system. The mobile communication device also can directly communicate with the internet telephony. The present invention would have industry utilization and inventive step.

The primary object of the present invention is to provide a universally architecture communication equipment conditionally instead of the long-range wireless network system to save the user's charged fee and eliminate the frequency of using the long-range wireless network system so as to share the signal flow of the mobile communication devices passing through the base stations and enable direct communication between the mobile communication device and the internet telephony.

Due to a. the charged fee of the mobile communication device in the long-range wireless network system is more expensive and under the principle of sharing the signal flow of the mobile communication devices passing through the base stations; b. the mobile communication device and the internet telephony are unable to conduct direct communication with each other, the present invention employs the cable telephony network system or internet telephony system using H.323 and SIP communication protocols carrying with a multitude of short-range wireless network systems to become upper layer application. As such, the short-range wireless network system can real-time transmit audio and data information. And, through a specific message or routing protocol, making a telephony switch of the cable telephony network system have a communication number of the long-range wireless network system and a telephony number of the communication network switch device and a gatekeeper have the communication number of the long-range wireless network system and an IP address of the communication network switch device. Two following methods can replace the use of the long-range wireless network system for communication between two mobile communication devices. That is, 1. serially connecting the short-range wireless network system, cable telephony system and the communication network switch device; and 2. serially connecting the short-range wireless network system, the internet telephony system and the communication network switch device. As a consequence, two mobile communication devices can communicate with each other through 1. the short-range wireless network system, communication network switch device and the cable telephony system, or 2. the short-range wireless network system, communication network switch device and the internet telephony system; while without through the long-range wireless network system. The problem that the mobile communication device and the internet telephony are unable to conduct direct communication with each other can be resolved.

BRIEF DESCRIPTION OF THE DRAWINGS

These and other features, aspects and advantages of the present invention will be better understood with regard to the following description, appended claims and accompanying drawings that are provided only for further elaboration without limiting or restricting the present invention, where:

DETAILED DESCRIPTION OF THE PREFERRED EMBODIMENTS

Although the present invention will be described in details with the attached figures from the preferred embodiments according to the present invention, the skilled artisan in the art should realize that they can modify the invention described in the application, and achieve the same effect as the present invention. Thus, it should be noted that the following description is only a broad disclosure to the skilled artisan in the art, and the contents should not be construed as the limitation to the present invention.

Figure 1:
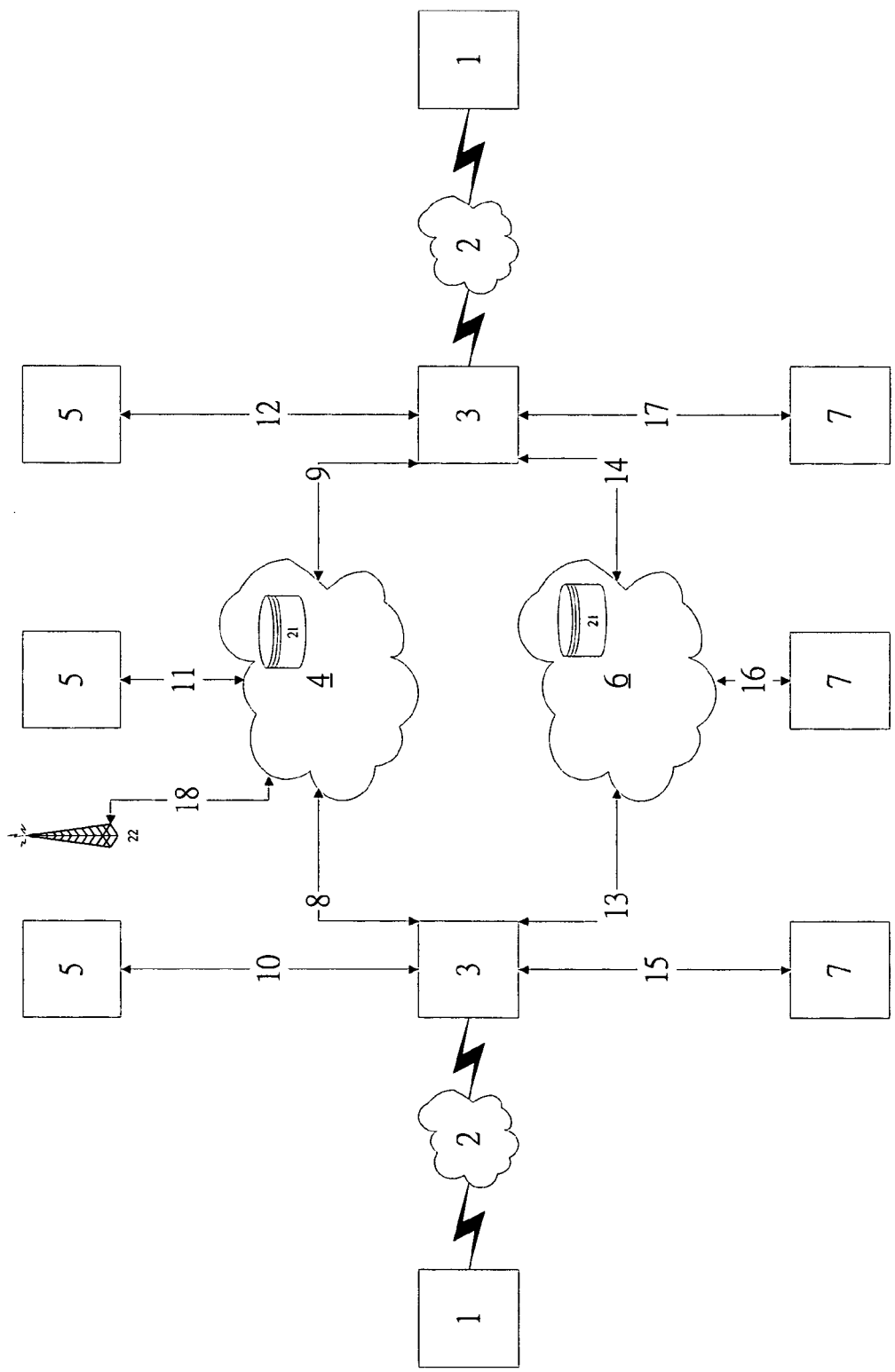
FIG. 1 is a schematic architecture of a system network with communication network switch devices and mobile communication devices as primary parties.

Firstly, referring to FIG. 1, which shows a schematic system architecture using mobile communication devices 1 and communication network switch devices 3 as primary parties. The communication network switches 3 having telephone numbers connect with cable telephony 5 respectively through line 10 and line 12, and the communication network switch devices 3 connect with a cable telephony network 4 respectively through line 8 and line 9. The communication network switch devices 3 having individual IP addresses connect with internet telephony 7 respectively through line 15 and line 17. The communication network switch devices 3 having individual IP addresses connect with an internet 6 through line 13 and line 14. The internet telephony 7 having an individual IP address connects with the internet 6 through line 16. The mobile communication device 1 can establish wireless link with the communication network switch device 3 through a short-range wireless network system 2. Besides, the cable telephony network 4 connects with a long-range wireless network system base station 2 through line 18. The cable telephony network 4 and internet 6 have their own phone number database 21 as a reference for establishing routes. The communication route is as follows:

A. There are three kinds of communication routes between the mobile communication devices 1, which are a. when the mobile communication devices 1 are not present within the power range of the communication network switch devices 3, they communicate with each other through the long-range wireless network system by the conventional technique; b. the mobile communication device 1 reaches the communication network switch device 3 through the short-range wireless network 2, and reaches the cable telephony network 4 through line 8. The telephony switch of the cable telephony network 4 searches its phone number database 21 to determine the communication route, then switched by several telephony switches and through line 9 reaching the communication network switch device 3 at the other end, and through the short-range wireless network 2 of this other end to reach the mobile communication device 1 of the party to conduct communication; c. the mobile communication device 1 reaches the communication network switch device 3 through the short-range wireless network 2, and then through line 13 to reach the internet 6. The gatekeeper of the internet 6 searches the phone number database 21 to determine the communication route, then switched by several routers and through line 14 reaching the communication network switch device 3 at the other end, and through the short-range wireless network 2 of this other end to reach the mobile communication device 1 of the party to conduct communication.

B. There are four kinds of communication routes between the mobile communication device 1 and the cable telephony 5, which are a. when the cable telephony 5 to be communicated belongs to an internal cable telephony 5 of the communication network switch device 3, the mobile communication device 1 reaches the communication network switch device 3 through the long-range wireless network 2, and then reaching the internal cable telephony 5 of the communication network switch device 3 through line 10 to conduct communication; b. when the cable telephony 5 to be communicated is a general cable telephony 5 connected to the cable telephony network 4, the mobile communication device 1 reaches the communication network switch device 3 through the short-range wireless network 2, and reaching the cable telephony network 4 through line 8. The telephony switch of the cable telephone network 4 searches its phone number database 21 to determine the communication route, then switched by several telephony switches and reaching the general cable telephone 5 through line 11 to conduct communication; c. when the cable telephony 5 is a cable telephony 5 connected to another communication network switch device 3, the mobile communication device 1 reaches the communication network switch device 3 through the short-range wireless network 2, and reaching the cable telephony network 4 through line 8. The telephony switch of the cable telephony network 4 searches its phone number database 21 to determine the communication route, then switched by several telephony switches and reaching the communication network switch device 3 at the other end through line 9, and reaching the cable telephony 5 through line 12 to conduct communication. As a result, the communication between the mobile communication devices 1 or the communication between the mobile communication device 1 and the cable telephony 5 can be realized through the communication network switch device 3 and the cable telephony network 4, while not be confined by the conventional technique that requires the long-range wireless network to conduct communication. The communication process herein belongs to a circuit switch mode, and can be used for transmission of audio and data information. The communication process hereinafter, without being particularly emphasized, is regarded as a communication method capable of transmitting audio and data information; d. when the cable telephony 5 to be communicated is connected to the communication network switch device 3 at the other end, the mobile communication device 1 reaches the communication network switch device 3 through the short-range wireless network 2, and reaching the internet 6 through line 13. The gatekeeper of the internet 6 searches the phone number database 21 to determine the communication route, then switched by several routers and reaching the communication network switch device 3 through line 14, and reaching the cable telephony 5 through line 12 to conduct communication.

C. There are three kinds of communication between the mobile communication device 1 and the internet telephony 7, which are a. when the internet telephony 7 belongs to an internal internet telephony 7 of the communication network switch device 3, the mobile communication device 1 reaches the communication network switch device 3 through the short-range wireless network 2, and then reaching the internal internet telephony 7 of the communication network switch device 3 to conduct communication; b. when the internet telephony 7 to be communicated is a general internet telephony 7 connected to the internet 6, the mobile communication device 1 reaches the communication network switch device 3 through the short-range wireless network 2, and reaching the internet 6 through line 13. The gatekeeper of the internet 6 searches the phone number database 21 to determine the communication route, then switched by several routers and reaching the general internet telephony 7 through line 16 to conduct communication; c. when the internet telephony 7 to be communicated connected to the communication network switch device 3 at the other end, the mobile communication device 1 reaches the communication network switch device 3 through the short-range wireless network 2, and reaching the internet 6 through line 13. The gatekeeper of the internet 6 searches the phone number database 21 to determine the communication route, then switched by several routers and reaching the communication network switch device 3 at the other end through line 14, and reaching the internet telephony 7 through line 17 to conduct communication. As a consequence, the communication of the mobile communication devices 1 or the communication between the mobile communication device 1 and the internet telephony 7 can be realized through the communication network switch device 3 and the internet 6, while is not confined to the conventional technique that requires the long-range wireless network and that the mobile communication device and internet telephony are unable to conduct direct communication. Besides, during the internet communication process, in accordance with H.323 and SIP communication protocols etc., employing a packet switch mode to separate audio and data information into different packets for transmission. Therefore, the communication process hereinafter, without being particularly emphasized, is regarded as a communication method capable of transmitting audio and data information.

For the reason that the connection between the mobile communication device 1 and the communication network switch device 3 is through the short-range wireless network 2, therefore it depends on the communication protocol of the short-range wireless network 2. In general, n mobile communication devices 1 can connect with one communication network switch device 3 in the short-range wireless network 2 to constitute a micro-network in which a multitude of mobile communication devices 1 correspond to one communication network switch device 3. In the aspect of the cable telephony network, a multitude of communication network switch devices 3 can connect with one same cable telephony network 4 or different cable telephony networks 4 through different lines 8 or lines 9 to constitute a multitude of micro-networks with the communication network switch devices 3 as primary parties. These micro-networks can be overlapped or dispersed in a larger space such that the mobile communication device 1 can become one member of different micro-networks. As such, the mobile communication device 1 can select different communication network switch devices 3 for external communication, while being not confined to a single communication network switch device. In the event that the communication network switch devices 3 are dispersed in a larger space and are not overlapped, the mobile communication device 1 also can enter/leave different micro-networks by movement to switch to different communication network switch devices 3 for external communication. The cable telephony network 4 has to be provided with a. the phone number database, b. the function for transmitting message or a certain specific communication protocol, c. a system for counting time and fee, whose purposes are as follows:

When the mobile communication device 1 enters the power range of the communication network switch device 3, the communication network switch device 3 has to transmit message through line 8 or use a certain specific communication protocol so that the phone number database of the cable telephony network 4 has information of the mobile communication device 1. When an external cable telephony 5 calls the mobile communication device 1, reaching the cable telephony network 4 through line 11 and then switching to line 8 to reach the communication network switch device 3 in accordance with the information of the phone number database 21, and then reaching the mobile communication device 1 through the short-range wireless network 2. The system for counting time and fee is used for recording the charged fee of the mobile communication device 1 using the cable telephony network 4 through the communication network switch device 3.

In the aspect of internet telephony, a communication network switch device 3 can coordinate with a multitude of the mobile communication devices 3, or a multitude of communication network switch devices 3 using different IP addresses through line 13 or line 14 connect with the internet 6 to constitute a multitude of micro-networks using the communication networks switch devices 3 as primary parties. These micro-networks can be overlapped or dispersed in a larger space such that the mobile communication device 1 can become one member of different micro-networks. As a consequence, the mobile communication device 1 can select different IP addresses to conduct external communication through the communication network switch device 3, while being not limited to a single communication channel. In the event that the communication network switch devices 3 are dispersed in a larger space and not be overlapped, the mobile communication device 1 can enter/leave different micro-networks to switch different communication network switch devices 3 for external communication. The gatekeeper of the internet 6 requires a specific routing protocol such that the packet carrying with information of the mobile communication device 1 can exactly reach to the assigned communication network switch device 3 through a proper router, and then reaching the mobile communication device 1 to be communicated or reaching the assigned internet telephony 7.

Besides, a multitude of short-range wireless networks 2 can simultaneously present in the short-range wireless network 2 in order that different short-range wireless networks present in the communication route between the mobile communication device 1 and the communication network switch device 3. As a consequence, it is possible to insert another call or conduct three-way calls between the mobile communication device 1, the cable telephony 5 and the internet telephony 7.

Figure 2:
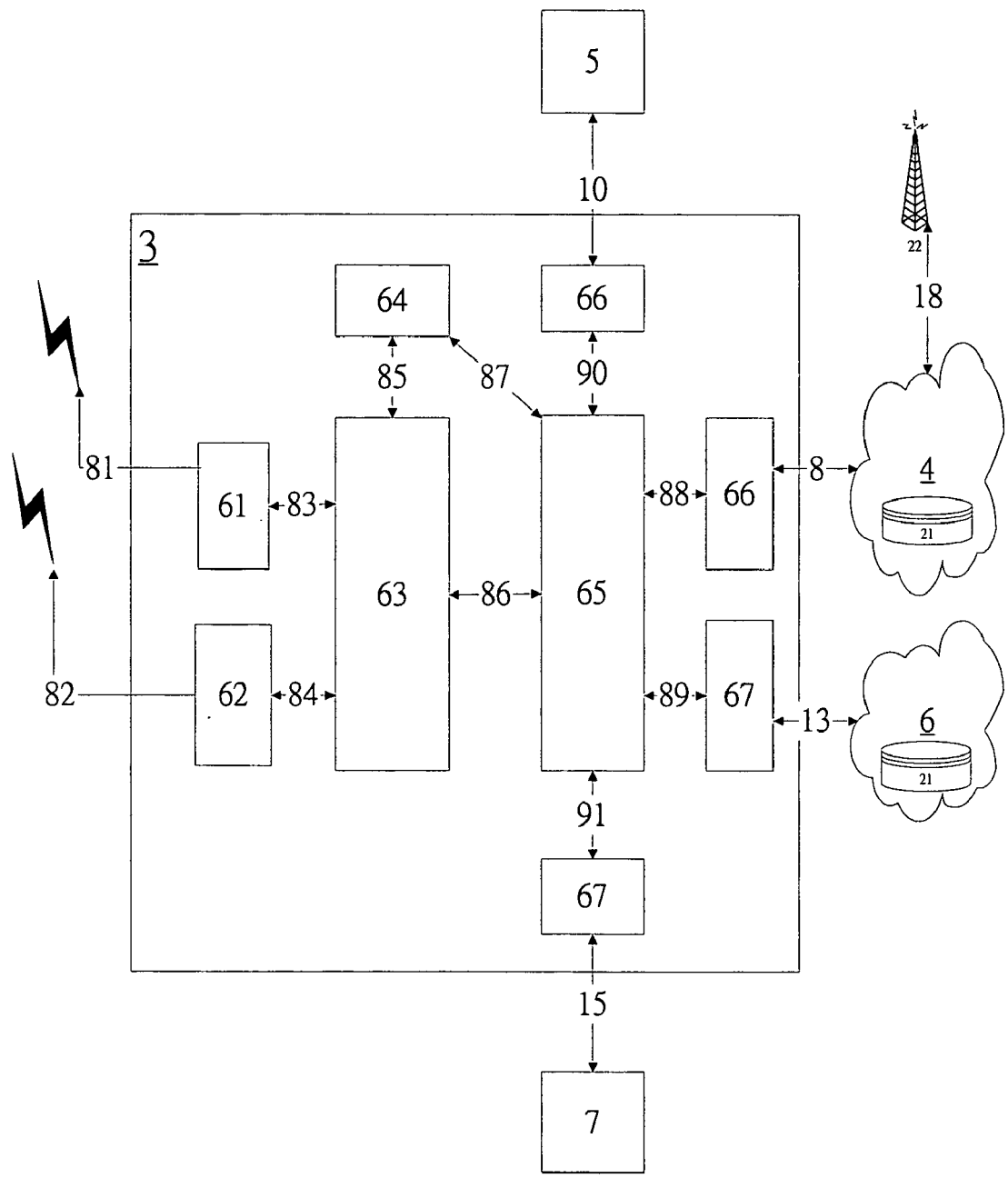
FIG. 2 is a schematic block diagram of the communication network switch device of FIG. 1, which uses mobile communication devices, internal cable telephony and internet telephony communicate with the external cable telephony and internet telephony.

Please refer to FIG. 2, which is a schematic block diagram of the communication network switch device 3 of FIG. 1. A cable telephony system drive module 66 connects with the cable telephony network 4 through line 8, and an internet telephony system drive module 67 connects with the internet 6 through line 13. The cable telephony system drive module 66 connects with the internal cable telephony 5 through line 10, and the internet telephony system drive module 67 connects with the internal internet telephony 7 through line 15. The switch module 65 connects with the cable telephony system drive module 66 through line 90, and connects with the internet telephony system drive module 67 through line 91. The communication network switch device 3 also comprises a data format transform module 63, a routing table database module 64, a short-range wireless network system transceiver module 61, a short-range wireless network system transceiver module 62, an antenna 81 of the short-range wireless network system 1 and an antenna 82 of the short-range wireless network system2. The communication network switch device 3 is characterized in that the mobile communication device 1 communicates with the internal cable telephony 5 of the communication network switch device 3 or an external cable telephony 5, or communicates with the internal mobile communication device 1 and the cable telephony 5 of the communication network switch device 3 at the other end, through the short-range wireless network system and the communication network switch device 3. Furthermore, the mobile communication device 1 communicates with the internal internet telephony 7 of the communication network switch device 3, the external internet telephony 7, or communicates with the internal mobile communication device 1 and the internet telephony 7 of the communication network switch device 3 at the other end, through the short-range wireless network system 2 and the communication network switch device 3. Each of the module blocks would be described in detail as follows.

Module Block 61: The Transceiver Module of the Short-Range Wireless Network System The short-range wireless network system 1 with its own communication protocol receives radiowave through the antenna 81 of the short-range wireless network system 1, and transforms the radiowave into proper data through the module block 61 in accordance with its own communication protocol, and sends to the module block 63 through line 83. The module block 63 sends data to the module block 61 through line 83, and the module block 61 transforms the data to electric waves in accordance with its own communication protocol and through the antenna 81 of the short-range wireless network system 1 transmits the electric waves outwardly.

Module Block 62: The Transceiver Module of the Short-Range Wireless Network System 2

The short-range wireless network system 2 with its own communication protocol receives radiowaves through the antenna 82 of the short-range wireless network system 2, and transforms the radiowaves to proper data through the module block 62 in accordance with its own communication protocol, and then sends to the module block 63 through line 84. The module block 63 sends data to the module block 62 through line 84, and the module block 62 transforms the data to electric waves in accordance with its own communication protocol, and through the short-range wireless network system 2 transmits the electric waves outwardly.

Module Block 63: The Data Format Transform Module

The module block 61 transmits the data of the short-range wireless network system 1 to the module block 62 through line 84, and the module block 62 transmits the data of the short-range wireless network system 2 to the module block 63 through line 84. The module block 63 accesses the route-related data from the module block 64 through line 85 utilizing the communication protocol procedure of the short-range wireless network system, and then in accordance with an instruction of the module block 65 transforming the data format to a required data format of the module block 65, and sends to the module block 65 through line 86. The module block 65 sends the data of the cable telephony or the internet telephony system to the module block 63 through line 86, and the module block 63 accesses the routing table database of the module block 64 through line 85 in accordance with an instruction of the module block 65 to obtain a destination communication address or IP address, and then using the data format transform method to transform the data of the cable telephony system or the internet telephony system to the data of the short-range wireless network systems 1 or 2, then through line 83 or line 84 sends to the module blocks 61 or 62.

Module Block 64: The Routing Table Database Module

The routing table database module accepts the access of the module block 63 through line 85. Its one set of record units includes four elements, i.e. a communication address of the mobile communication device in the short-range wireless network system 1, a communication address of the mobile communication device in the short-range wireless network system 2, an IP address of the mobile communication device and the phone number of the mobile communication device in the long-range network system. The module block 63 can obtain the communication addresses of the short-range wireless network systems 1 and 2 and the IP address corresponding to the phone number of the mobile communication device in the long-range wireless network system through the module block 64 so as to facilitate the communication of the communication network switch device 3 and the mobile communication device 1. The module block 65 also can access the routing table database module through line 87.

The Module Block 65: The Switch Module

The module block 65 receives the data from the module block 66 through line 88 or from the module block 67 through line 89, and determining if coming from the cable telephony, the internet telephony or the phone number of the long-range wireless network system. If it is the cable telephony, switching to the module block 66 through line 90, and reaching the cable telephony. If it is the internet telephony, switching to the module block 67 through line 91, and reaching the internal internet telephony 7, or switching to the module block 63 through line 86, and informing the module block 63 to tell the assigned route and related information. To the contrary, when the module block 63 sends data to the module block 65 through line 86, the module block 65 would determine if it comes from the internal cable telephony 5 of the communication network switch device 3. If it is, switching to the module block 66 through line 90, and reaching the cable telephony 5. If it is not, determine if it comes from the internal internet telephony 7 of the communication network switch device 3. If it is, switching to the module block 67 through line 91, and reaching the internal internet telephony 7. Otherwise, determining if it conducts communication by using an external internet of the communication network switch device 3. If it is, switching to line 89 to reach the module block 67. If it is not, switching to the module block 66 through line 88. When the internal cable telephony 5 of the communication network switch device 3 sends data to the module block 65 through line 10 and the module block 66, the module block 65 determines if it comes from the internal telephony 7 of the communication network switch device 3. If it comes from the internal internet telephony 7 of the communication network switch device 3, switching to the internal internet telephony 7 through line 91 and the module block 67. If it is not, determining if it comes from the phone number of the internal long-range wireless network system of the communication network switch device 3. If it is the phone number of the internal long-range wireless network system of the communication network switch device 3, sending the data to the module block 63 through line 86, and informing the module block 63 to tell the assigned route and related information. If it is not, determining if it conducts communication by using the external internet of the communication network switch device 3. If it is, switching to the module block 67 through line 89. If it is not, switching to the module block 66 through line 88. When the internal internet telephony 7 of the communication network switch device 3 sends data to the module block 65 through line 15 and the module block 67, the module block 65 would determine if it comes from the internal cable telephony 5 of the communication network switch device 3. If it comes from the internal cable telephony 5 of the communication network switch device 3, switching to the internal cable telephony 5 through line 90 and the module block 66. If it is not, determining if it is the phone number of the internal long-range wireless network system of the communication network switch device 3. If it is, sending the data to the module block 63 through line 86, and informing the module block 63 to tell the assigned route and related information. Otherwise, determining if it conducts communication through the external internet of the communication network switch device 3. If it is, switching to the module block 67 through line 89. Otherwise, switching to the module block 66 through line 88.

Besides, when the external telephony switch of the communication network switch device 3 inquires the activity status of the internal mobile communication device of the communication network switch device 3, the module block 65 accesses the module block 64 through line 87, and responds to the inquiry command of the external telephony switch of the communication network switch device 3 and the gatekeeper. Because the module block 65 is a controller for determining the data flow direction, it can accept a control command for three-way call or call waiting to determine the data flow direction to attain the three-way call among the cable telephony 5, the internet telephony 7 and the internal mobile communication device 1 of the communication network switch device 3 or call waiting. The module telephone 65 contains the key telephone function to inquire an extension number to be called, and then switching to the proper internal cable telephony 5. The module block 65 also can realize the above functions with hardware means by using integrated circuits.

The Module Block 66: The Cable Telephony System Drive Module

Controlling the following events: A. The entering and leaving of the data flow from the cable telephony network 4 through line 8 to the module block 66, and the entering and leaving of the data flow from the cable telephony 5 through line 10 to the module block 66, and packaging the packets to the signals proper to the format of the cable telephony network 4; and B. The entering and leaving of the data flow from the module block 66 through line 88 and line 90 to the module block 65, and packaging the signal with the format of the cable telephony network 4 to a packet proper to the format of the module block 65.

The Module Block 67: The Internet Telephony System Drive Module

Controlling the following events: The entering and leaving of the data flow from the internet 6 through line 13 to the module block 67, and the entering and leaving of the data flow from the internet telephony 7 through line 15 to the module block 67, and packaging the packet to a packet proper to the format of the internet 6; and B. The entering and leaving of the data flow from the module block 67 through line 89 and line 91 to the module block 65, and packaging the packet to a packet proper to the format of the module block 65.

Figure 3:
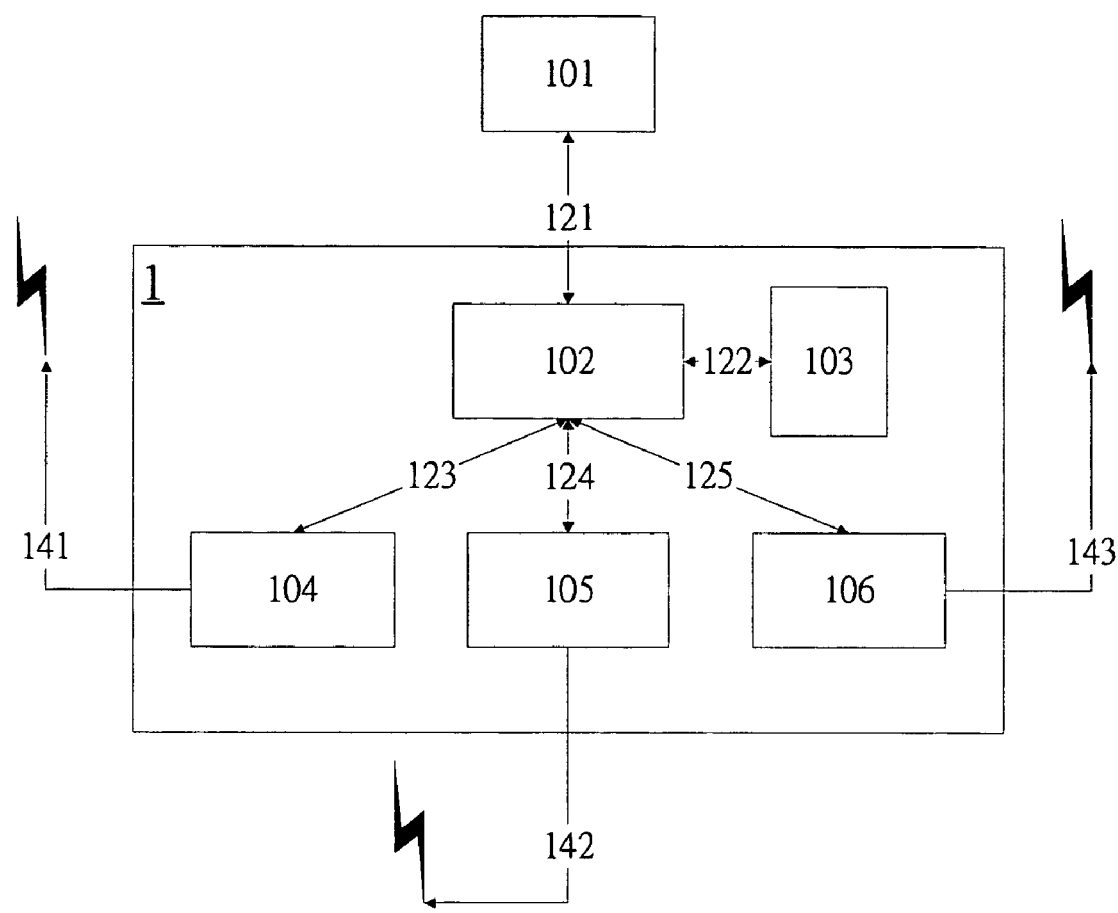
FIG. 3 is a schematic block diagram of the mobile communication device of FIG. 1, which uses the short-range wireless network systems and the cable telephony or the internet system for communication between two mobile communication devices in the power ranges of different communication network switch devices, communication between the mobile communication device and the internal cable telephony or and the internal internet telephony, and communication between the mobile communication device and the external cable telephony or and the external internet telephony.

Please refer to FIG. 3, which is a schematic module block diagram of the mobile communication device 1. In a preferred embodiment, the mobile communication device 1 comprises a human-machine interface module of the module block 101, a switch module of the module block 102, a routing table database module of the module block 103, a long-range wireless network system transceiver module of the module block 104, a transceiver module of a short-range wireless network system 1 of the module block 105, a transceiver module of a short-range wireless network system 2 of the module block 106, an antenna 142 of the short-range wireless network system 1 and an antenna 143 of the short-range wireless network system 2. The mobile communication device 1 is characterized in that the long-range wireless network system, the short-range wireless network system 1 and the short-range wireless network system 2 share the wireless system which is determined by the routing table database and used by the mobile communication device 1. Each of the module blocks would be described in detail as follows.

The Module Block 101: The Human-Machine Interface Module

In charge of input or output devices of the user, when the user performs input through the module block 101, the module block 101 transforms the input data to the format proper to the module block 102, and sending to the module block 102 through line 121. The module block 101 also accepts the data from the module block 102 through line 121, and transforming the data to the format proper to the module block 101, and showing the output data for the user.

The Module Block 102: The Switch Module

The module block 101 sends data to the module block 102 through line 121. The module block 102 accesses the module block 103 through line 122 to determine the data is switched to the module block 104 through line 123, switched to the module block 105 through line 124 or switched to the module block 106 through line 125. The module block 102 accepts the data from the module block 104 through line 123, the data from the module block 105 through line 124 and the data from the module block 106 through line 125, and then switched to the module block 101 through line 121. Besides, the module block 101 can send a control signal through line 121 to the module block 102 to determine the data flow direction, respectively A. call waiting or B. three-way call. The data flow direction is as follows:

A. When the user reaches the module block 102 through the module block 101 and line 121 and reaching the module block 104 through line 123 for communication, the module block 105 or module block 106 would send data to the module block 101, the module block 105 reaches the module block 102 through line 124, or the module block 106 reaches the module block 102 through line 125, and then the module block 102 would send the signal through line 121 to the module block 101 for requesting call waiting. In the event that the module block 101 sends a permission signal through line 121 to the module block 102, the module block 102 would pause the communication between the route 123 and the module block 104, and switching to the communication of line 124 and the module block 105 or the communication of line 125 and the module block 106, leading the module block 101 to communicate with the module block 105 or the module block 106. To the contrary, the module block 104 also can have a call waiting in the communication between the module block 101 and the module block 105 or and the module block 106 by the same way. The module block 105 and module block 106 also can have a call waiting in their respective communications by the same way. When the call waiting is over, the module block 102 would recover the original communication route such that the original communicator can end the call waiting and going on the communication.

B. The user also can use the three-way call function to let the data of the module block 101 reach the module block 102 through line 121, and then respectively switching to a. the module block 104 through line 123, b. the module block 105 through line 124, c. the module block 106 through line 125. Similarly, the data of the module block 104 can reach the module block 102 through line 123, and respectively switching to d. the module block 101 through line 121, e. the module block 105 through line 124, f. the module block 106 through line 125. The data of the module block 105 can reach the module block 102 through line 124, and respectively switching to g. the module block 101 through line 121, h. the module block 104 through line 123, i. the module block 106 through line 125. The data of the module block 106 can reach the module block 102 through line 125, and respectively switching to j. the module block 101 through line 121, k. the module block 104 through line 123, l. the module block 105 through line 124. When the data from the module block 102 reaches the module block 104 through line 123, the module block 105 through line 124 or the module block 106 through line 125, all need to transform the data to their individual data format in accordance with their own communication protocol for transmission. Similarly, when the data from the module block 102 through line 121 to the module block 101, the data also needs to transform the data format acceptable by the module block 101.

Besides, the module block 102 can realize the above functions with hardware means by using integrated circuits.

The Module Block 103: The Routing Table Database Module

Accepting for access of the module block 102 through line 122. Its one set of record units includes four elements, respectively the communication addresses of the short-range wireless network system 1 and the short-range wireless network system 2 of the communication network switch device 3, the IP address and phone number of the communication network switch device 3. The module block 102 can obtain the communication addresses of the short-range wireless network system 1 and the short-range wireless network system 2 of the communication network switch device 3 and the IP address and phone number of the communication network switch device 3 to facilitate communication between the communication network switch device 3 and the mobile communication device 1.

The Module Block 104: The Long-Range Wireless Network Transceiver Module

In accordance with the communication protocol procedure of the long-range wireless network system, the received electric waves are transformed to data, or the data is transformed to the electric waves for propagating toward the air. The data route is as follows: The electric waves in the air are transmitted to the module block 104 through the antenna 141 of the long-range wireless network system, the module block 104 transforms the electric waves to the data proper to the format of the module block 102, and then sending to the module block 102 through line 123. The module block 102 transforms the data to a data proper to the format of the module block 104, and sending to the block module 104 through line 123, the module block 104 further transforms the data to the electric waves, and propagating toward the air through the antenna 141 of the long-range wireless network system.

The Module Block 105: The Transceiver Module of the Short-Range Wireless Network System In accordance with the communication protocol procedure of the short-range wireless network system 1, the received electric waves are transformed to data, or the data is transformed to the electric waves for propagating toward the air. The data route is as follows: the electric waves of the air are transmitted to the module block 105 through the antenna 142 of the short-range wireless network system 1, the module block 105 transforms the electric waves to a data proper to the format of the module block 102, and then sending to the module block 102 through line 124. The module block 102 transforms the data to a data proper to the format of the module block 105, and then sending to the module block 105 through line 124, the module block 105 further transforms the data to the electric waves, and propagating toward the air through the antenna 142 of the short-range wireless network system 1.

The Module Block 106: The Transceiver Module of the Short-Range Wireless Network System 2

In accordance with the communication protocol procedure of the short-range wireless network system 2, the received electric waves are transformed to data, or the data is transformed to the electric waves for propagating toward the air. The data route is as follows: the electric waves are transmitted to the module block 106 through the antenna 143 of the short-range wireless network system 2, the module block 106 transforms the electric waves to a data proper to the format of the module block 102, and then sending to the module block 102 through line 125. The module block 102 transforms the data to a data proper to the format of the module block 106, and sending to the module block 106 through line 125, the module block 106 further transforms the data to the electric waves, and propagating toward the air through the antenna 143 of the short-range wireless network system 2.

Figure 4:
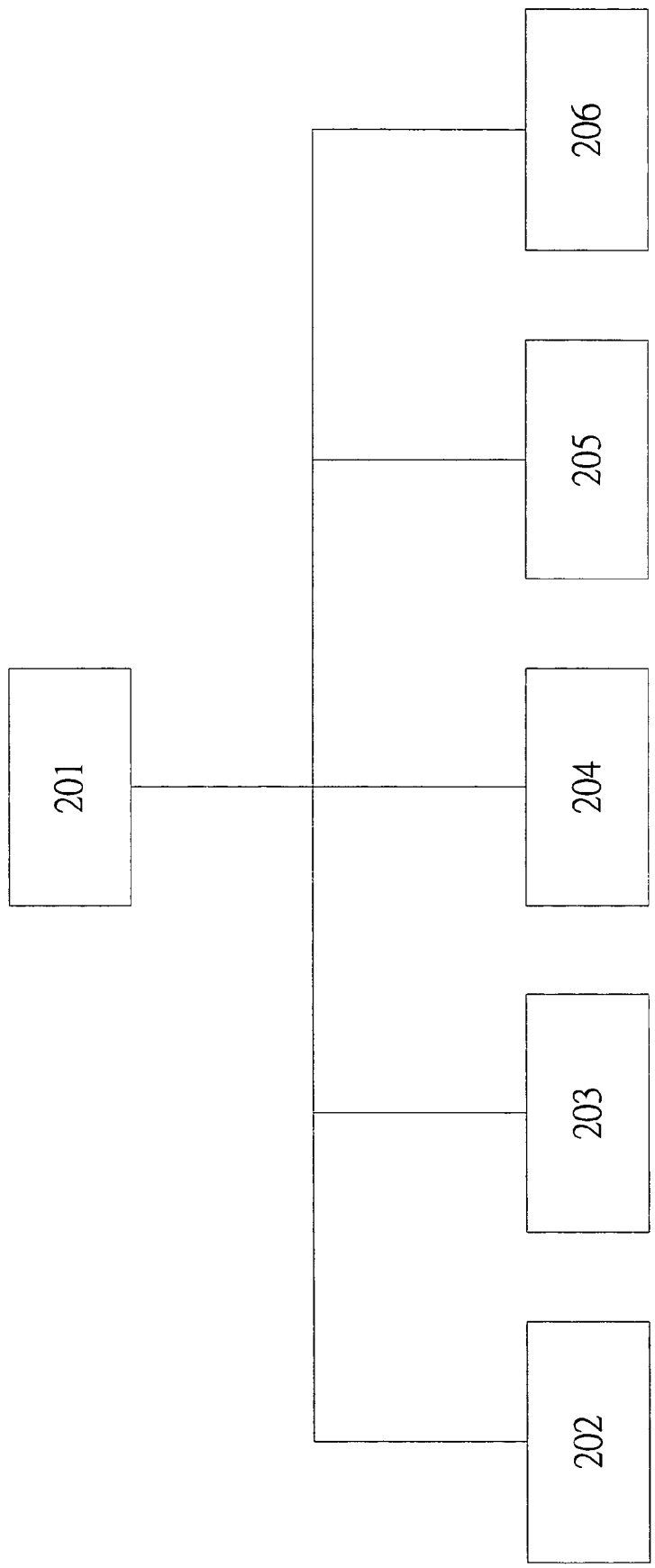
FIG. 4 is a schematic architecture of system operation of the communication network switch device of FIG. 2, which mainly comprises six subsystems.

Referring to FIG. 4, which is a schematic operation architecture of the whole system of the communication network switch device 3 of FIG. 2. The whole system of the communication network switch device 3 is divided into six subsystems, respectively subsystem 201, subsystem 202, subsystem 203, subsystem 204, subsystem 205 and subsystem 206. These subsystems would be described in detail as follows.

Subsystem 201: Actively and passively monitoring the activity status of the mobile communication device within the power range. The communication network switch device 3 actively and passively monitors the activity status of the mobile communication device 1 with the power range, being aimed to knowing the number of the mobile communication device present within the power range. There are two methods, respectively A. actively monitoring and B. passively monitoring, explained as follows:

A. Actively monitoring: The communication network switch device 3 constantly or non-constantly actively inquires if there is any mobile communication device 1 present in the power range, and then recording the response numbers and information of the mobile communication devices 1, actively deleting the related information of non-response mobile communication devices 1.

B. Passively monitoring: The mobile communication device 1 constantly or non-constantly actively sends an inquiry command. When the communication network switch device 3 receives the inquiry command, passively recording the related information of the mobile communication device 1 and informing the mobile communication device 1 the information related to the communication network switch device 3.

Subsystem 202: Performing that the internal mobile communication device of the communication network switch device 3 calls the internal cable telephony or internet telephony, the external cable telephony or the internet telephony, and calls the internal mobile communication device, cable telephony or internet telephony of the communication network switch device at the other end.

The internal mobile communication device 1 of the comunication network switch device 3 calls the internal cable telephony 5 or internet telephony 7, the external cable telephony 5 or internet telephony 7, and calls the internal mobile communication device, cable telephony 5 and internet telephony 7 of the communication network switch device 3 at the other end, requiring through the communication network switch device 3 to complete the task. And, the communication network switch device 3 completes this task through the subsystem 202.

Subsystem 203: Performing that the internal cable telephony of the communication network switch device 3 calls the internal mobile communication device or internet telephony, the external cable telephony or internet telephony, and the internal mobile communication device, cable telephony and internet telephony of the communication network switch device at the other end.

The internal cable telephony 5 of the communication network switch device 3 calls the internal mobile communication device 1 and internet telephony 7, or the external cable telephony 5 and internet telephony 7, and the internal mobile communication device 1, cable telephony 5 or internet telephony 7 of the communication network switch device 3 at the other end, requiring through the communication network switch device 3 to complete the task. And, the communication network switch device 3 completes this task through the subsystem 203.

Subsystem 204: Performing that the internal internet telephony of the communication network switch device calls the internal mobile communication device or cable telephony, the external cable telephony or internet telephony, and the internal mobile communication device, cable telephony and internet telephony of the communication network switch device at the other end.

The internal internet telephony 7 of the communication network switch device 3 calls the internal mobile communication device 1 and cable telephony 5, or the external cable telephony 5 and internet telephony 7, and the internal mobile communication device 1, cable telephony 5 or internet telephony 7 of the communication network switch device 3 at the other end, requiring through the communication network switch device 3 to complete the task. And, the communication network switch device 3 completes this task through the subsystem 204.

Subsystem 205: Performing that the external internet telephony or the internal mobile communication device, cable telephony and internet telephony of the communication network switch device 3 at the other end calls the internal mobile communication device, cable telephony or internet telephony of the communication network switch device 3.

The external internet telephony 7 or the internal mobile communication device 1, cable telephony 5 or internet telephony 7 of the communication network switch device 3 at the other end calls the internal mobile communication device 1, cable telephony 5 or internet telephony 7 of the communication network switch device 3, requiring through the communication network switch device 3 to complete the task. And, the communication network switch device 3 completes this task through the subsystem 205.

Subsystem 206: Performing that the external cable telephony or the mobile communication device, cable telephony or internet telephony of the communication network switch device 3 at the other end calls the internal mobile communication device, cable telephony or internet telephony of the communication network switch device 3.

The external cable telephony 5 or the internal mobile communication device 1, cable telephony 5 or internet telephony 7 of the communication network switch device 3 at the other end call the internal mobile communication device 1, cable telephony 5 or internet telephony 7 of the communication network switch device 3, requiring through the communication network switch device 3 to complete the task. And, the communication network switch device 3 completes this task through the subsystem 206.

Figure 5:
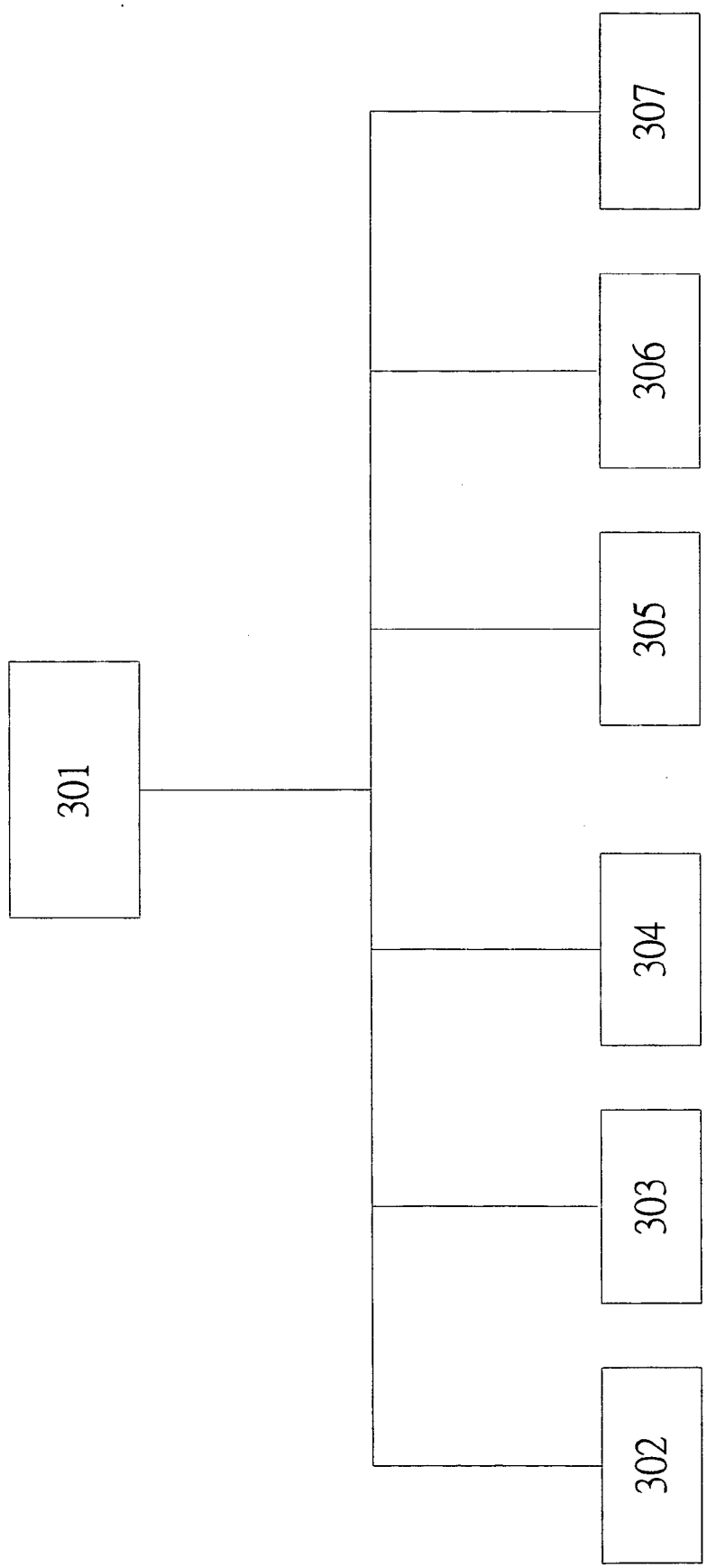
FIG. 5 is a schematic architecture of system operation of the mobile communication device of FIG. 3, which mainly comprises seven subsystems.

Referring to FIG. 5, which is a schematic operation architecture of the whole system of the mobile communication device 1. The whole system of the mobile communication device 1 is divided into seven subsystems, respectively subsystem 301, subsystem 302, subsystem 303, subsystem 304, subsystem 305, subsystem 306 and subsystem 307. These subsystems would be described in detail as follows:

Subsystem 301: Performing that actively and passively monitoring the activity status of the communication network switch device 3 within the power range. The mobile communication device 1 actively and passively monitors the activity status of the communication network switch device 3 within the power range, being aimed to knowing the number of the communication network switch devices present in the power range. Three are two methods, respectively A. actively monitoring and B. passively monitoring:

A. Actively monitoring: The mobile communication device 1 constantly or non-constantly actively sends an inquiry command that if there is any communication network switch device 3 present within the power range, recording the response numbers and information of the communication network switch devices 3, and actively deleting the related information of non-response communication network switch devices 3.

B. Passively monitoring: The mobile communication switch device 3 constantly or non-constantly sends an inquiry command. When the mobile communication device 1 receives the inquiry command, passively recording the related information of the communication network switch device 3, and informing the communication network switch device 3 the information related to the mobile communication device 1.

Subsystem 302: Performing that the mobile communication device 1 calls the remote mobile communication device and cable telephony by using the long-range wireless network system. When the mobile communication device 1 is not present in the power range of any communication network switch device 3, the mobile communication device 1 calls the remote mobile communication device and cable telephony 5, requiring using the long-range wireless network system to conduct communication. And, the mobile communication device 1 completes this task through the subsystem 302.

Subsystem 303: Performing that the mobile communication device calls the remote mobile communication device, cable telephony and internet telephony. The mobile communication device 1 calls the remote mobile communication device 1, the cable telephony 5 or internet telephony 7 by using the short-range wireless network system, the mobile communication device 1 completes this task through the subsystem 303.

Subsystem 304: Performing that the mobile communication device calls the remote mobile communication device, cable telephony and internet telephony by using the short-range wireless network system 2. The mobile communication device 1 calls the remote mobile communication device 1, cable telephony 5 or internet telephony 7 by using the short-range wireless network system 2. The mobile communication device 1 completes this task through the subsystem 304.

Subsystem 305: Performing that the communication network switch device calls the mobile communication device by using the short-range wireless network system 1. The communication network switch device 3 calls the mobile communication device by using the short-range wireless network system 1. The mobile communication device 1 completes this task through the subsystem 305.

Subsystem 306: Performing that the communication network switch device calls the mobile communication device by using the short-range wireless network system 2. The communication network switch device 3 calls the mobile communication device 1 by using the short-range wireless network system 2. The mobile communication device 1 completes this task through the subsystem 306.

Subsystem 307: Performing that the remote mobile communication device or cable telephony calls the mobile communication device through the long-range wireless network system. The remote mobile communication device or cable telephony 5 calls the mobile communication device 1 through the long-range wireless network system. The mobile communication device 1 completes this task through the subsystem 307.

Figures 1, 6:
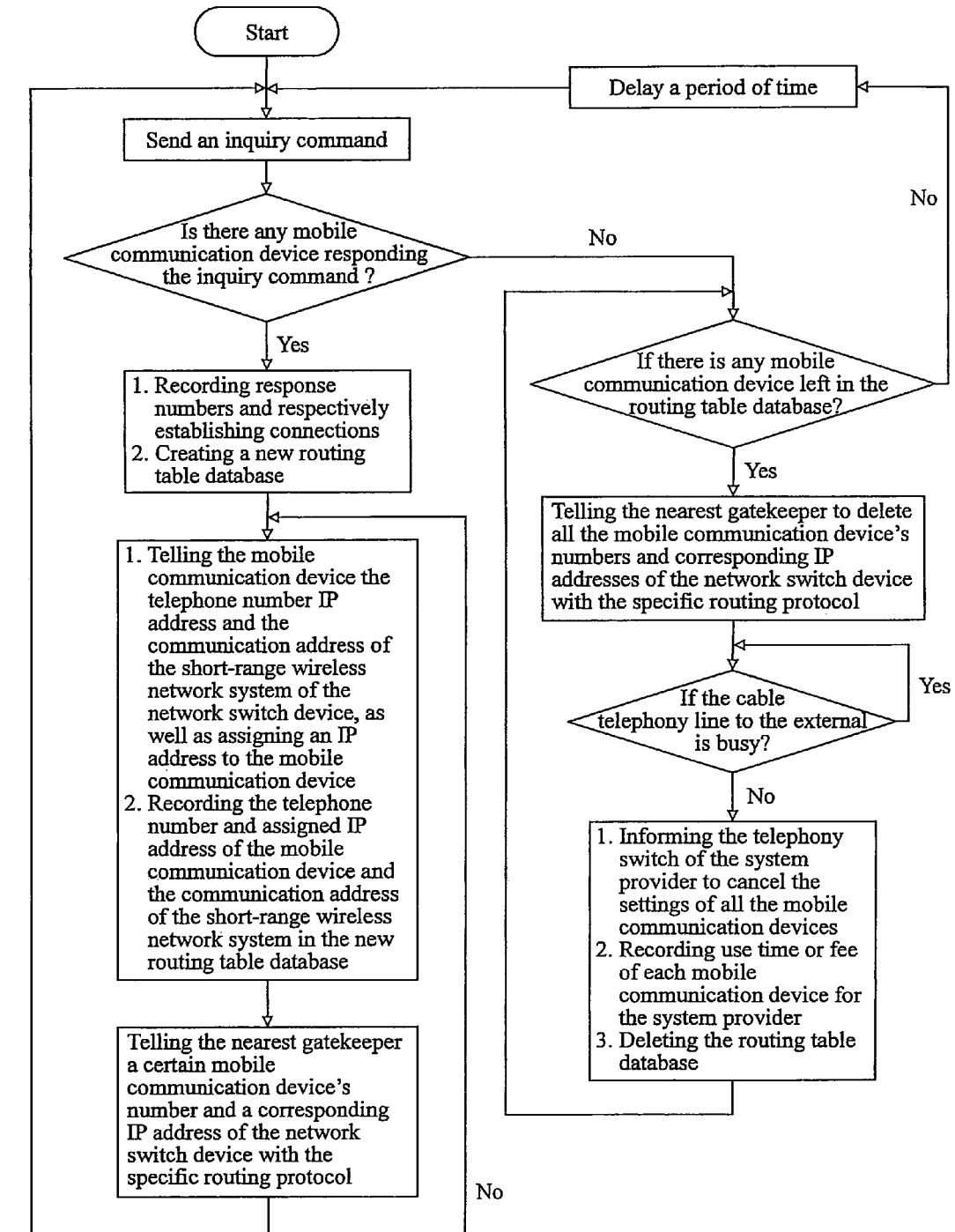
FIG. 6 illustrates a flow chart showing a method that the communication network switch device actively monitors the activity status of the mobile communication device in the power range of FIG. 4.
Figures 2, 6:
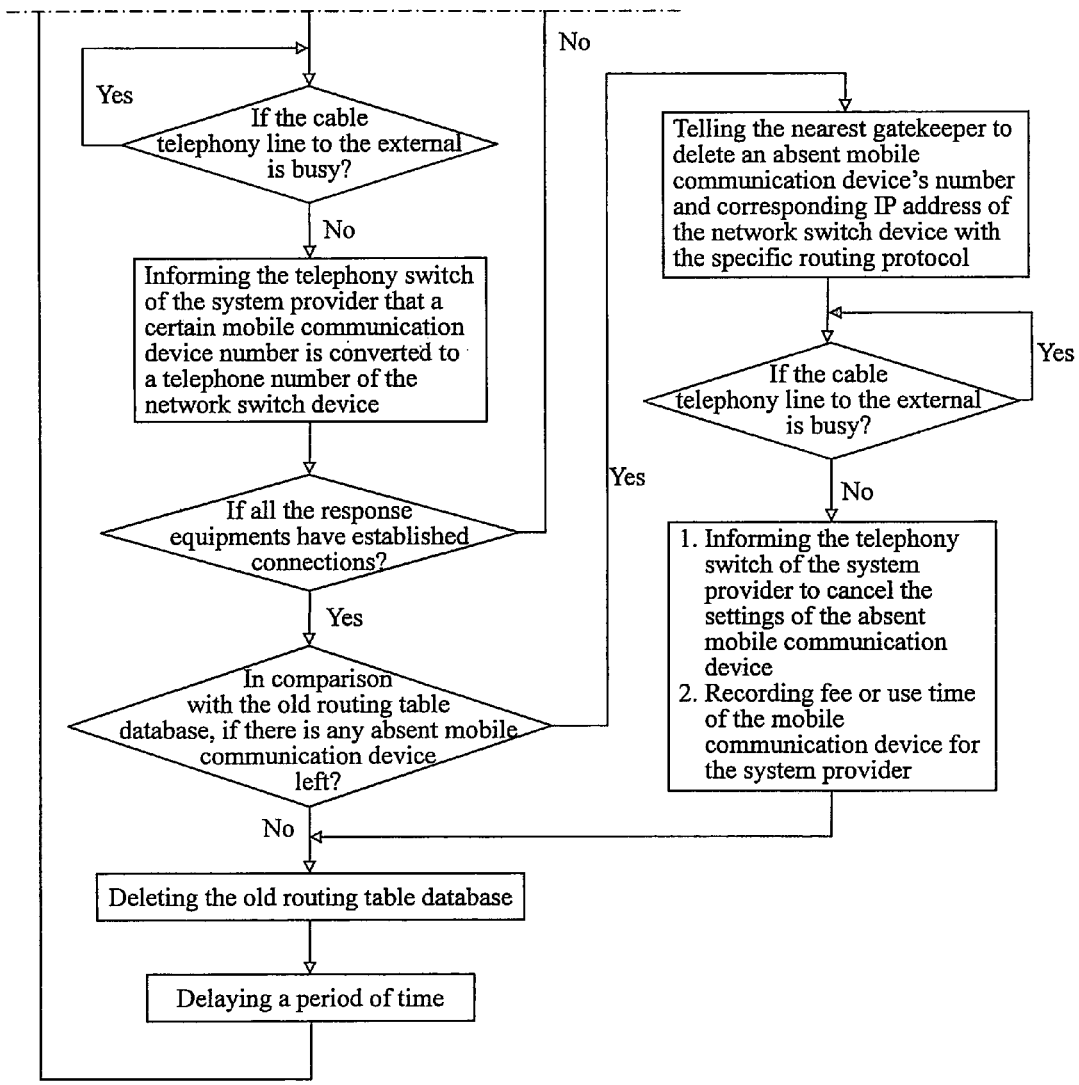

FIG. 6 illustrates a flow chart showing the method that the communication network switch device actively monitors the activity status of the mobile communication device in the power range. Please refer to FIG. 1, FIG. 2 and FIG. 4.

1. Referring to FIG. 2, when the communication network switch device 3 starts, the transceiver module of the short-range wireless network system 1 of the module block 61 and the transceiver module of the short-range wireless network system 2 of the module block 62 sends a sequence of initialization commands to execute the initialization action such that the module block 61 and module block 62 are in standby state. Then, the switch module of the module block 65 uses a specific routing protocol through route 89 and line 13 to tell a nearest gatekeeper the telephone number and IP address of the communication network switch device 3, and storing in the phone number database 21 of the gatekeeper. At the same time, under the circumstance that line 8 is not busy, the module block 65 uses message or a specific routing protocol through route 88 and line 8 to tell a nearest telephony switch of the system provider, the telephone number and IP address of the communication network switch device 3, and storing in the phone number database 21 of the telephony switch.

2. Referring to FIG. 1, FIG. 2 and FIG. 6, the module block 61 and module block 62 of the communication network switch device 3 first time send an inquiry command, monitoring the number of the mobile communication device 1 present in the power range through the short-range wireless network system 2, and telling the mobile communication device 1 the information of the communication network switch device 3 (including the telephone number, IP address, the communication addresses of the short-range wireless network system 1 and the short-range wireless network system 2 of the communication network switch device 3), and assigning an IP address to the mobile communication device 1. The mobile communication device 1 writes the information obtained in a new routing table database.

3. Referring to FIG. 2 and FIG. 6, the module block 61 and the module block 62 of the communication network switch device 3 inform the module block 63 through route 83 and route 84 to establish a new routing table database, and sequentially writing the information of the mobile communication device 1 (including the phone number, the communication addresses of the short-range wireless network system 1 and the short-range wireless network system 2 and the IP address of the mobile communication device 1) in the new routing table database.

4. Referring to FIG. 1 and FIG. 6, the communication network switch device 3 uses the specific routing protocol through line 13 to tell the nearest gatekeeper the telephone numbers of all the mobile communication devices 1 and their IP addresses corresponding to the communication network switch device 3 within the power range of the communication network switch device 3, and storing in the phone number database 21 of the gatekeeper.

5. Referring to FIG. 1 and FIG. 6, when the cable telephony line 8 to the external, of the communication network switch device 3, is not busy, using message or the specific routing protocol through line 8 to tell the nearest telephony switch of the system provider the related information of all the mobile communication devices 1 (including the telephony number of the communication network switch device 3 and the phone numbers of the mobile communication devices 1) within the power range of the communication network switch device 3, and storing in the phone number database 21 of the telephony switch.

6. Referring to FIG. 1 and FIG. 6, comparing the old and new routing table database, and filtering the mobile communication devices 1 absent in the power range of the communication network switch device 3. Using the specific routing protocol through line 13 informs the nearest gatekeeper to cancel the related information of all the mobile communication devices 1 absent in the power range of the communication network switch device 3. And, when the cable telephony line 8 to the external, of the communication network switch device 3, is not busy, using message or the specific routing protocol through line 8 to inform the nearest telephony switch of the system provider to cancel the related information of the mobile communication devices 1 absent in the power range of the communication switch device 3, and recording use time and charged fee of the mobile communication device 1 and deleting the content of the old routing table database.

7. Referring to FIG. 1 and FIG. 6, if the communication network switch device 3 monitors there is no any mobile communication device 1 present in the power range, the communication network switch device 3 would inform the nearest gatekeeper through line 13 by using the specific routing protocol to cancel the related information of all the mobile communication devices 1 present in the power range of the communication network switch device 3. And, when the cable telephony line 8 to the external, of the communication network switch device 3, is not busy, using message or the specific routing protocol through line 8 informs the nearest telephony switch of the system provider to delete the setting of all the mobile communication devices, and sequentially telling the system provider the use time and charged fee of all the mobile communication devices 1 and deleting the content of the routing table database.

8. Referring to FIG. 2 and FIG. 6, since the communication network switch device 3 actively monitors the activity status of the mobile communication devices 1 in the power range, the module block 61 and module block 62 of the communication network switch device 3 constantly or non-constantly sends an inquiry command to ascertain that the activity status of the mobile communication device 1 in the power range.

9. In FIG. 6, under the circumstance with a multitude of communication network switch devices 3, it is necessary to prevent the communication network switch device 3 from being regarded as the mobile communication device 1 of the other communication network switch device 3.

Figure 7:
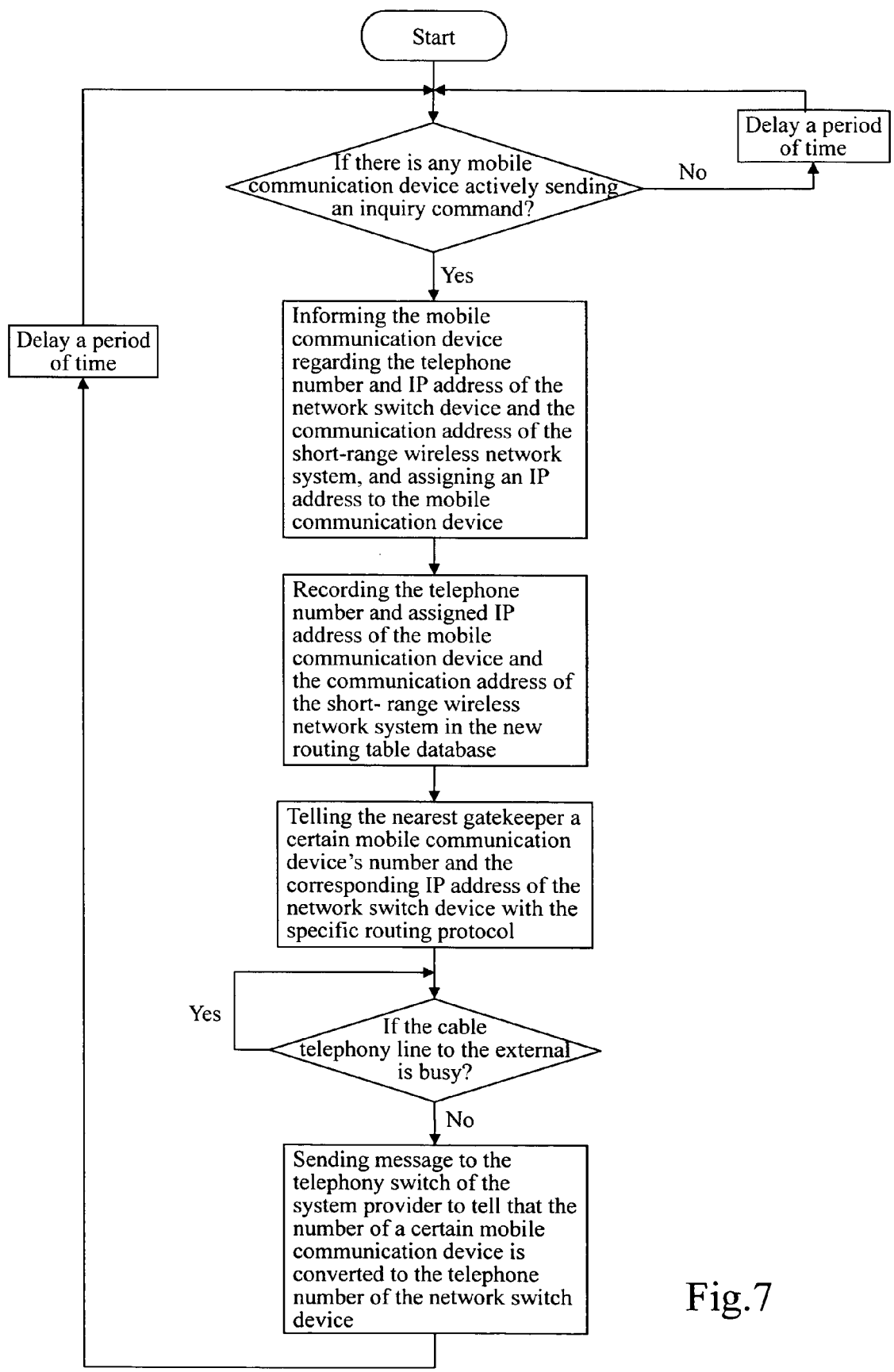
FIG. 7 illustrates a flow chart showing a method that the communication network switch device passively monitors the activity status of the mobile communication device in the power range of FIG. 4.

FIG. 7 illustrates a flow chart showing that the communication network switch device passively monitors the activity status of the mobile communication device in the power range. Please refer to FIG. 1 and FIG. 4.

1. Referring to FIG. 1 and FIG. 7, when the communication network switch device 3 receives the inquiry command of the mobile communication device 1, responding to the mobile communication device 1 to tell it the telephone number, IP address, the communication addresses of the short-range wireless network system 1 and the short-range wireless network system 2 of the communication network switch device 3, and assigning an IP address to the mobile communication device 1.

2. Referring to FIG. 1 and FIG. 7, the communication network switch device 3 further records the telephone number, the communication addresses of the short-range wireless network system 1 and the short-range wireless network system 2 and the assigned IP address of the mobile communication device 1 in the new routing table database of the communication network switch device 3.

3. Referring to FIG. 1 and FIG. 7, the communication network switch device 3 uses the specific routing protocol through line 13 to tell the nearest gatekeeper the telephone numbers of new added mobile communication devices 1 in the power range of the communication network switch device 3 and their IP addresses corresponding to the communication network switch device 3.

4. Referring to FIG. 1 and FIG. 4, when the cable telephony line 8 to the external, of the communication network switch device 3, is not busy, using message or the specific routing protocol through line 8 to tell the nearest telephony switch of the system provider the related information of the new added mobile communication devices (including the telephone number of the communication network switch device 3 and the phone number of the mobile communication device 1) in the power range of the communication network switch device 3.

Figures 1, 8A:
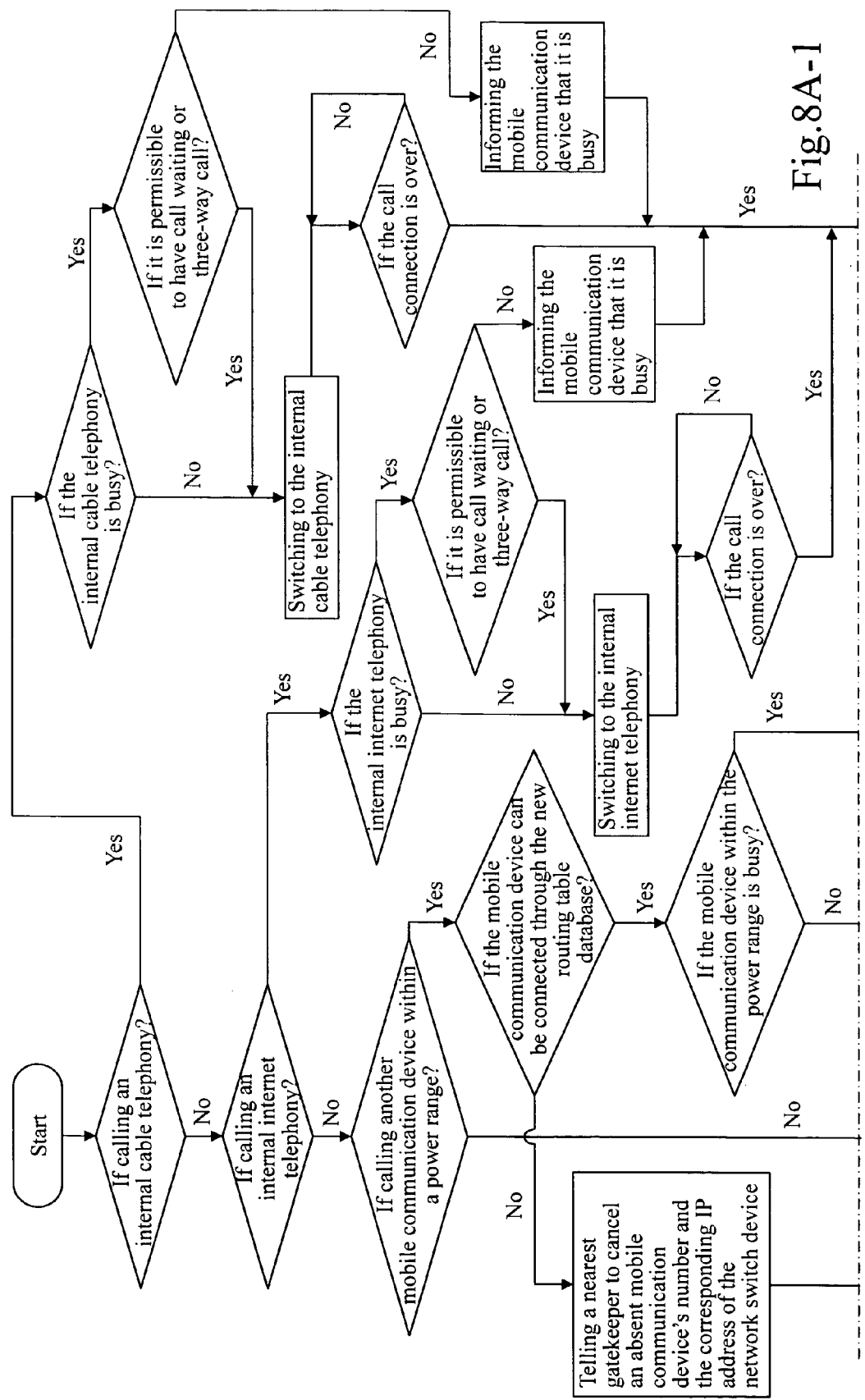
FIG. 8A and FIG. 8B illustrate a flow chart of FIG. 4 showing a method that the internal mobile communication device of the communication network switch device calls the internal cable telephony or internet telephony, the external cable telephony or internet telephony, and the internal mobile communication device, cable telephony or internet telephony of the communication network switch device at the other end.
Figures 2, 8A:
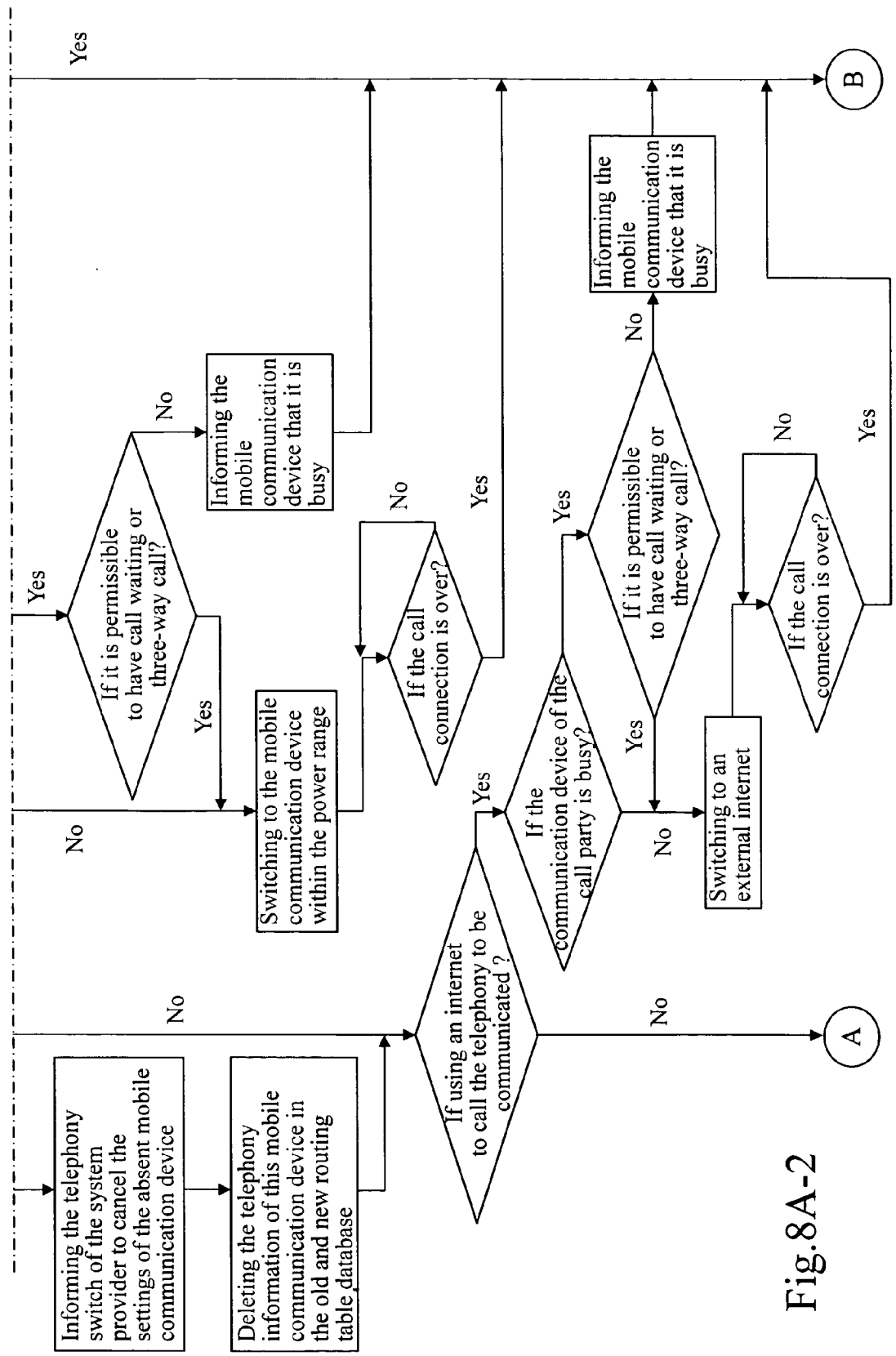
Figures 1, 8B:
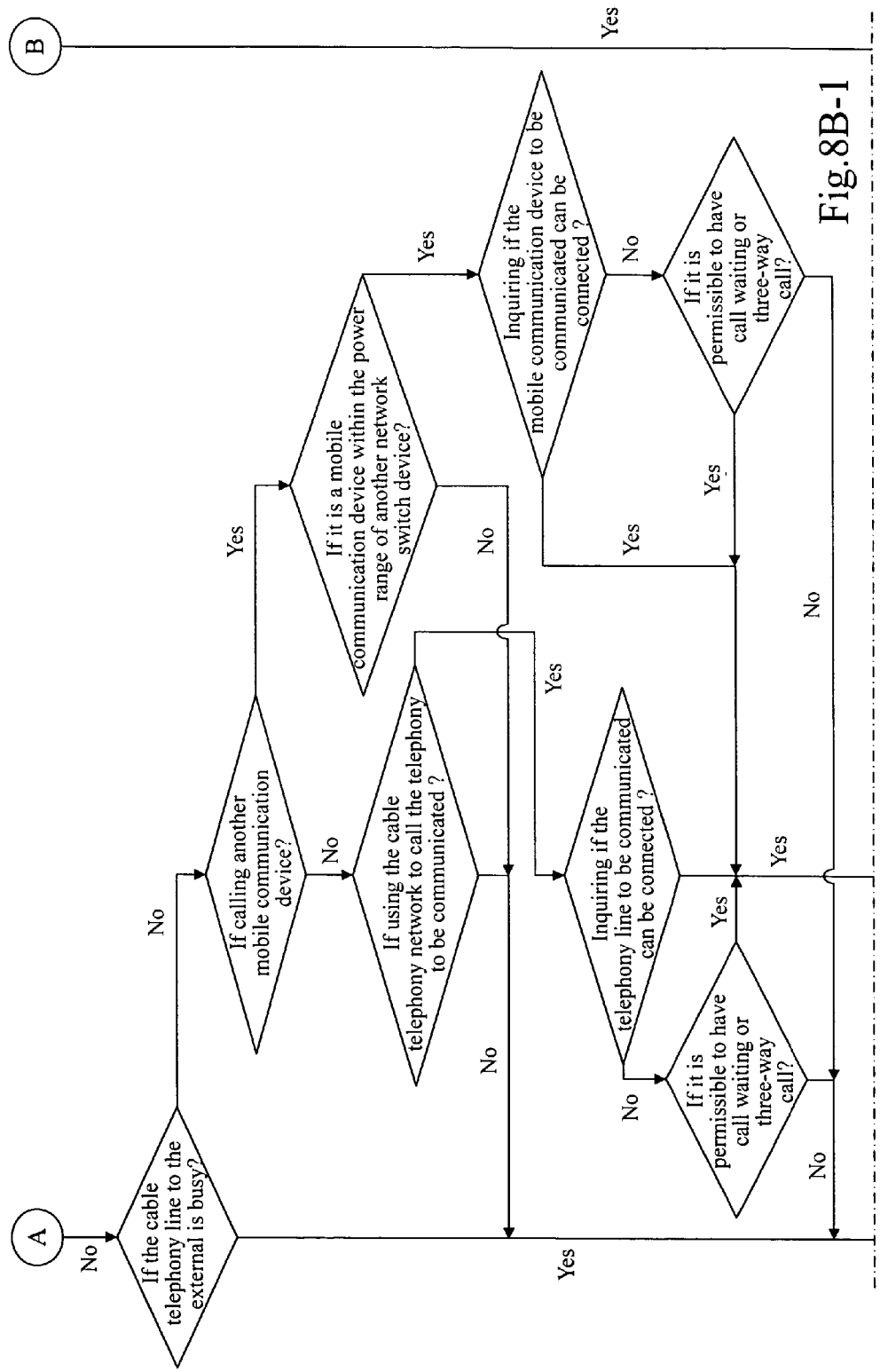
Figures 2, 8B:
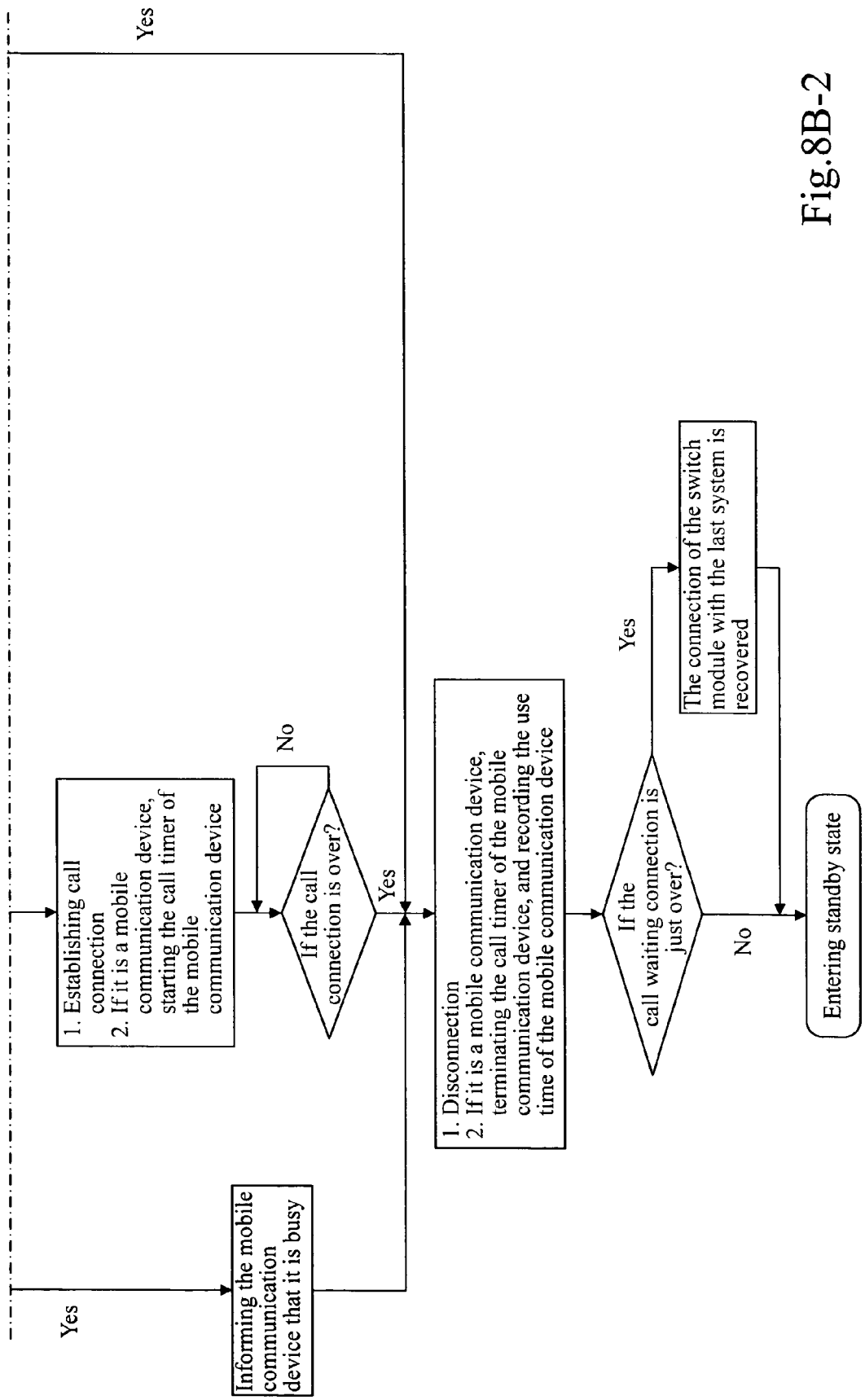

Referring to FIG. 8 through FIG. 12 and coordinating with FIG. 1, FIG. 2 and FIG. 4, which show the data flow from the internal mobile communication device 1, cable telephony 5 and internet telephony 7 of the communication network switch device 3 to the external cable telephony 5, internet telephony 7 and mobile communication device 1. Each flow chart would be described in detail as follows:

FIG. 8A and FIG. 8B illustrate a flow chart showing that the internal mobile communication device of the communication network switch device calls the internal cable telephony or internet telephony, the external cable telephony or internet telephony, and the internal mobile communication device, cable telephony or internet telephony of the communication network switch device at the other end.

1. Referring to FIG. 1 and FIG. 2, the data flow from the mobile communication device 1 to the internal cable telephony 5 of the communication switch network switch device 3 is as follows:

The mobile communication device 1 through the short-range wireless network system 2 and the antenna 81 of the short-range wireless network system 1 of the communication network switch device 3 reaches the module block 61, or through the antenna 82 of the short-range wireless network system 2 reaches the module block 62, and then reaching the module block 63 through route 83 or route 84, and reaching the module block 65 through route 86, at last reaching the module block 5 through route 90 and the module block 66.

2. Referring to FIG. 1 and FIG. 2, the data flow from the mobile communication device 1 to the internal internet telephony 7 of the communication network switch device 3 is as follows:

The mobile communication device 1 through the short-range wireless network system 2 and the antenna 81 of the short-range wireless network system 1 of the communication network switch device 3 reaches the module block 61, or though the antenna 82 of the short-range wireless network system 2 reaches the module block 62, and then reaching the module block 63 through route 83 or route 84, and reaching the module block 65 through route 86, at last reaching the module block 7 through route 91 and the module block 67.

3. Referring to FIG. 1 and FIG. 2, the data flow from the mobile communication device 1 to the other mobile communication devices 1 in the power range of the communication network switch device 3 is as follows:

The mobile communication device 1 through the short-range wireless network system 2 and the antenna 81 of the short-range wireless network system 1 of the communication network switch device 3 reaches the module block 61, or through the antenna 82 of the short-range wireless network system 2 reaches the module block 62, and then reaching the module block 63 through route 83 and route 84, and reaching the module block 62 through route 84, reaching the short-range wireless network system 2 through the antenna 82 of the short-range wireless network system 2, or reaching the module block 61 through route 83 and then reaching the short-range wireless network system 2 through the antenna 81 of the short-range wireless network system 1, at last reaching the assigned mobile communication device 1.

4. Referring to FIG. 1 and FIG. 2, the data flow from the mobile communication device 1 using the external internet 6 of the communication network switch device 3 to the other remote communication terminal is as follows:

The mobile communication device 1 through the short-range wireless network system 2 and the antenna 81 of the short-range wireless network system 1 of the communication network switch device 3 reaches the module block 61, or through the antenna 82 of the short-range wireless network system 2 reaches the module block 62, and then reaching the module block 63 through route 83 or route 84, reaching the module block 65 through route 86, and reaching the module block 67 through route 89, at last reaching the module block 6 through line 13.

5. Referring to FIG. 1 and FIG. 2, the data flow from the mobile communication device 1 using the external cable telephony network 4 of the communication network switch device 3 to the other remote communication terminal is as follows:

The mobile communication device 1 through the short-range wireless network system 2 and the antenna 81 of the short-range wireless network system 1 of the communication network switch device 3 reaches the module block 61, or through the antenna 82 of the short-range wireless network system 2 reaches the module block 62, and then reaching the module block 63 through route 83 or route 84, and reaching the module block 65 through route 86, reaching the module block 66 through route 88, at last reaching the module block 4 through line 8.

Referring to FIG. 1 and FIG. 8A, when the mobile communication device 1 uses the communication network switch device 3 to call the other remote communication terminal, at first, the module block 65 of the communication network switch device 3 determines the communication route. If the called communication terminal is the internal cable telephony 5, examining if the internal cable telephony 5 is busy. If it is not, the module block 65 through line 10 switches the call to the internal cable telephony 5 until the call is over. If the internal cable telephony 5 is busy, inquiring if it is permissible to have call waiting or three-way call. If it is permissible, having the call waiting or three-way call. Otherwise, informing the mobile communication device 1 that it is busy.

7. Referring to FIG. 2 and FIG. 8A, if the called communication terminal is the internal internet telephony 7, examining if the internal internet telephony 7 is busy. If it is not, the module block 65 through line 15 switches the call to the internal internet telephony 7 until the call is over. If the internal internet telephony 7 is busy, inquiring if it is permissible to have a call waiting or three-way call. If it is permissible, having the call waiting or three-way call. Otherwise, informing the mobile communication device 1 that it is busy.

8. Referring to FIG. 2 and FIG. 8A, if the called communication terminal is the other mobile communication device 1 in the power range of the communication network switch device 3, examining if the mobile communication device 1 can be linked through the new routing table database. If it is not, executing the following three things: a. using the specific routing protocol to tell the nearest gatekeeper to cancel the phone number of the absent mobile communication device 1 and its IP address corresponding to the communication network switching device 3; b. informing the nearest telephony switch of the system provider to cancel the setting of a certain mobile communication device, and telling it the use time of the mobile communication device 1; c. Deleting telephone information of the mobile communication device in the old and new routing table database. Otherwise, examining if the mobile communication device in the power range is busy. If it is not, the module block 65 through route 86 switches the call to the mobile communication device 1 until the call is over. If the mobile communication device is busy, inquiring if it is permissible to have a call waiting or three-way call. If it is permissible, having the call waiting or three-way call. Otherwise, informing the mobile communication device 1 that it is busy.

9. Referring to FIG. 2 and FIG. 8A, if the called communication terminal is a remote communication device required to use the internet 6, examining if the remote communication device is busy. If it is not, the module block 65 through line 13 switches the call to the internet 6 until the call is over. If the remote communication device is busy, inquiring if it is permissible to have a call waiting or three-way call. If it is permissible, having the call waiting or three-way call. Otherwise, informing the mobile communication device 1 that it is busy.

10. Referring to FIG. 2 and FIG. 8A, if the called communication terminal is a remote communication device required to use the cable telephony network 4, examining if the cable telephony line 8 to the external is busy. If it is, informing the mobile communication device 1 that it is busy. Otherwise, examining if calling the other mobile communication device.

If it is not, examining if the cable telephony network 4 can be used to call the mobile communication device to be communicated. If it is not, informing the mobile communication device 1 that it is busy. Otherwise, examining if the phone line to be communicated can be connected. If this phone line can be connected, the module block 65 switches the call to the cable telephony network through line 8 until the call is over. If the mobile communication device to be communicated can not be connected, inquiring if it is permissible to have call waiting or three-way call. If it is permissible, having the call waiting or three-way call. If it is not, informing the mobile communication device 1 that it is busy. If calling the other mobile communication device, examining if it is a mobile communication device in the power range of the other communication network switch device. If it is not, informing the mobile communication device 1 that it is busy. Otherwise, inquiring if the mobile communication device to be communicated can be connected. If the mobile communication device can be connected, the module block 65 switches the call through line 8 to the cable telephony network 4 until the call is over, and recording the use time of the mobile communication device. If the mobile communication device to be communicated can not be connected, inquiring if it is permissible to have call waiting or three-way call. If it is permissible to have the call waiting or three-way call. If it is not, informing the mobile communication device that it is busy. When the call waiting is just over, the module block 65 recovers the use of the last system for connection.

Figures 1, 9A:
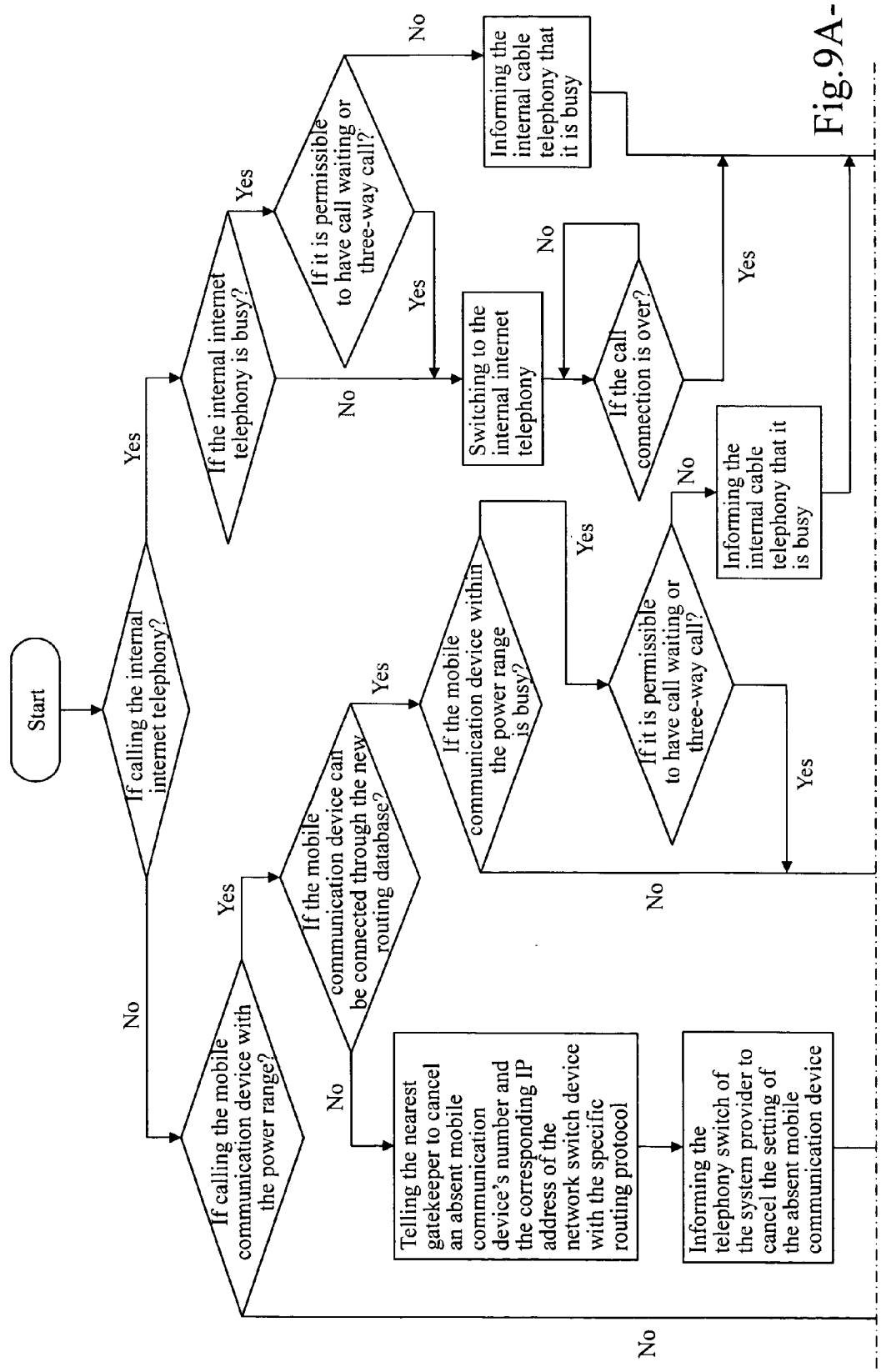
FIG. 9A and FIG. 9B illustrate a flow chart of FIG. 4 showing a method that the internal cable telephony of the communication network switch device calls the internal mobile communication device or internet telephony, the external cable telephony or internet telephony, and the internal mobile communication device, cable telephony or internet telephony of the communication network switch device at the other end.
Figures 2, 9A:
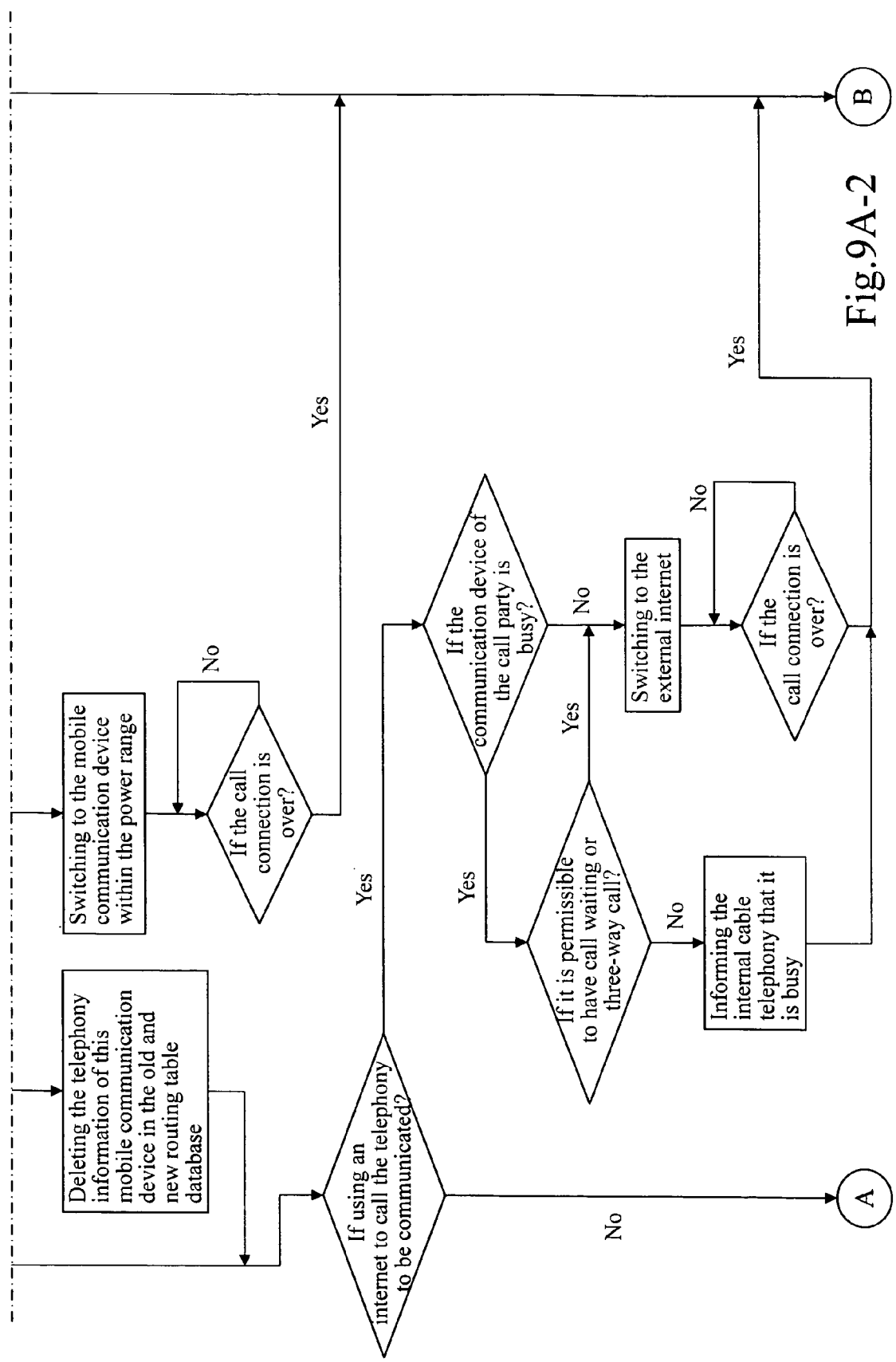
Figures 1, 9B:
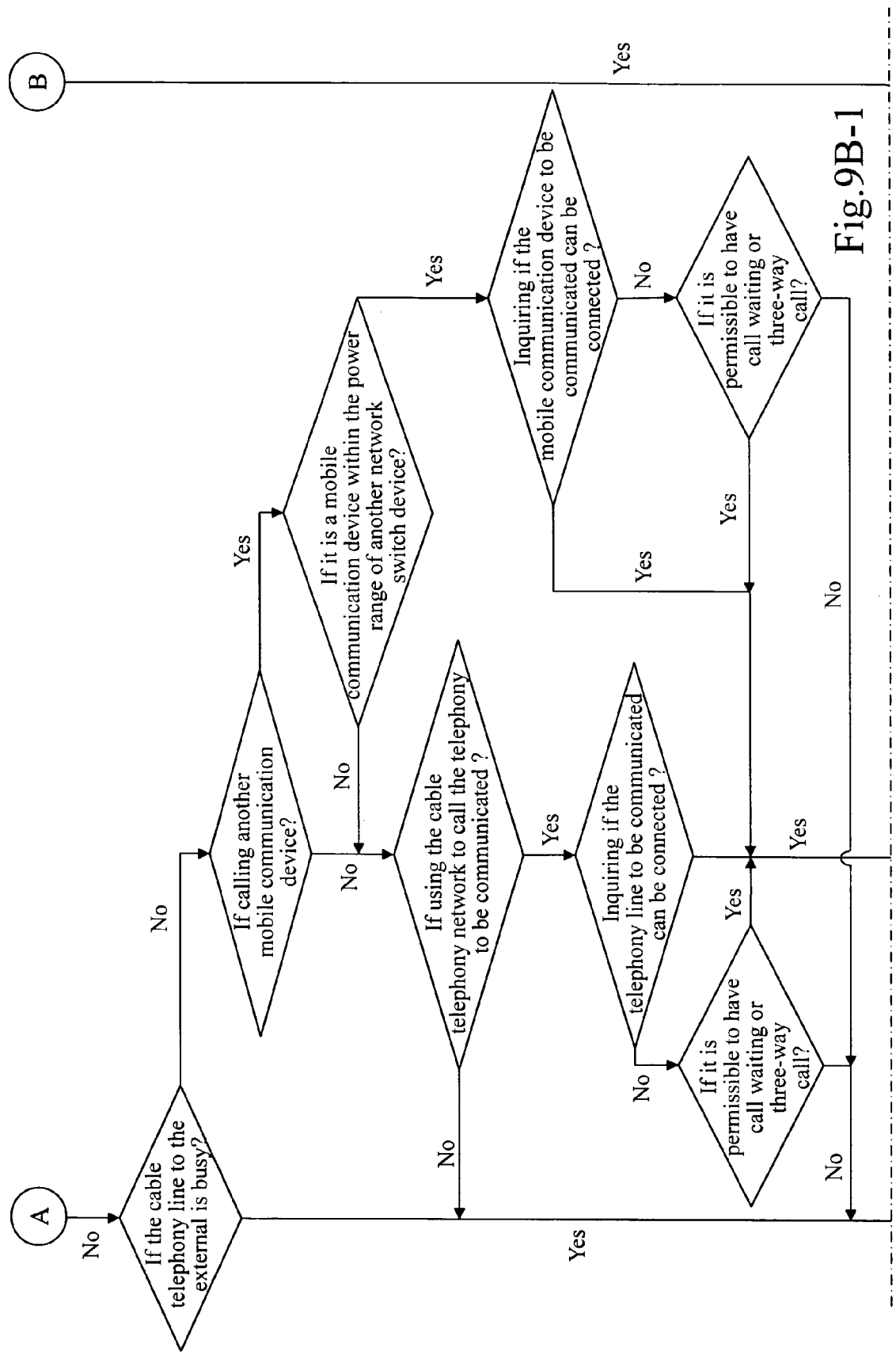
Figures 2, 9B:
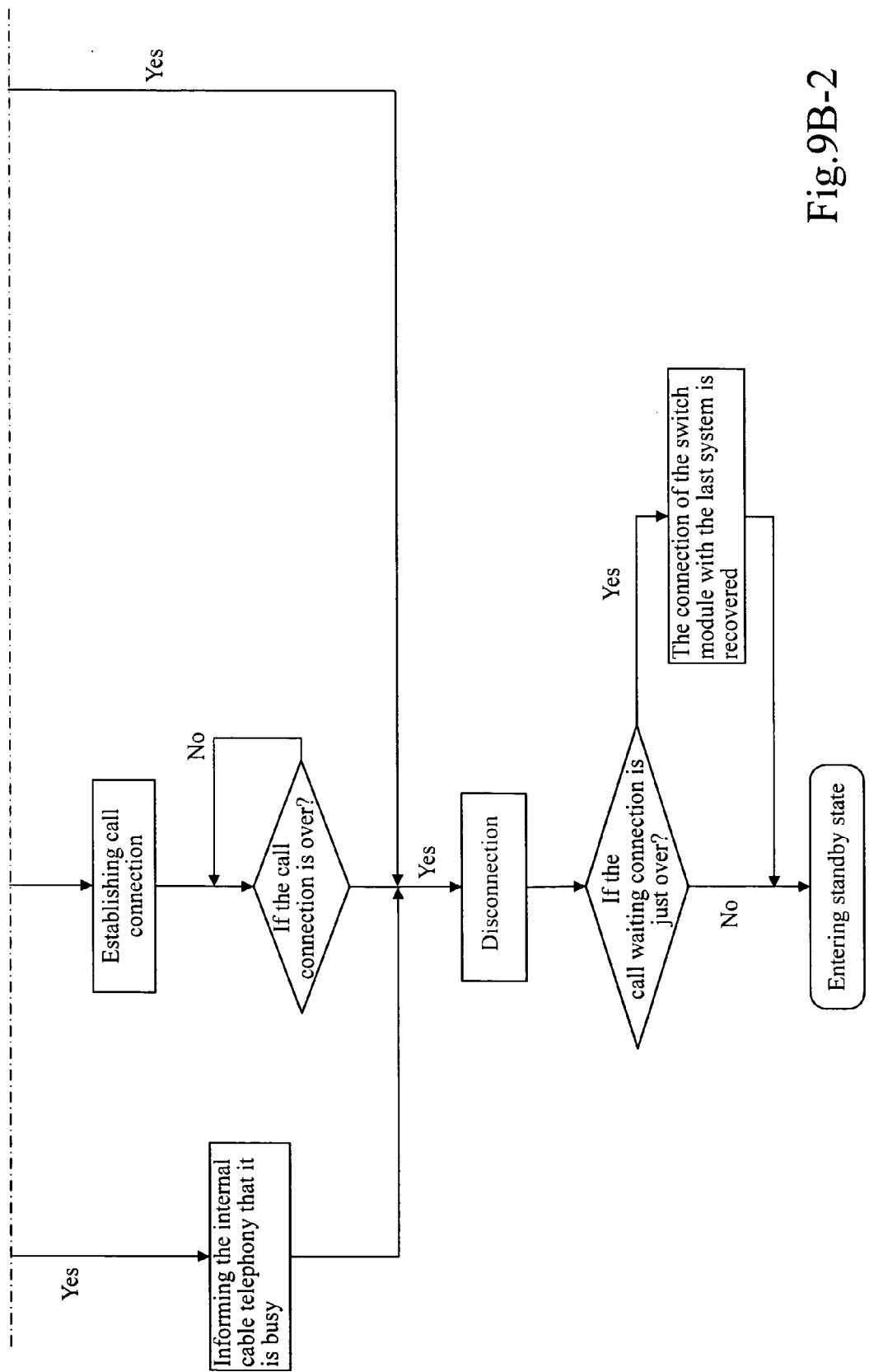

FIG. 9A and FIG. 9B illustrate a flow chart showing the method that the internal cable telephony of the communication network switch device calls the internal mobile communication device or internet telephony, the external cable telephony or internet telephony, or the internal mobile communication device, cable telephony or internet telephony of the communication network switch device at the other end.

1. Referring to FIG. 2, the data flow from the internal cable telephony 5 of the communication network switch device 3 to the internet telephony 7 is as follows:

The internal cable telephony 5 of the communication network switch device 3 through line 10 to the module block 66, and through route 90 reaching the module block 65, through route 91 reaching the module block 67, and at last through line 15 reaching the assigned internet telephony 7.

2. Referring to FIG. 1 and FIG. 2, the data flow from the internal cable telephony 5 of the communication network switch device 3 to the internal mobile communication device is as follows:

The internal cable telephony 5 of the communication network switch device 3 through line 10 reaches the module block 66, and through route 90 reaching the module block 65, through route 86 reaching the module block 63, and then through route 83 or route 84 reaching the module block 61 or the module block 62, and then through the antenna 81 of the short-range wireless network system 1 or the antenna 82 of the short-range wireless network system 2 reaching the short-range wireless network system 2, at last reaching the assigned mobile communication device 1.

3. Referring to FIG. 2, the data flow from the internal cable telephony 5 of the communication network switch device 3 using the external internet 6 of the communication network switch device 3 to the other remote communication terminal is as follows:

The internal cable telephony 5 of the communication network switch device 3 through line 10 reaches the module block 66, and through route 90 reaching the module block 65, through route 89 reaching the module block 67, and then through line 13 reaching the module block 6.

4. Referring to FIG. 2, the data flow from the internal cable telephony 5 of the communication network switch device 3 using the external cable telephony network 4 of the communication network switch device 3 to the other remote communication terminal is as follows:

The internal cable telephony 5 of the communication network switch device 3 through line 10 reaches the module block 66, and then through route 90 reaching the module block 65, through route 88 reaching the module block 66, and then through line 8 reaching the module block 4.

5. Referring to FIG. 2 and FIG. 9A, if the called communication terminal is the internal internet telephony 7, examining if the internal internet telephony 7 is busy. If it is not, the module block 65 through line 15 switches the call to the internal internet telephony 7 until the call is over. If it is busy, inquiring if it is permissible to have a call waiting or three-way call. If it is permissible, having the call waiting or three-way call. Otherwise, informing the internal cable telephony 5 of the communication network switch device 3 that it is busy.

6. Referring to FIG. 2 and FIG. 9A, if the called communication terminal is the other mobile communication device 1 in the power range of the communication network switch device 3, examining if the mobile communication device 1 can be connected through a new routing table database. If it is not, executing the following three things: a. using the specific routing protocol to tell the nearest gatekeeper to cancel the phone number of the absent mobile communication device 1 and its IP address corresponding to the communication network switch device 3; b. informing the nearest telephony switch of the system provider to cancel the telephone setting of the mobile communication device 1 and telling the mobile communication device 1 the use time; c. deleting the telephone information of the mobile communication device 1 in the old and new routing table database. Otherwise, examining if the mobile communication device in the power range is busy. If it is not busy, the module block 65 through route 86 switches the call to the mobile communication device 1 until the call is over. If it is busy, inquiring if it is permissible to have a call waiting or three-way call. If it is permissible, having the call waiting or three-way call. Otherwise, informing the internal cable telephony 5 of the communication network switch device 3 that it is busy.

7. Referring to FIG. 2 and FIG. 9A, if the called communication terminal is a remote communication device required to use the internet 6, examining if the remote communication device is busy. If it is not, the module block 65 through line 13 switches the call to the internet 6 until the call is over. If it is busy, inquiring if it is permissible to have call waiting or three-way call. If it is permissible, having the call waiting or three-way call. Otherwise, informing the internal cable telephony 5 of the communication network switch device 3 that it is busy.

8. Referring to FIG. 2 and FIG. 9, if the called communication terminal is a remote communication device required to use the cable telephony network 4, examining if the cable telephony line to the external is busy. If it is busy, informing the internal cable telephony 5 of the communication network switch device 3 that it is busy. Otherwise, examining if calling the other mobile communication device. If it is not, then examining if the cable telephony network 4 can be used to call the mobile communication device to be communicated. If it is not, informing the internal cable telephony 5 of the communication network switch device 3 that it is busy. Otherwise, examining if the phone line to be communicated can be connected. If it is, the module block 65 through line 8 switches the call to the cable telephony network 4 until the call is over. If the mobile communication device to be connected can not be connected, inquiring if it is permissible to have call waiting or three-way call. If it is permissible, having the call waiting or three-way call. If it is not, informing the internal cable telephony 5 of the communication network switch device 3 that it is busy. If calling the other mobile communication device, examining if it is a mobile communication device in the power range of the other communication network switch device. If it is not, inquiring if it is permissible to call the mobile communication device to be communicated by using the cable telephony network 4. Otherwise, inquiring if the mobile communication device to be communicated can be connected. If the mobile communication device to be communicated can be connected, the module block 65 through line 8 switches the call to the cable telephony network 4 until the call is over. If the mobile communication device to be connected can not be connected, inquiring if it is permissible to have call waiting or three-way call. If it is permissible, having the call waiting or three-way call. If it is not, informing the internal cable telephony 5 of the communication network switch device 3 that it is busy. When the call waiting is just over, the module block 65 recovers the use of the last system for connection.

Figures 1, 10A:
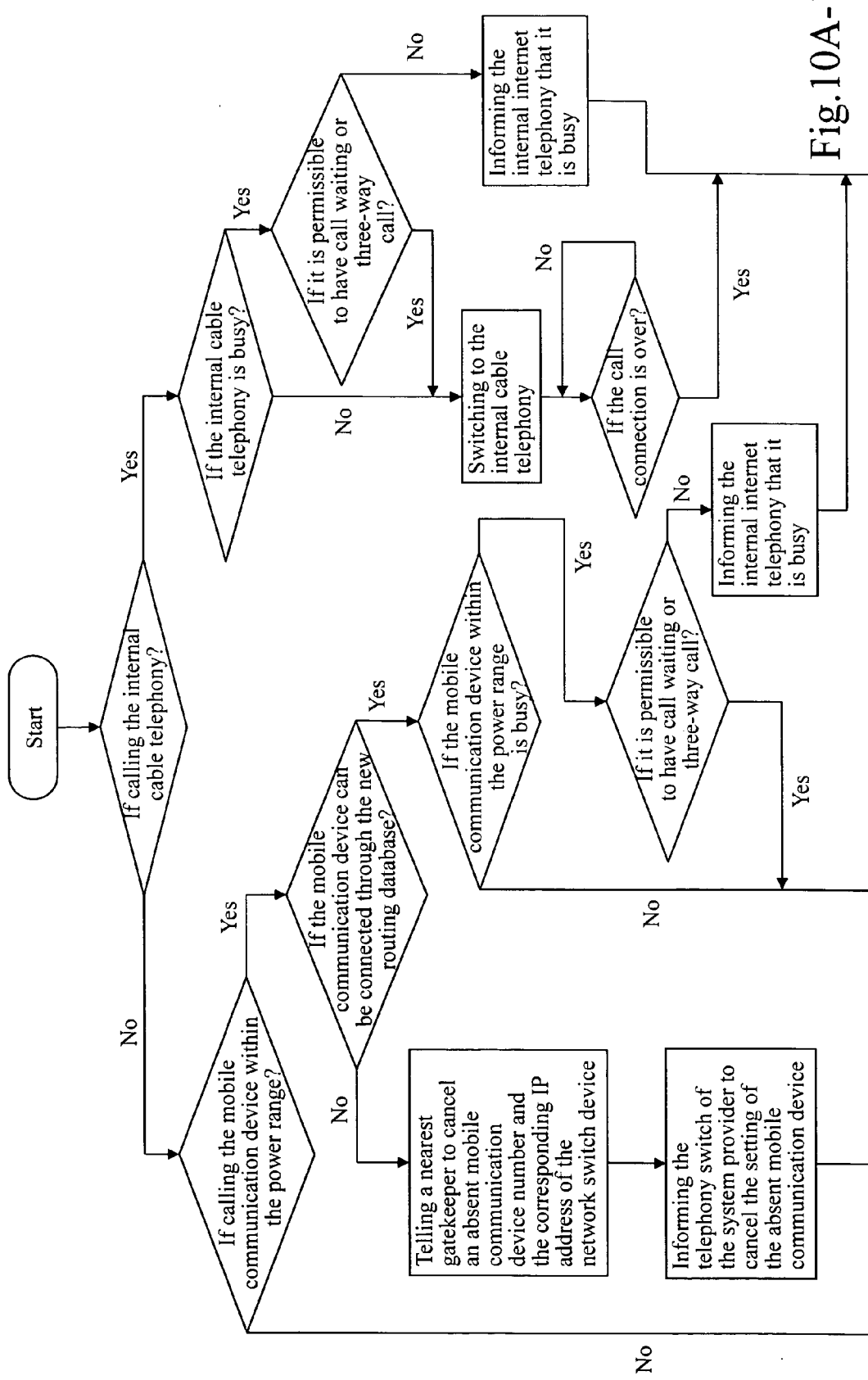
FIG. 10A and FIG. 10B illustrate a flow chart of FIG. 4 showing a method that the internal internet telephony of the communication network switch device calls the internal mobile communication device or cable telephony, the external cable telephony or internet telephony, and the internal mobile communication device, cable telephony or internet telephony of the communication network switch device at the other end.
Figures 2, 10A:
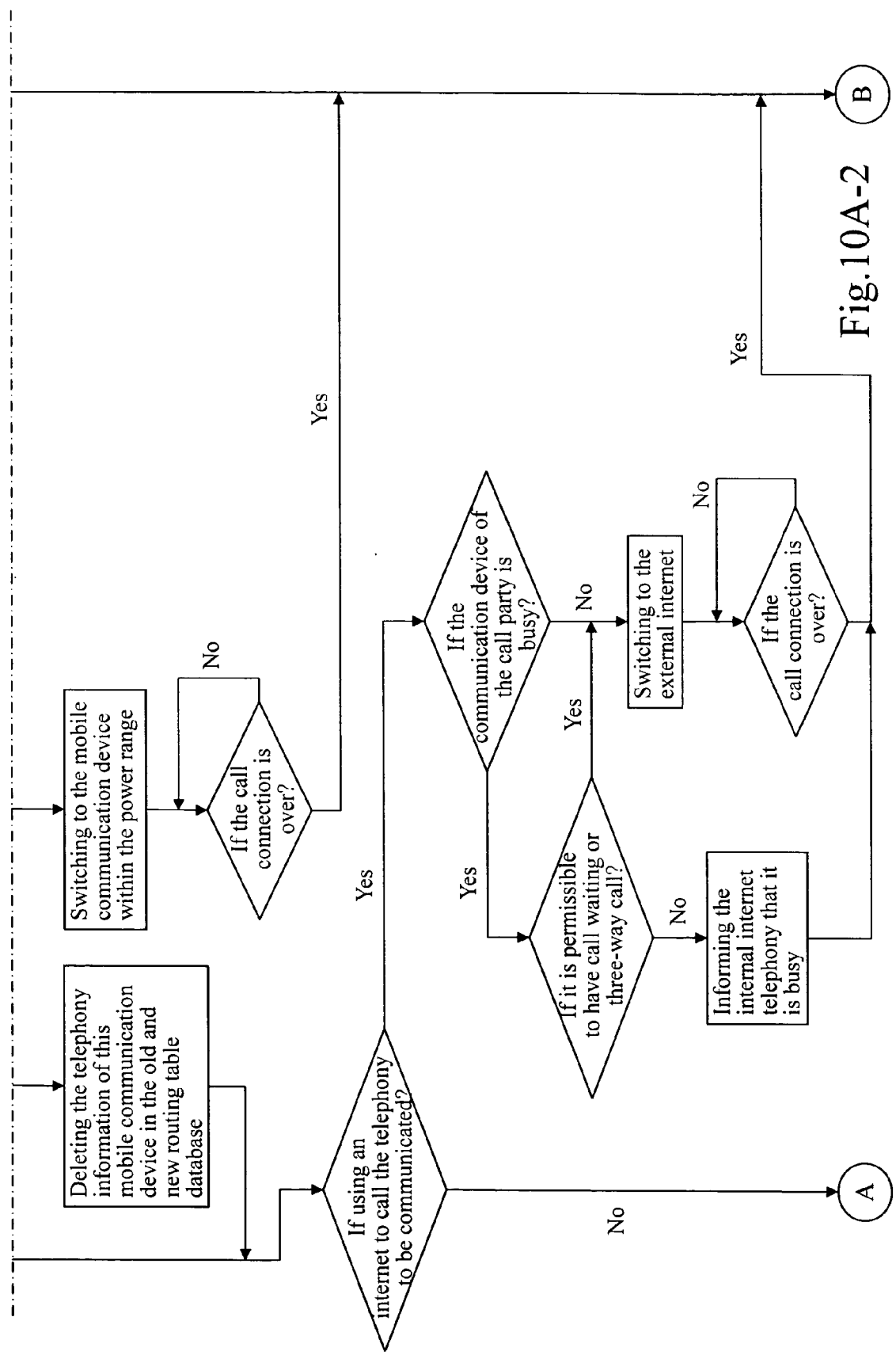
Figures 2, 10B:
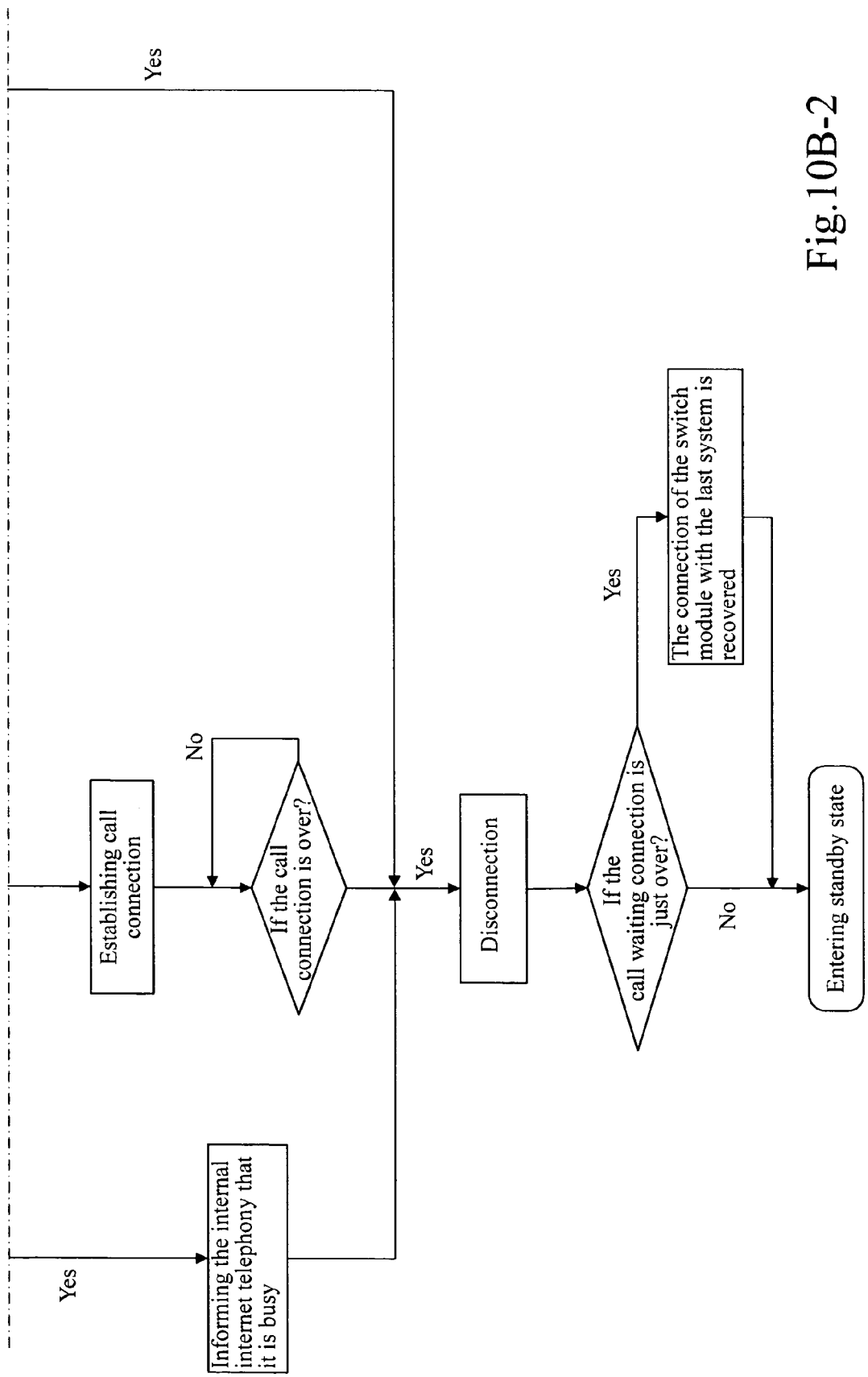

FIG. 10A and FIG. 10B illustrate a flow chart showing the method that the internet telephony of the communication network switch device calls the internal mobile communication device or cable telephony, the external cable telephony or internet telephony, and the internal mobile communication device, cable telephony or internet telephony of the communication network switch device at the other end.

1. Referring to FIG. 2, the data flow from the internal internet telephony 7 of the communication network switch device 3 to the internal cable telephony 5 is as follows:

The internal internet telephony 7 of the communication network switch device 3 through line 15 reaches the module block 67, and through route 91 reaching the module block 65, through route 90 reaching the module block 66, and at last through line 10 reaching the module block 5.

2. Referring to FIG. 1 and FIG. 2, the data flow from the internal internet telephony 7 of the communication network switch device 3 to the internal mobile communication device 1 is as follows:

The internal internet telephony 7 of the communication network switch device 3 through line 15 reaches the module block 67, and then through 91 reaching the module block 65, through route 86 reaching the module block 63, and through route 83 reaching the module block 61, through the antenna 81 of the short-range wireless network system 1 reaching the short-range wireless network system 2, or through route 84 reaching the module block 62 and then through the antenna 82 of the short-range wireless network system 2 reaching the short-range wireless network system 2, at last reaching the assigned mobile communication device 1.

3. Referring to FIG. 2, the data flow from the internal internet telephony 7 of the communication network switch device 3 using the external internet 6 of the communication network switch device 3 to the other remote communication terminal is as follows:

The internal internet telephony 7 of the communication network switch device 3 through line 15 reaches the module block 67, and through route 91 reaching the module block 65, through route 89 reaching the module block 67, and through line 13 reaching the module block 6.

4. Referring to FIG. 2, the data flow from the internal internet telephony 7 of the communication network switch device 3 using the external cable telephony network 4 of the communication network switch device 3 reaches the other remote communication terminal is as follows:

The internal internet telephony 7 of the communication network switch device 3 through line 15 reaches the module block 67, and through route 91 reaching the module block 65, through route 88 reaching the module block 66, and through line 8 reaching the module block 4.

5. Referring to FIG. 2 and FIG. 10A, when the internal internet telephony 7 uses the communication network switch device 3 to call the communication terminal, at first the module block 65 of the communication network switch device 3 determines the communication route. If the called communication terminal is the internal cable telephony 5, examining if the internal cable telephony 5 is busy. If it is not, the module block 65 through line 10 switches the call to the internal cable telephony 5 until the call is over. If it is busy, inquiring if it is permissible to have a call waiting or three-way call. If it is permissible, having the call waiting or three-way call. Otherwise, informing the internal internet telephony 7 of the communication network switch device 3 that it is busy.

6. Referring to FIG. 2 and FIG. 10A, if the called communication terminal is the other mobile communication device in the power range of the communication network switch device 3, examining if the mobile communication device can be connected through the new routing table database. If it is not, executing the following three things: a. using the specific routing protocol to tell the nearest gatekeeper to cancel the phone number of the absent mobile communication device 1 and its IP Address corresponding to the communication network switch device 3; b. informing the nearest telephony switch of the system provider to cancel the telephone setting of the mobile communication device, and telling the mobile communication device 1 the use time; c. deleting the telephone information of the mobile communication device in the old and new routing table database. Otherwise, examining if the mobile communication device in the power range is busy. If it is not busy, the module block 65 through route 86 switches the call to the mobile communication device 1 until the call is over. If it is busy, inquiring if it is permissible to have call waiting or three-way call. If it is permissible, having the call waiting or three-way call. Otherwise, informing the internal internet telephony 7 of the communication network switch device 3 that it is busy.

7. Referring to FIG. 2 and FIG. 10A, if the called communication terminal is a remote communication device required to use the internet 6, examining if the remote communication device is busy. If it is not, the module block 65 through line 13 switches the call to the internet 6 until the call is over. If it is busy, inquiring if it is permissible to have call waiting or three-way call. If it is permissible, having the call waiting or three-way call. Otherwise, informing the internal internet telephony 7 of the communication network switch device 3 that it is busy.

8. Referring to FIG. 2 and FIG. 10B, if the called communication terminal is a remote communication device required to use the cable telephony network 4, examining if the cable telephony line 8 to the external is busy. If it is, informing the internal internet telephony 7 of the communication network switch device 3 that it is busy. Otherwise, examining if calling the other mobile communication device. If it is not, examining if the cable telephony 4 can be used to call the mobile communication device to be communicated. If it is not, informing the internal internet telephony 7 of the communication network switch device 3 that it is busy. Otherwise, examining if the phone line to be communicated can be connected. If the phone line to be communicated can be connected, the module block 65 through line 8 switches the call to the cable telephony network 4 until the call is over. If the mobile communication device to be communicated can not be connected, inquiring if it is permissible to have a call waiting or three-way call. If it is permissible, having the call waiting or three-way calls. If it is not, informing the internal internet telephony 7 that it is busy. If calling the other mobile communication device, examining if it is a mobile communication device in the power range of the other communication network switch device. If it is not, inquiring if the cable telephony network 4 can be used to call the mobile communication device to be communicated. Otherwise, inquiring if the mobile communication device to be communicated can be connected. If the mobile communication device to be communicated can be connected, the module block 65 through line 8 switches the call to the cable telephony network 4 until the call is over. If the mobile communication device to be communicated can not be connected, inquiring if it is permissible to have call waiting or three-way call. If it is permissible, having the call waiting or three-way call. If it is not permissible, informing the internal internet telephony 7 of the communication network switch device 3 that it is busy. If the call waiting is just over, the module block 65 recovers the use of the last system for connection.

9. When the functions of FIG. 9A, FIG. 9B, FIG. 10A and FIG. 10B are combined to form a multifunctional telephony, which can be used as the cable telephony 5 and the internet telephony 7. When dialing phone numbers of the mobile communication device and the cable telephony, the multifunctional telephony through line 10 switches the call to the communication network switch device 3. When dialing the phone number of the internet telephony, the multifunctional telephony switches the call through line 15 to the communication network switch device 3, and reaching the communication terminal to be communicated through communication network switch device 3.

Figures 1, 11A:
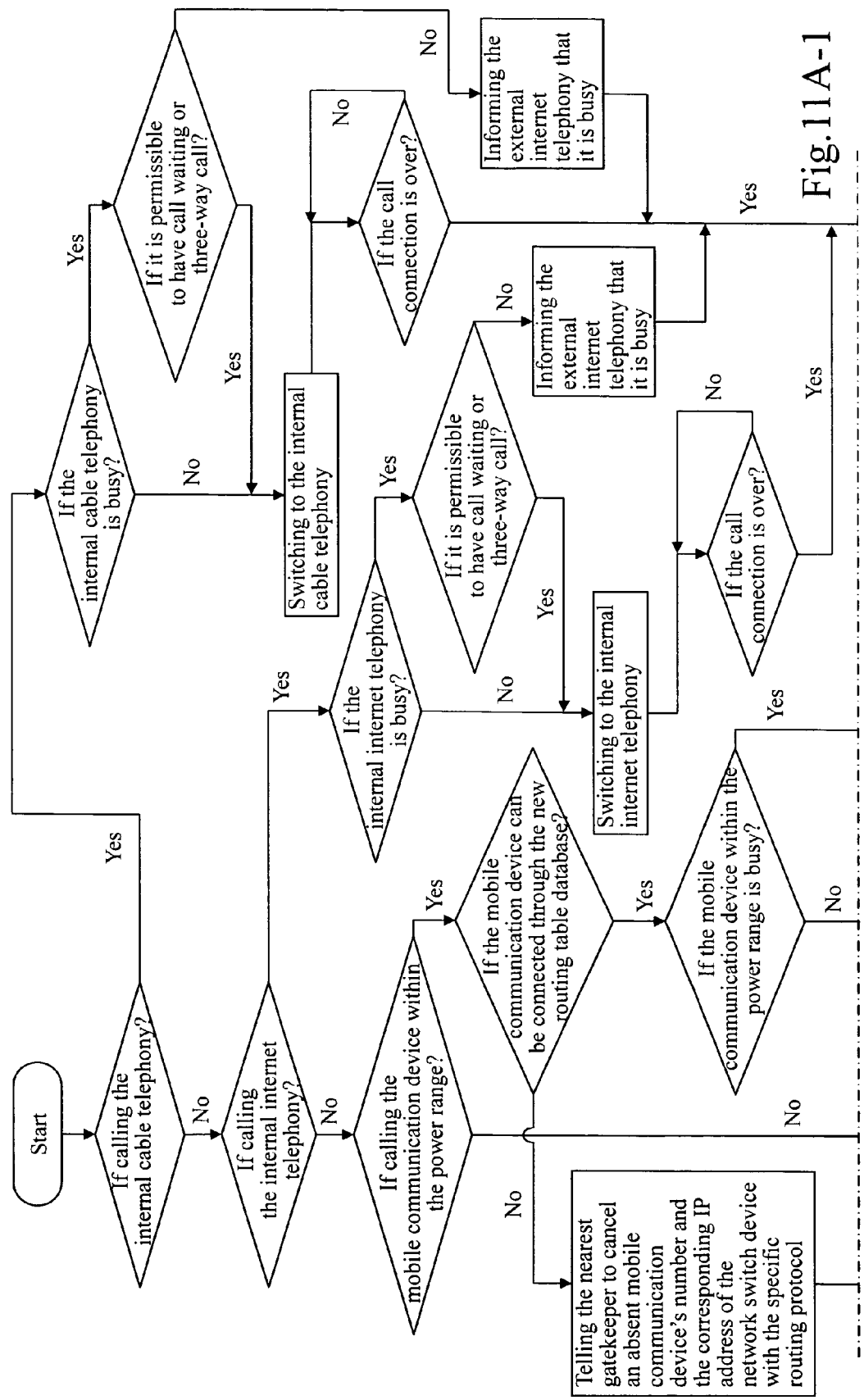
FIG. 11A and FIG. 11B illustrate a flow chart of FIG. 4 showing the external internet telephony or the internal mobile communication device, cable telephony or internet telephony of the communication network switch device at the other end call the internal mobile communication device, cable telephony or internet telephony of the communication network switch device.
Figures 2, 11A:
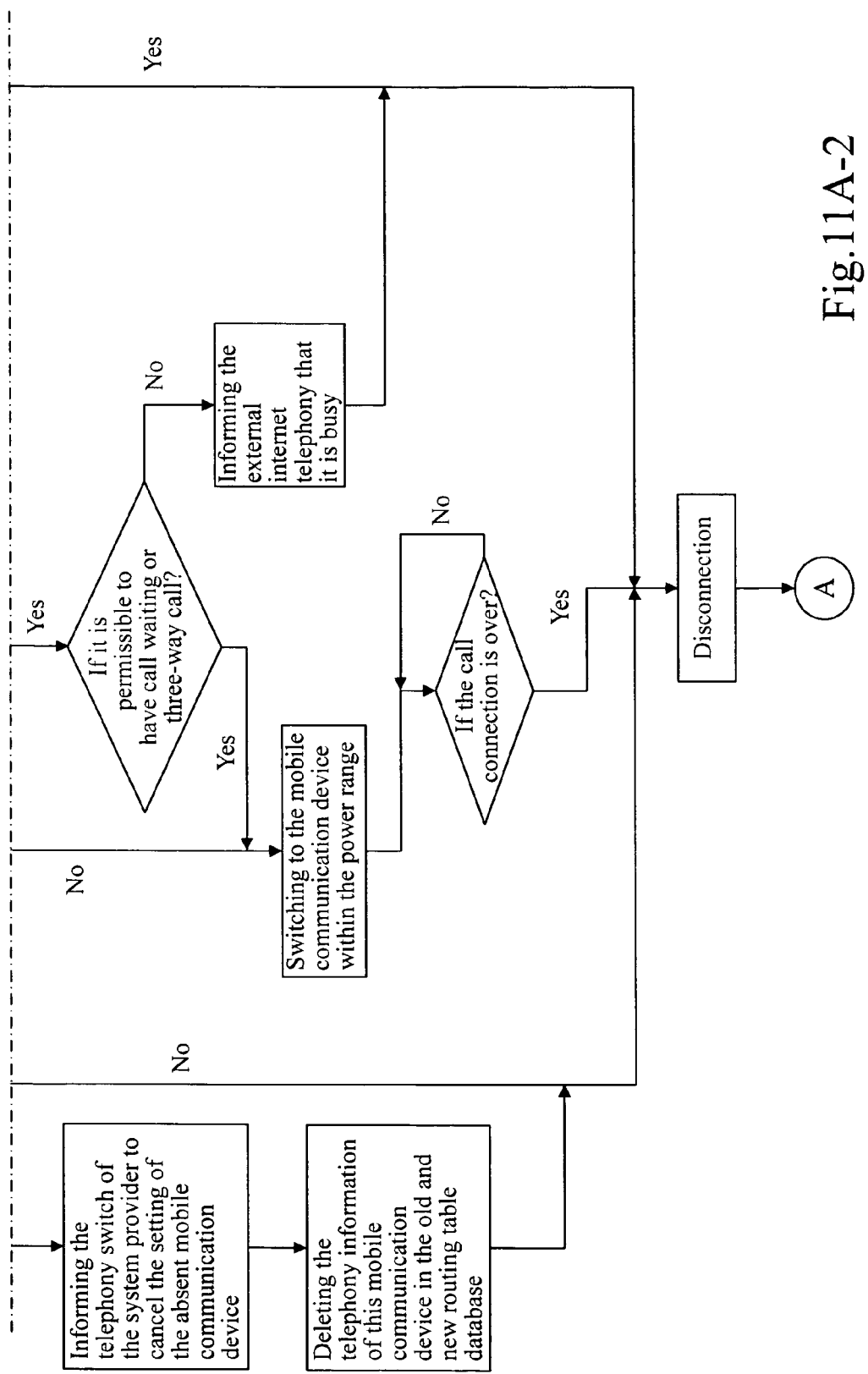
Figure 11B:
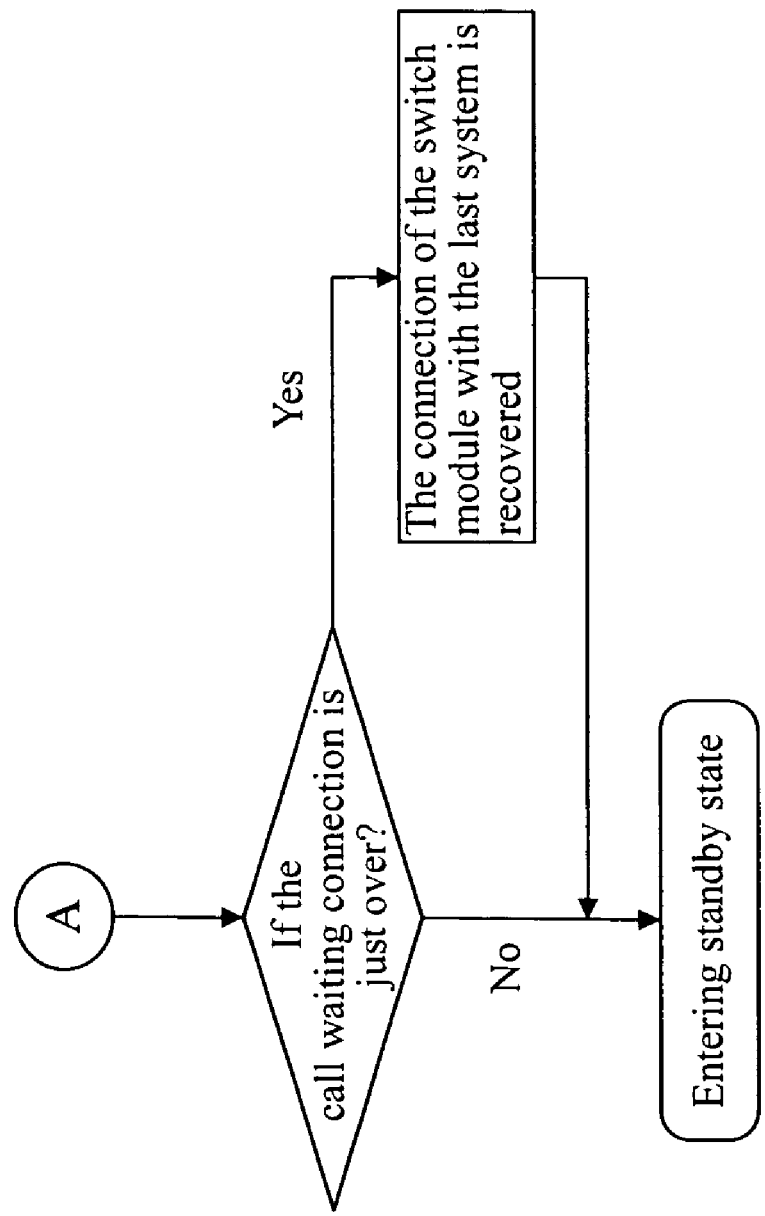

FIG. 11A and FIG. 11B illustrate a flow chart showing a method that the external internet telephony or the internal mobile communication device, cable telephony or internet telephony of the communication network switch device at the other end calls the internal mobile communication device, cable telephony or internet telephony of the communication network switch device.

1. Referring to FIG. 2, the data flow from the external internet 6 of the communication network switch device 3 to the internal cable telephony 5 is as follows:

The external internet 6 of the communication network switch device 3 through line 13 reaches the module block 67, and through route 89 reaching the module block 65, through route 90 reaching the module block 66, at last through line 10 reaching the module block 5.

2. Referring to FIG. 2, the data flow from the external internet 6 of the communication network switch device 3 to the internal internet telephony 7 is as follows:

The external internet 6 of the communication network switch device 3 through line 13 reaches the module block 67, and through route 89 reaching the module block 65, through route 91 reaching the module block 67, and at last through line 15 reaching the module block 7.

3. Referring to FIG. 1 and FIG. 2, the data flow from the external internet 6 of the communication network switch device 3 to the internal mobile communication device 1 is as follows:

The external internet 6 of the communication network switch device 3 through line 13 reaches the module block 67, and through route 89 reaching the module block 65, through route 86 reaching the module block 63, through route 83 reaching the module block 61 and reaching the antenna 81 of the short-range wireless network system 1, or through route 84 reaching the module block 62 and reaching the antenna 82 of the short-range wireless network system 2, and at last through the short-range wireless network system 2 reaching the module block 1.

4. Referring to FIG. 2 and FIG. 11A, when the telephone of the external internet 6 uses the communication network switch device 3 calls the internal communication terminal, at first the module block 65 of the communication network switch device 3 determines the communication route. If the called communication terminal is the internal cable telephony 5, examining if the internal cable telephony 5 is busy. If it is not, the module block 65 through line 10 switches the call to the internal cable telephony 5 until the call is over. If it is busy, inquiring if it is permissible to have call waiting or three-way call. If it is permissible, having the call waiting or three-way call. Otherwise, informing the telephone of the external internet 6 that it is busy.

5. Referring to FIG. 2 and FIG. 11A, if the called communication terminal is the internal internet telephony 7, examining if the internal internet telephony 7 is busy. If it is not, the module block 65 through line 15 switches the call to the internal internet telephone 7 until the call is over. If it is busy, inquiring If it is permissible to have call waiting or three-way call. If it is permissible, having the call waiting or three-way call. Otherwise, informing the telephone of the external internet 6 that it is busy.

6. Referring to FIG. 2 and FIG. 11A, if the called communication terminal is a mobile communication device 1 in the power range of the communication network switch device 3, examining if the mobile communication device 1 can be connected through the new routing table database. If it is not, executing the following three things: a. using the specific routing protocol to tell the nearest gatekeeper to cancel the phone number of the absent mobile communication device 1 and its IP address corresponding to the communication network switch device 3; b. informing the nearest telephony switch of the system provider to cancel the telephone setting of the mobile communication device 1, and telling the mobile communication device 1 the use time; c. deleting the telephone information of the mobile communication device in the old and new routing table database. Otherwise, examining if the mobile communication device in the power range is busy. If it is not busy, the module block 65 through route 86 switches the call to the mobile communication device until the call is over. If it is busy, inquiring If it is permissible to have call waiting or three-way call. If it is permissible, having the call waiting or three-way call. Otherwise, informing the telephone of the external internet 6 that it is busy. Referring to FIG. 11B, if the inserting call is just over, the module block 65 recovers the use of the last system for connection.

Figures 1, 12A:
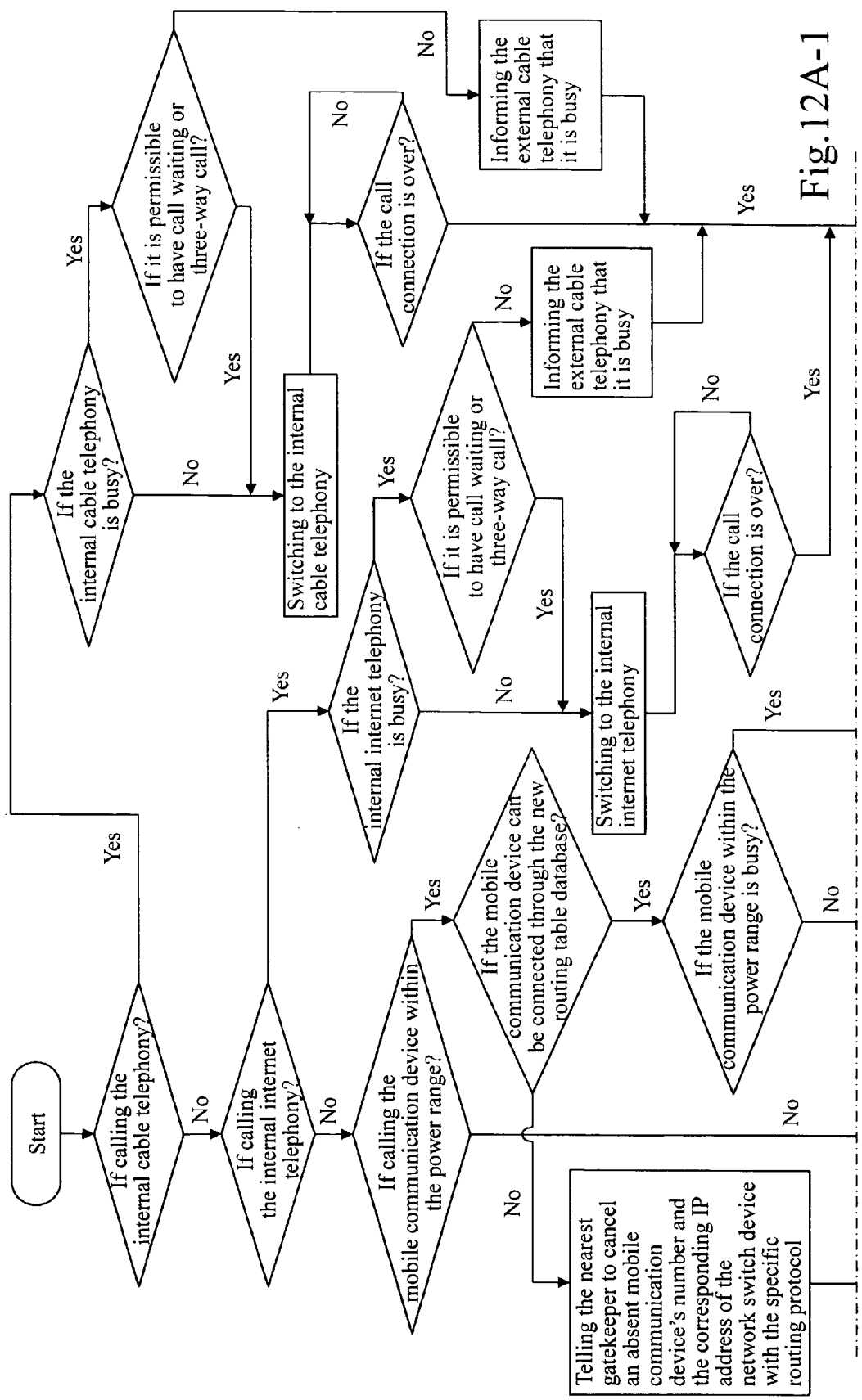
FIG. 12A and FIG. 12B illustrate a flow chart of FIG. 4 showing a method that the external cable telephony or the internal mobile communication device, cable telephony or internet telephony of the communication network switch device at the other end calls the internal mobile communication device, cable telephony or internet telephony of the communication network switch device.
Figures 2, 12A:
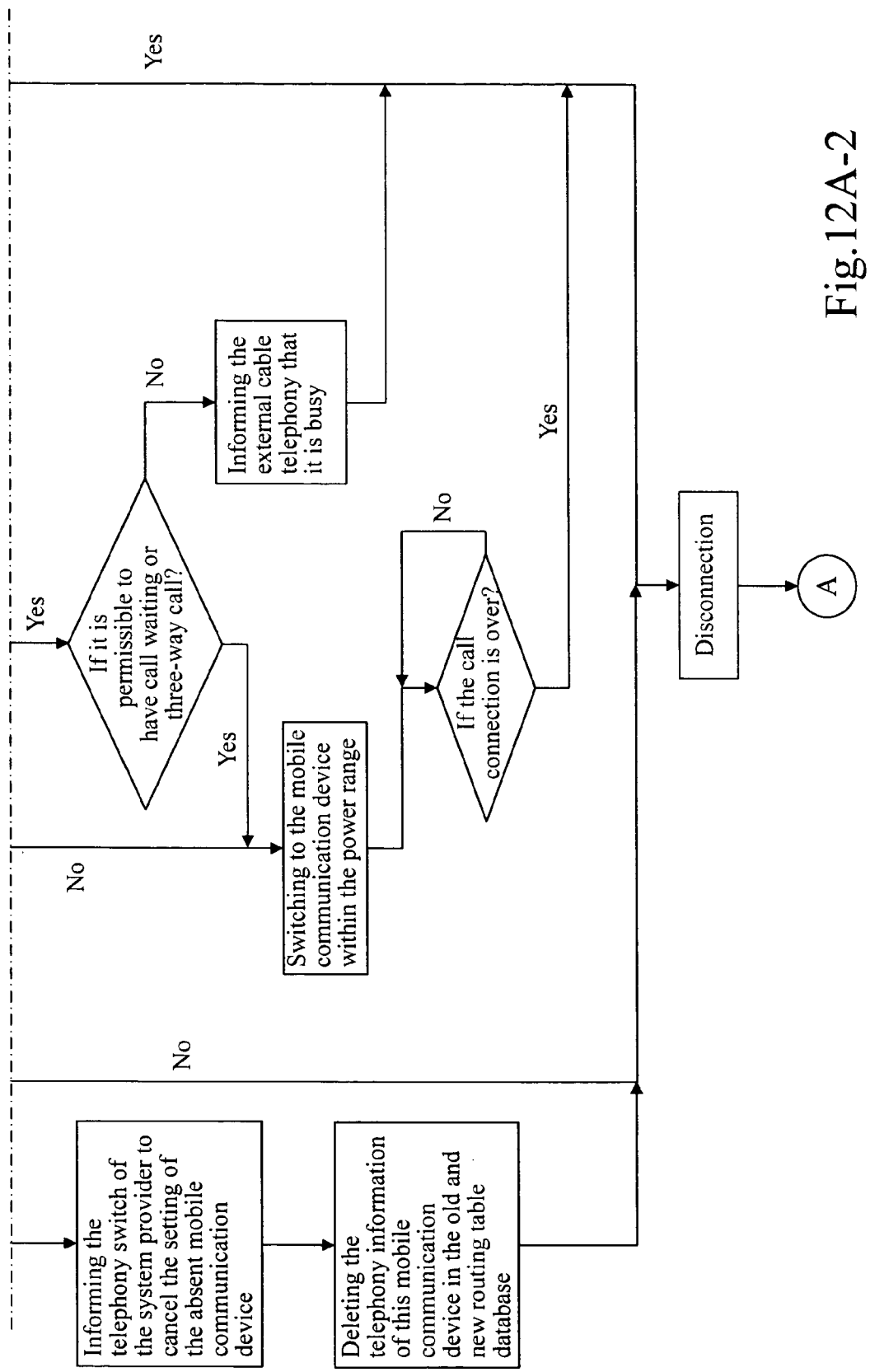
Figure 12B:
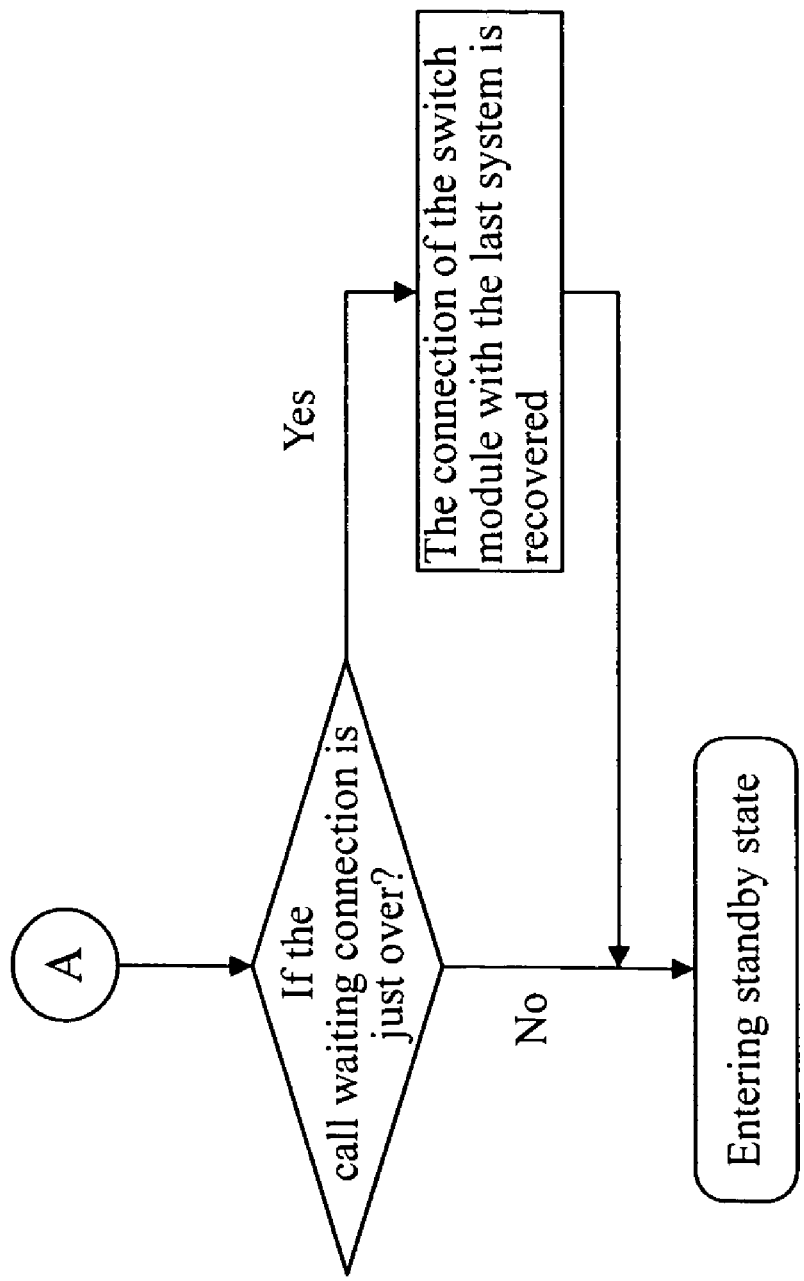

FIG. 12A and FIG. 12B illustrate a flow chart showing a method that the external cable telephony or the internal mobile communication device, cable telephony or internet telephony of the communication network switch device at the other end call the internal mobile communication device, cable telephony or internet telephony of the communication network switch device.

1. Referring to FIG. 2, the data flow from the external cable telephony network 4 of the communication network switch device 3 to the internal cable telephony 5 is as follows:

The external cable telephony network 4 of the communication network switch device 3 through line 8 reaches the module block 66, and through route 88 reaches the module block 65, through route 90 reaching the module block 66, and at last through line 10 reaching the module block 5.

2. Referring to FIG. 2, the data flow from the external cable telephony network 4 of the communication network switch device 3 to the internal internet telephony 7 is as follows:

The external cable telephony network 4 of the communication network switch device 3 through line 8 reaches the module block 66, and through route 88 reaching the module block 65, through route 91 reaching the module block 67, and at last through line 15 reaching the module block 7.

3. Referring to FIG. 1 and FIG. 2, the data flow from the external cable telephony network 4 of the communication network switch device 3 to the internal mobile communication device 1 is as follows:

The external cable telephony network 4 of the communication network switch device 3 through line 8 reaches the module block 66, through route 88 reaching the module block 65, through route 86 reaching the module block 63, and through route 83 reaching the module block 61 and then reaching the antenna 81 of the short-range wireless network system 1, or through route 84 reaching the module block 62 and reaching the antenna 82 of the short-range wireless network system 2, and at last through the short-range wireless network 2 reaching the module block 1.

4. Referring to FIG. 2 and FIG. 12A, when the telephone of the external cable telephony network 4 uses the communication network switch device 3 to call the internal communication terminal, at first the module block 65 of the communication network switch device 3 determines the communication route. If the called communication terminal is an internal cable telephony 5, examining if the internal cable telephony 5 is busy. If it is not busy, the module block 65 through line 10 switches the call to the internal cable telephony until the call is over. If it is busy, inquiring If it is permissible to have call waiting or three-way call. If it is permissible, having the call waiting or three-way call. Otherwise, informing the telephone of the external cable telephony network 4 that it is busy.

5. Referring to FIG. 2 and FIG. 12A, if the called communication terminal is an internal internet telephony 7, examining if the internal interne telephony 7 is busy. If it is not busy, the module block 65 through line 15 switches the call to the internal internet telephony 7 until the call is over. If it is busy, inquiring If it is permissible to have call waiting or three-way call. If it is permissible, having the call waiting or three-way call. Otherwise, informing the telephone of the external cable telephony network 4 that it is busy.

6. Referring to FIG. 2 and FIG. 12A, if the called communication terminal is a mobile communication device 1 in the power range of the communication network switch device 3, examining if the mobile communication device 1 can be connected through the new routing table database. If it is not, executing the following three things: a. using the specific protocol to tell the nearest gatekeeper to cancel the phone number of the absent mobile communication device 1 and its IP address corresponding to the communication network switch device 3; b. informing the nearest telephony switch of the system provider to cancel the telephone setting of the mobile communication device 1, and telling the mobile communication device 1 the use time; c. deleting the telephone information of the mobile communication device from the old and new routing table database. Otherwise, examining if the mobile communication device in the power range is busy. If it is not, the module block 65 through route 86 switches the call to the mobile communication device 1 until the call is over. If it is busy, inquiring If it is permissible to have call waiting or three-way call. If it is permissible, having the call waiting or three-way call. Otherwise, informing the external cable telephony network 4 that it is busy. Referring to FIG. 12B, if the inserting call is just over, the module block 65 recovers the use of the last system for connection.

7. When the functions of the cable telephony 5, internet telephony 7 and the communication network switch device 3 are combined to form a multifunctional switch telephony, which can be used as the cable telephony 5, internet telephony 7 and the communication network switch device 3. When dialing the phone number of the mobile communication device, the multifunctional telephony switches the call through the short-range wireless network system 2 to the internal mobile communication device 1 of the multifunctional switch telephony, through line 13 reaching the external internet 6, or through line 8 reaching the external cable telephony network 4. When dialing the phone number of the cable telephony or the phone number of the internet, the multifunctional switch telephony switches the call through line 13 to the external internet 6, or through line 8 reaching the external cable telephony network 4. Besides, the multifunctional switch telephony can become a switch device of other communication terminals to be communicated (including mobile communication device 1, the cable telephony 5 and the internet telephony 7).

Figure 13:
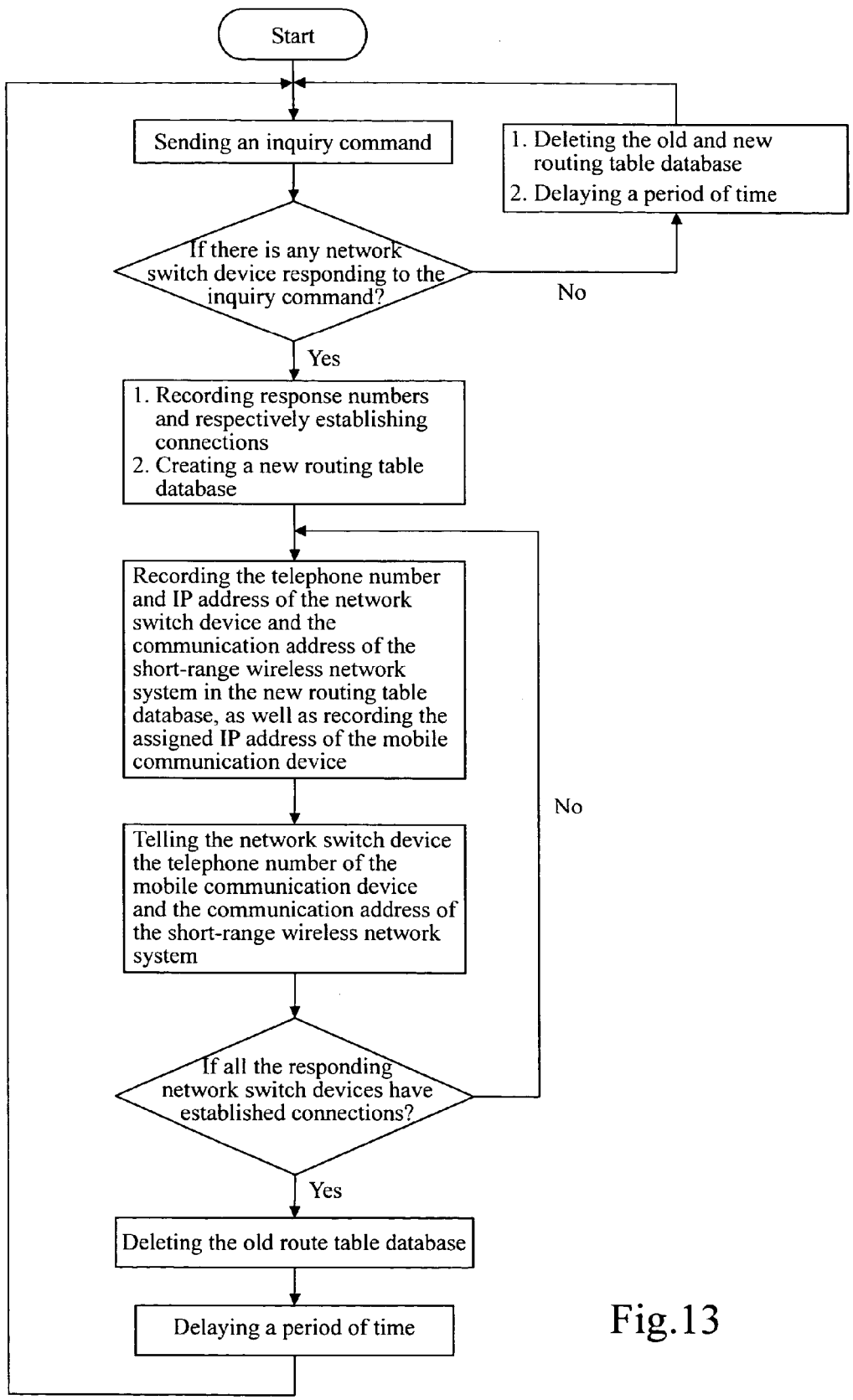
FIG. 13 illustrates a flow chart showing a method that the mobile communication device actively monitors the activity status of the communication network switch device in the power range of FIG. 5.

FIG. 13 is a flow chart showing a method that the mobile communication device actively monitors the activity status of the communication network switch device in the power range. Please also refer to FIG. 1, FIG. 3 and FIG. 5.

1. Referring to FIG. 3, when the mobile communication device 1 starts, the transceiver of the long-range wireless network system of the module block 104, the transceiver of the short-range wireless network system of the module block 105 and the transceiver of the short-range wireless network system 2 of the module block 106 send a sequence of initialization commands to execute the initialization action such that the module block 104, module block 105 and module block 106 are in standby state. The following merely regards the operation of the short-range wireless network system, and the operation of the long-range wireless network system is neglected. Since the operation of the long-range wireless network system is accomplished by the communication protocol itself, the operation of the long-range wireless network system is not the important issue of this invention. There is no more description herein about this.

2. Referring to FIG. 1, FIG. 3 and FIG. 13, the module block 105 and module block 106 of the mobile communication device 1 send an inquiry command first time, through the short-range wireless network system 2 monitoring the number of the communication network switch devices 3 present in the power range, establishing a new routing table database and sequentially writing the information of the communication network switch devices 3 (including the phone numbers, IP addresses and the communication addresses of the short-range wireless network system 1 and the short-range wireless network system 2 of the communication network switch devices 3) in the new routing table database, and recording the assigned IP address of the mobile communication device 1.

3. Referring to FIG. 3 and FIG. 13, the switch module of the module block 102 of the mobile communication device 1 tells the communication network switch device 3 the information of the mobile communication device 1 (including the telephone number and the communication addresses of the short-range wireless network system 1 and the short-range wireless network system 2 of the mobile communication device 1) such that the communication network switch device 3 can write the obtained information in its new routing table database.

4. Referring to FIG. 3 and FIG. 13, the module block 102 of the mobile communication device 1 deletes the old routing table database.

5. Referring to FIG. 3 and FIG. 13, if the module block 102 of the mobile communication device 1 monitors there is no any communication network switch device 3 present in the power range, deleting the content of the routing table database.

6. Referring to FIG. 3 and FIG. 13, since the mobile communication device 1 actively monitors the activity status of the communication network switch device 3 in the power range, the module block 105 and module block 106 of the mobile communication device 1 would constantly or non-constantly send an inquiry command to ascertain that the activity status of the communication network switch device 3 in the power range.

7. In FIG. 13, under the circumstance with a multitude of mobile communication devices, it is necessary to prevent the mobile communication device 1 from being regarded as the communication network switch device 3 of the other mobile communication device 1.

Figure 14:
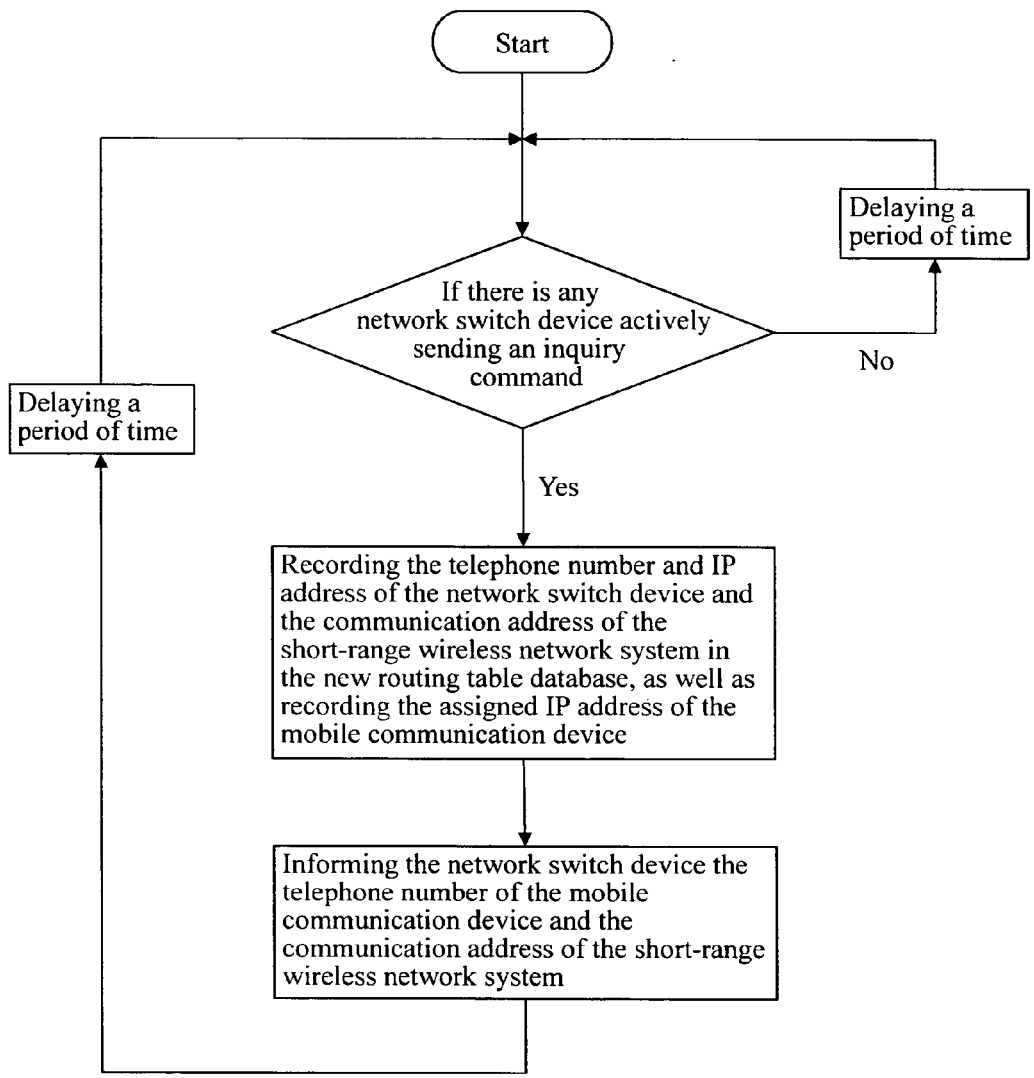
FIG. 14 illustrates a flow chart showing a method that the mobile communication device passively monitors the activity status of the communication network switch device in the power range of FIG. 5.

FIG. 14 illustrates a flow chart showing a method that the mobile communication device passively monitors the activity status of the communication network switch device in the power range. Please also refer to FIG. 1, FIG. 3 and FIG. 5.

1. Referring to FIG. 1, FIG. 3 and FIG. 14, when the module block 102 of the mobile communication device 1 receives the inquiry command sent from the communication network switch device 3, recording the phone number, IP address and the communication addresses of the short-range wireless network system 1 and the short-range wireless network system 2 of the communication network switch device 3 in the new routing table database of the mobile communication device 1, and recording the assigned IP address of the mobile communication device 1.

2. Referring to FIG. 1, FIG. 3 and FIG. 14, the mobile communication device 1 responds to the communication network switch device 3 to tell the phone number and the communication addresses of the short-range wireless network system 1 and the short-range wireless network system 2 of the mobile communication device 1.

Figures 1, 15A:
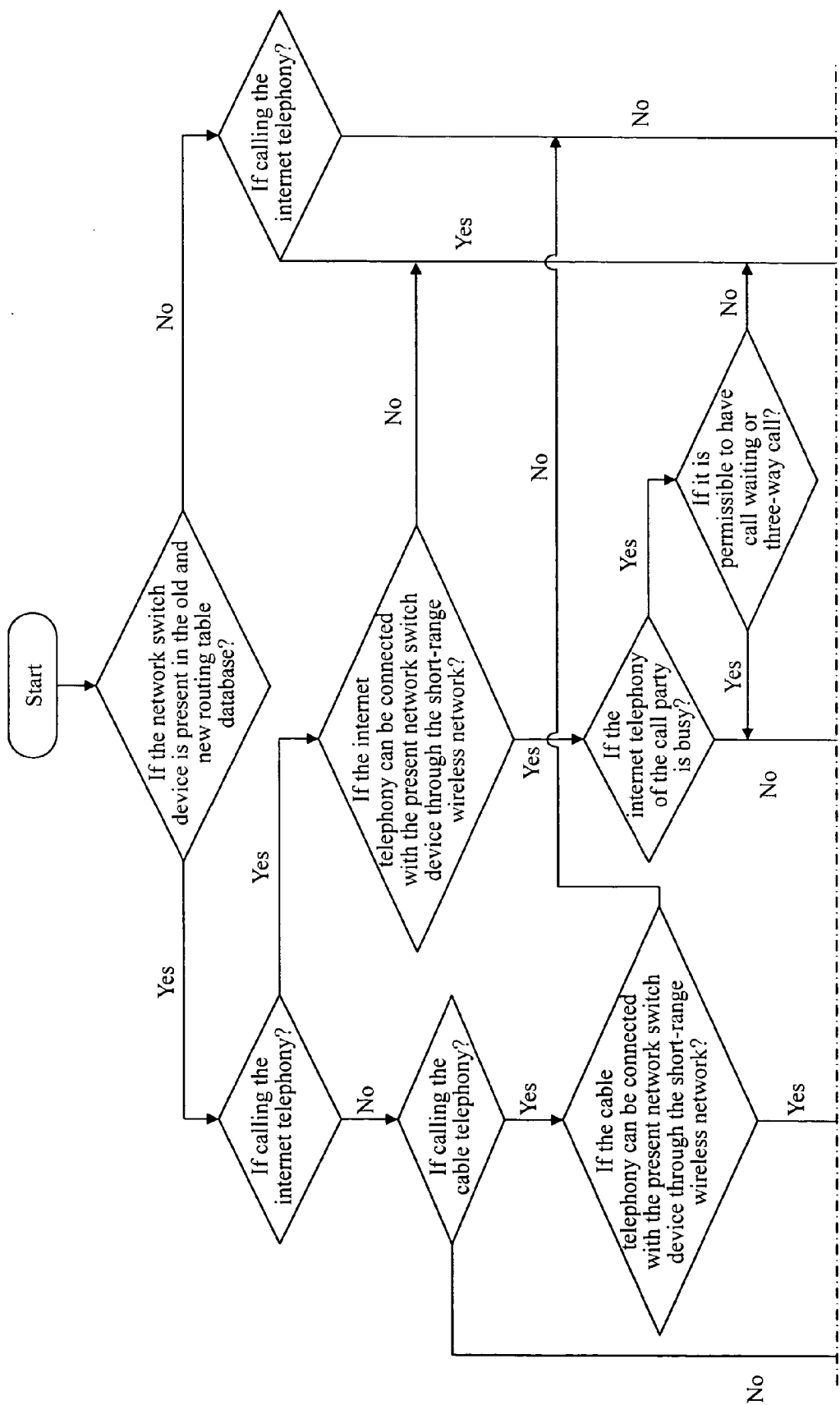
FIG. 15A and FIG. 15B illustrate a flow chart showing a method that the mobile communication device communicates with the external of FIG. 5.
Figures 2, 15A:
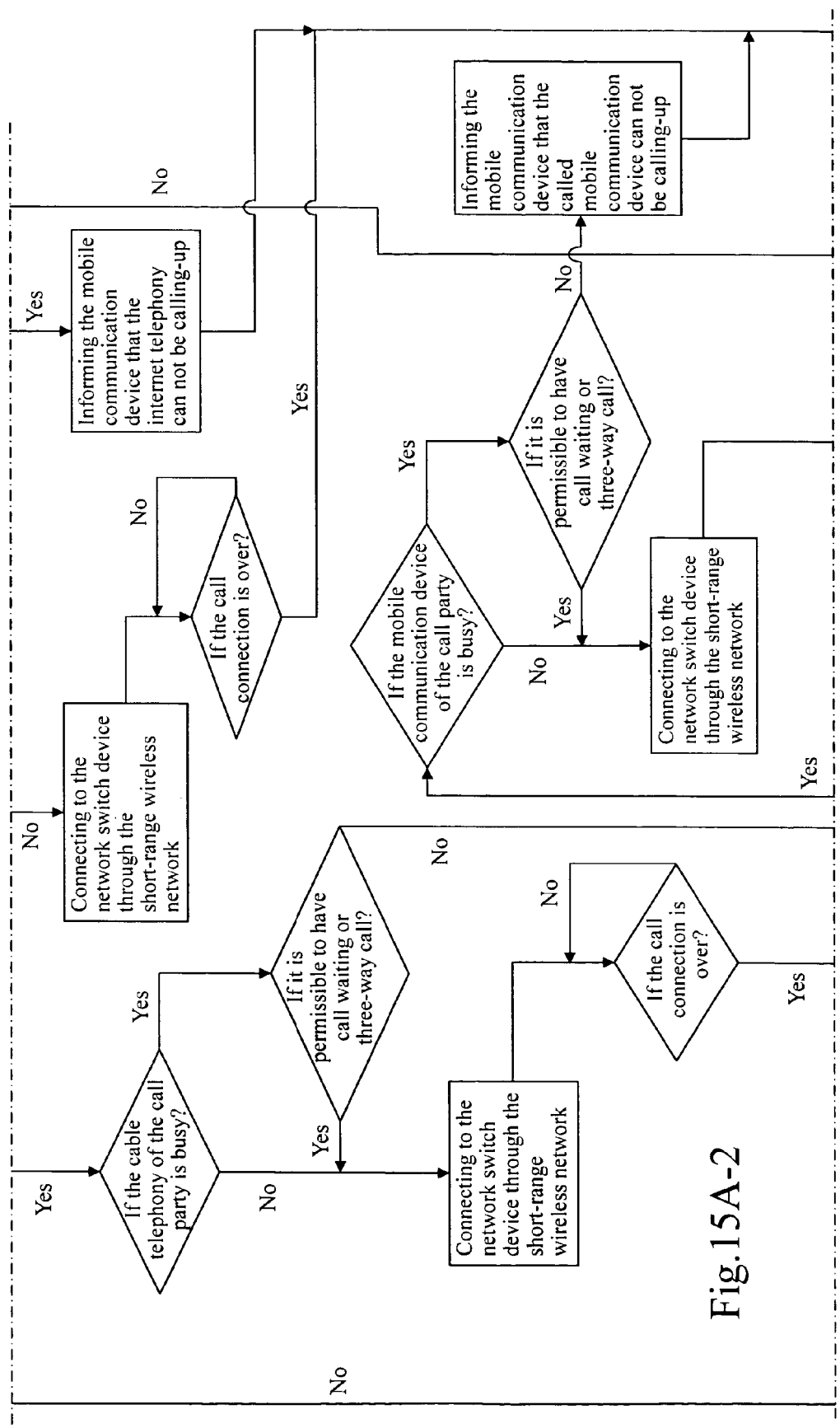
Figures 3, 15A:
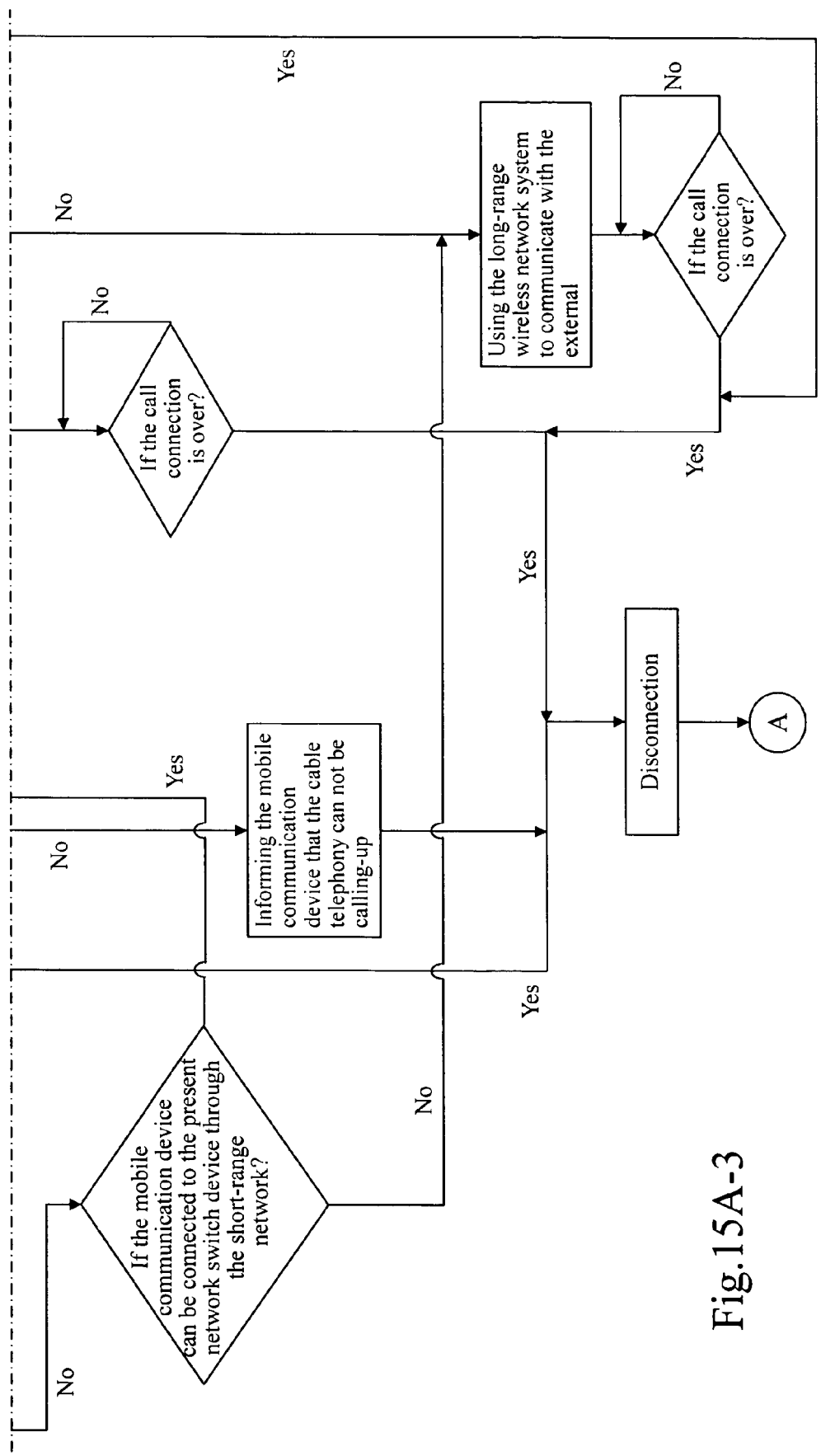
Figure 15B:
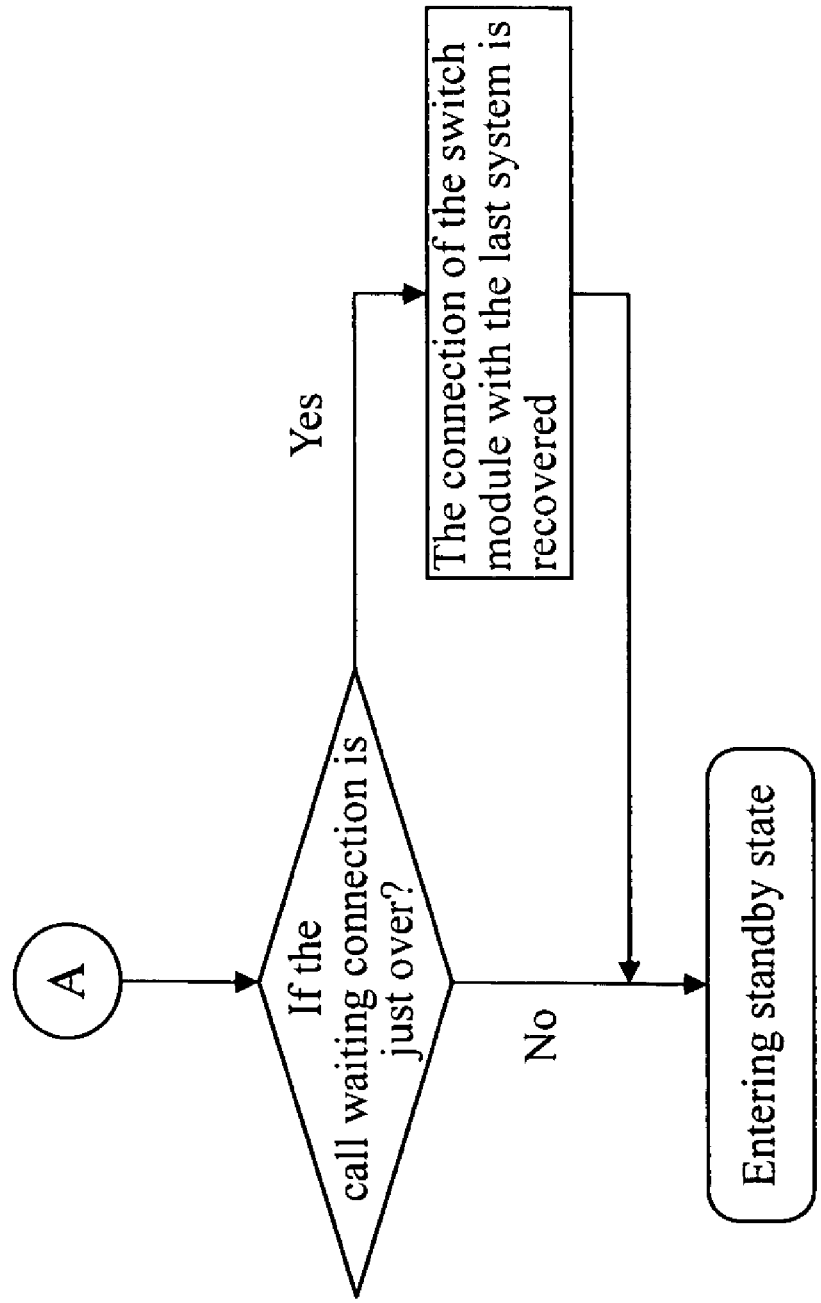

Please refer to FIG. 15 through FIG. 18, and also refer to FIG. 1, FIG. 3 and FIG. 5, which show the data flow from the mobile communication device 1 to the communication network switch device 3. Each flow chart will be described in detail as follows:

FIG. 15A and FIG. 15B illustrate a flow chart showing a method that the mobile communication device communicates with the external.

1. There are two types of data flow from the mobile communication device 1 to the external, respectively A. directly using the long-range wireless network system communicates with the, external; and B. using the communication network switch device 3 as a medium communicates with the external. Since A part is not a part of this invention, there is no more description for it. There are two types of data flow for B part as follows:

a. Referring to FIG. 1 and FIG. 3, if calling the phone number of one part through the short-range wireless network system 1, whose data flow is as follows: the module block 101 of the mobile communication device 1 through route 121 reaches the module block 102, and through route 124 reaching the module block 105, as well as through the antenna 142 of the short-range wireless network system 1 and the short-range wireless network system 2 reaching the communication network switch device 3.

b. Referring to FIG. 1 and FIG. 3, if calling the phone number of one party through the short-range wireless network system 2, whose data flow is as follows: the module block 101 of the mobile communication device 1 through route 121 reaches the module block 102, through route 125 reaching the module block 106, and through the antenna 143 of the short-range wireless network system 2 and the short-range wireless network system 2 reaching the communication network switch device 3.

2. Referring to FIG. 1, FIG. 3 and FIG. 15A, when the mobile communication device 1 would like to communicate with the external, at first the module block 102 needs to examine if the communication network switch device 3 is present in the power range of the mobile communication device 1. If it is not, examining if calling the internet telephony 7. If it is not, using the long-range wireless network system communicates with the external. Otherwise, informing the mobile communication device 1 that the internet telephony 7 can not be connected.

3. Referring to FIG. 1, FIG. 3 and FIG. 15A, if the communication network switch device 3 is present in the power range of the mobile communication device 1, examining if calling the internet telephony 7. If calling the internet telephony 7, examining if the present communication network switch device can connect with the internet telephony through the short-range wireless network system. If it is not, informing the mobile communication device 1 that the internet telephony 7 can not be connected. Otherwise, examining if the internet telephony of the party is busy. If it is not, the module block 102 through route 124 switches the call to the module block 105, and through the antenna 142 of the short-range wireless network system 2 or through route 125 reaching the module block 106 and then through the antenna 143 of the short-range wireless network system 2 reaching the communication network switch device 3 until the call is over. If it is busy, inquiring If it is permissible to have call waiting or three-way call. If it is permissible, having the call waiting or three-way call. Otherwise, informing the mobile communication device 1 that the internet telephony 7 can not be connected.

Referring to FIG. 3 and FIG. 15A, if it does not call the internet telephony 7, examining if calling the cable telephony 5. If it is, examining if the present communication network switch device 3 can connect with the cable telephony 5 through the short-range wireless network system. If it is not, using the long-range wireless network system communicates with the external. Otherwise, examining if the cable telephony 5 of the party is busy. If it is not busy, the module block 102 through route 124 switches the call to the module block 105, and through the antenna 142 of the short-range wireless network system 1 or through route 125 reaching the module block 106 and through the antenna 143 of the short-range wireless network system 2 reaching the communication network switch device 3 until the call is over. If the cable telephony 5 of the party is busy, inquiring If it is permissible to have call waiting or three-way call. If it is permissible, having the call waiting or three-way call. Otherwise, informing the mobile communication device 1 that the cable telephony 5 can not be connected. If it does not call the cable telephony 5, examining if the present communication network switch device 3 can connect with the mobile communication device 1 through the short-range wireless network system. If it is not, using the long-range wireless network system communicates with the external. Otherwise, examining if the mobile communication device 1 of the party is busy. If it is not, the module block 102 through route 124 switches the call to the module block 125, and then through the antenna 142 of the short-range wireless network system 1 or through route 125 reaching the module block 106 and through the antenna 143 of the short-range wireless network system 2 reaching the communication network switch device 3 until the call is over. If it is busy, inquiring If it is permissible to have call waiting or three-way call. If it is permissible, having the call waiting or three-way call. Otherwise, informing the mobile communication device 1 that the mobile communication device 1 of the party can not be connected.

5. Referring to FIG. 3 and FIG. 15B, if the inserting call is just over, the module block 102 would recover the use of the last system for connection.

Figure 16:
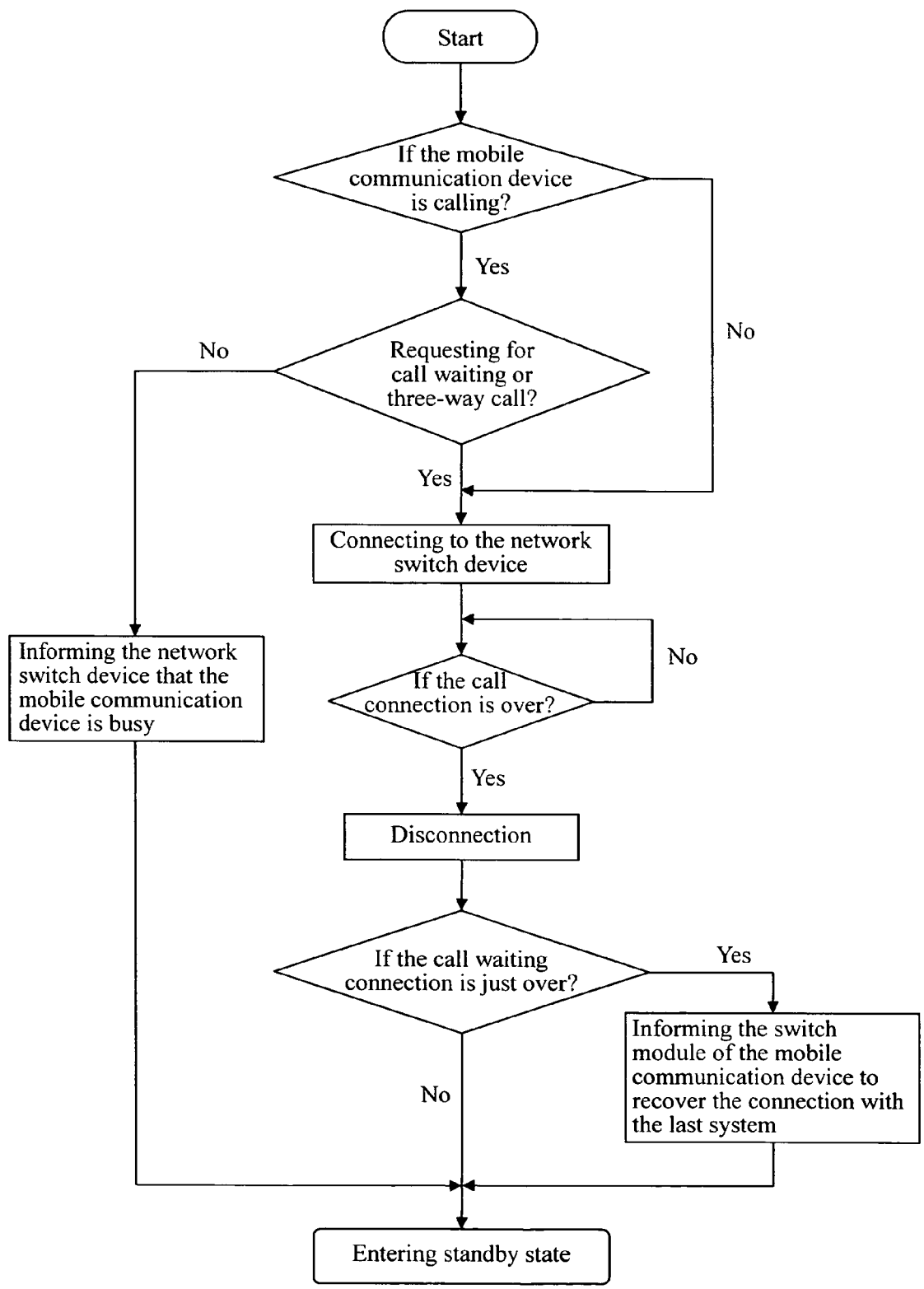
FIG. 16 illustrates a flow chart showing a method that the communication network switch device uses the short-range wireless network system 1 to call the mobile communication device of FIG. 5.

FIG. 16 illustrates a flow chart showing a method that the communication network switch device uses the short-range wireless network system 1 to call the mobile communication device.

1. Referring to FIG. 1 and FIG. 3, the data flow from the communication network switch device 3 to the mobile communication device 1 is as follows: the communication network switch device 3 through the short-range wireless network system 2 and the antenna 142 of the short-range wireless network system 1 reaches the module block 105, through route 124 reaching the module block 102, and through route 121 reaching the module block 101.

2. Referring to FIG. 3 and FIG. 16, when the mobile communication device 1 receives a command for requiring connection from the communication network switch device 3, at first the module block 102 examines if the long-range wireless network system or other short-range wireless network systems of the mobile communication device 1 are being used. If it is not, the module block 102 of the mobile communication device 1 conducts the call until it is over. Otherwise, examining If it is permissible to have call waiting or three-way call. If it is permissible, having the call waiting or three-way call. Otherwise, informing the communication network switch device 3 that the mobile communication device 1 is busy.

3. Referring to FIG. 3 and FIG. 16, if the inserting call is just over, the module block 102 recovers the use of the last system for connection.

Figure 17:
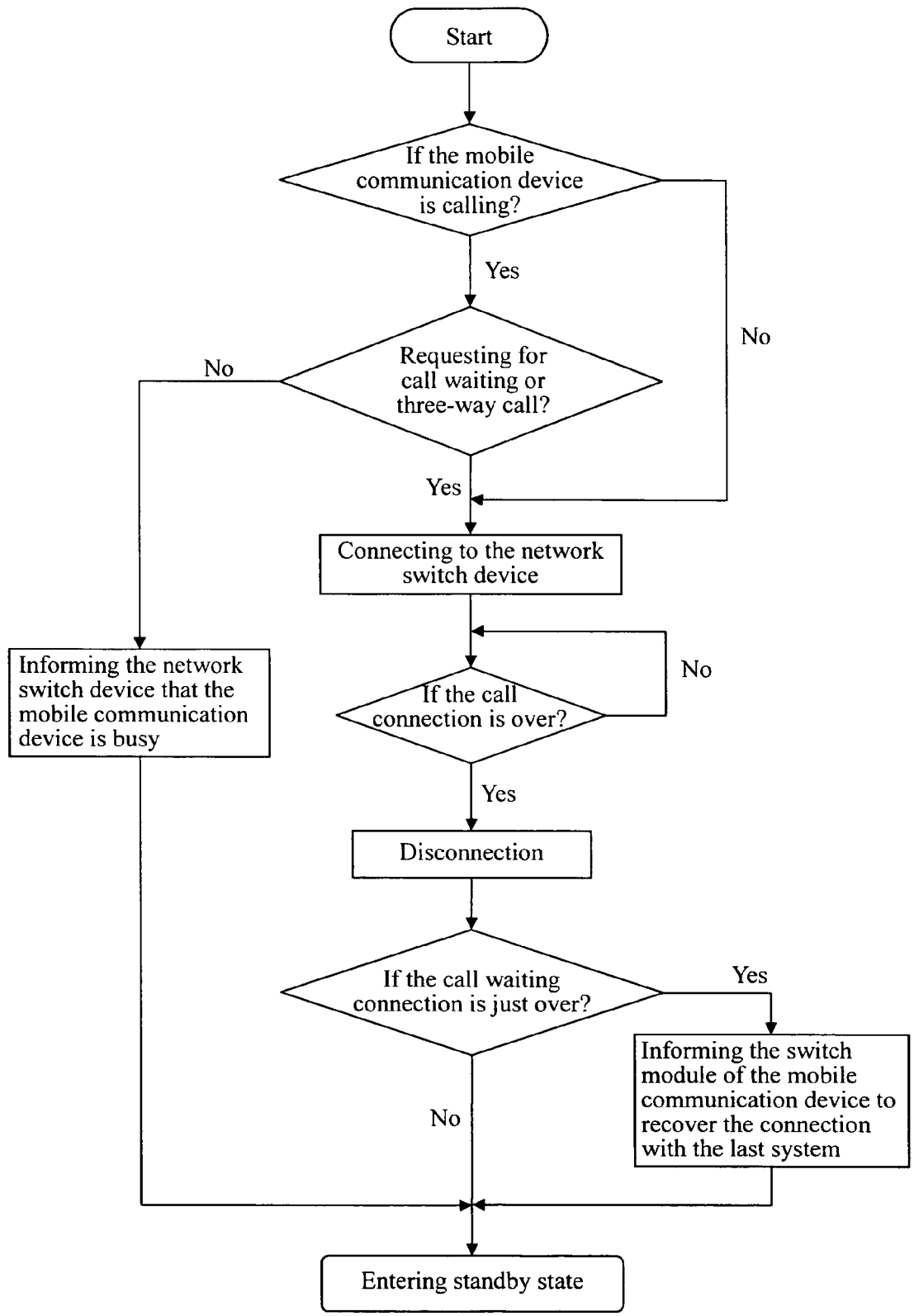
FIG. 17 illustrates a flow chart showing a method that the communication network switch device uses the short-range wireless network system 2 to call the mobile communication device of FIG. 5.

FIG. 17 illustrates a flow chart showing a method that the communication network switch device uses the short-range wireless network system 2 to call the mobile communication device.

1. Referring to FIG. 1 and FIG. 3, the data flow from the communication network switch device 3 to the mobile communication device 1 is as follows: the communication network switch device 3 through the short-range wireless network system 2 and the antenna 143 of the short-range wireless network system 2 reaches the module block 106, through route 125 reaching the module block 1025, and through route 121 reaching the module block 101.

2. Referring to FIG. 3 and FIG. 17, when the mobile communication device 1 receives a command for requiring connection from the communication network switch device 3, at first the module block 102 examines if the long-range wireless network system or other short-range wireless network system of the mobile communication device 1 are busy. If it is not, the module block 102 of the mobile communication device conducts the call until it is over. Otherwise, examining If it is permissible to have call waiting or three-way call. If it is permissible, having the call waiting or three-way call. Otherwise, informing the communication network switch device 3 that the mobile communication device 1 is busy.

3. Referring to FIG. 3 and FIG. 17, if the inserting call is just over, the module block 102 recovers the use of the last system for connection.

Figure 18:
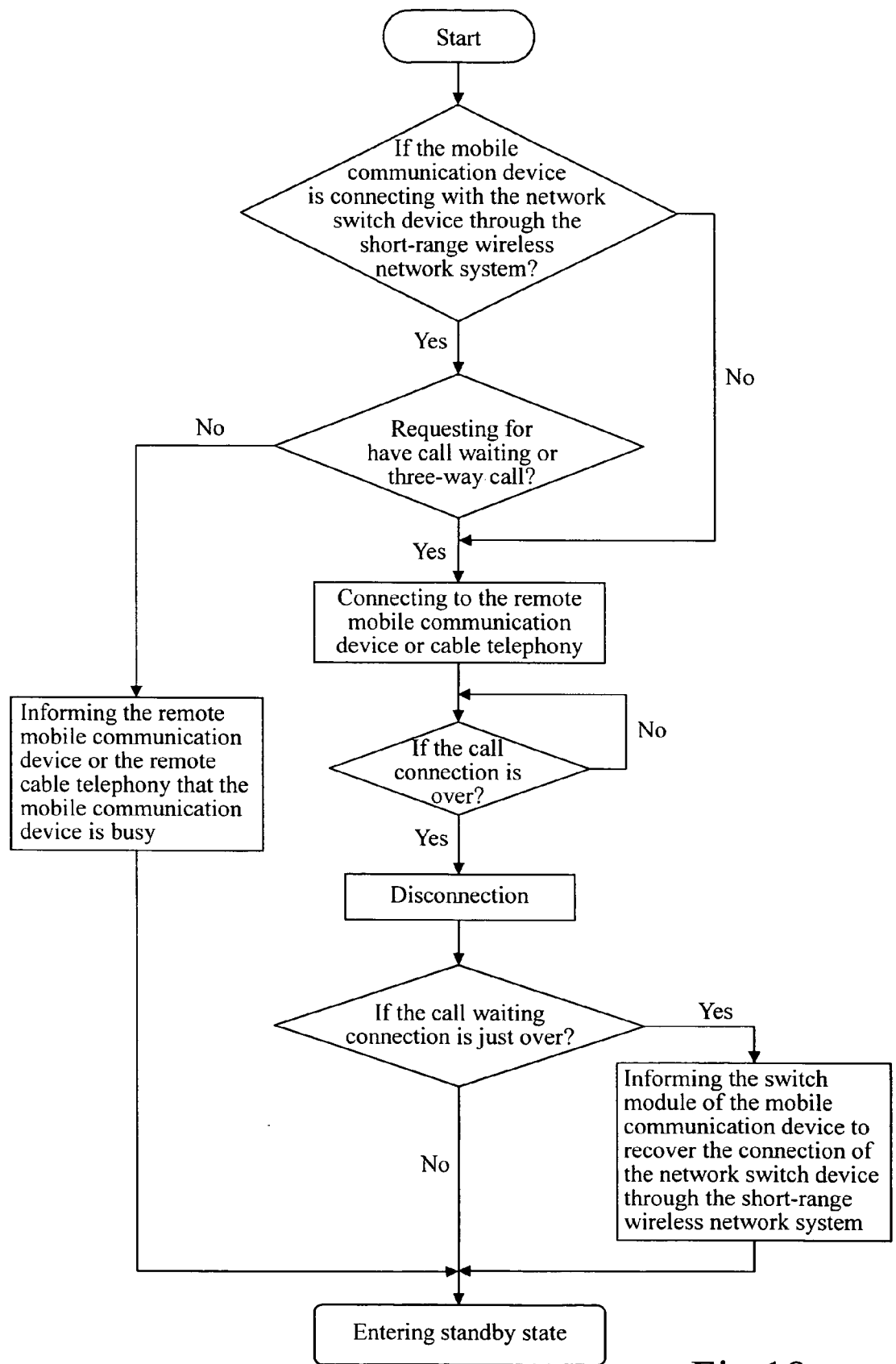
FIG. 18 illustrates a flow chart showing a method that the remote mobile communication device or cable telephony through the long-range wireless network system to call the mobile communication device of FIG. 5.

FIG. 18 illustrates a flow chart showing a method that the remote mobile communication device or cable telephony through the long-range wireless network system to call the mobile communication device.

1. Referring to FIG. 1 and FIG. 3, the data flow from the remote mobile communication device or cable telephony 5 to the mobile communication device 1 is as follows:

The remote mobile communication device through the long-range wireless network system and the antenna 141 of the long-range wireless network system reaches the module block 104, through route 123 reaching the module block 102, and through route 121 reaching the module block 101.

2. Referring to FIG. 1, FIG. 3 and FIG. 18, when the mobile communication device 1 receives a command for requiring connection from the remote mobile communication device or cable telephony 5, at first examining if the short-range wireless network system of the mobile communication device 1 is being used. If it is not, the module block 102 of the mobile communication device 1 conducts the call until it is over. Otherwise, examining If it is permissible to have call waiting or three-way call. If it is permissible, having the call waiting or three-way call. Otherwise, informing the remote mobile communication device or cable telephony 5 that the mobile communication device 1 is busy.

3. Referring to FIG. 3 and FIG. 18, if the inserting call is just over, the module block 102 recovers the use of the last system for connection. Effectiveness of this invention:

In accordance with the communication network switch device and mobile communication device of this invention, this invention effectively improves the conventional techniques, such as overcoming A. the weakness that the communication route of the mobile communication device and the communication route between the mobile communication device and cable telephony require the joint technique of the long-range wireless network system; B. the disadvantage that the mobile communication device and the internet telephony can not communicate with each other. And, this invention obtains the following effects:

When the mobile communication device is in the power range of the communication switch device that is in standby state, the following eight effects can be obtained:

a. The communication between the mobile communication devices can be accomplished by using the cable telephony or internet through the communication network switch device.

b. The communication between the mobile communication device and the internal cable telephony of the communication network switch device at the other end can be accomplished by using the cable telephony or internet through the communication network switch device.

c. The communication between the mobile communication device and the internal internet telephony of the communication network switch device at the other end can be accomplished by using the cable telephony or internet through the communication network switch device.

d. The communication between the mobile communication device and the external cable telephony can be accomplished by using the cable telephony network through the communication network switch device.

e. The communication between the mobile communication device and the external internet telephony can be accomplished by using the internet though the communication network switch device.

f. The communication between the mobile communication device and the internal cable telephony as well as the internet telephony can be accomplished through different short-range wireless network systems. It is free of charge due to only through the short-range wireless network systems, while not through any of the external systems.

g. The communication between the internal cable telephony of any two communication network switch devices can be accomplished by using the internet through the communication network switch device.

h. Since the mobile communication device uses the cable telephony network through the communication network switch device to communicate with the internet, the frequency of the use of the long-range wireless network system is eliminated, and sharing the signal flow passing through the base stations of the mobile communication device. The charged fee of the use can be reduced.

For the foregoing, the communication network switch device 3 and the mobile communication device 1 belong to the equipments with universal architecture. The present invention herein provides a preferred embodiment to prove practicability of this universal architecture. However, the content of this invention is not confined by the preferred embodiment, and therefore limiting the reasonable protection scope of this invention. This preferred embodiment merely uses the Bluetooth wireless system to realize the short-range wireless network system 1 and uses the 802.11 wireless local area network to realize the short-range wireless network system 2. Therefore, the whole system architectures, system operation architectures and the module block diagrams of the communication network switch device 3 and the mobile communication device 1 are the same. The differences therebetween are resided in:

A. The short-range wireless network system 1 of the communication network switch device 3 practices the Bluetooth wireless system and the short-range wireless network system 2 thereof practices the 802.11 wireless local area network system.

B. The short-range wireless network system 1 of the mobile communication device 1 practices the Bluetooth wireless system and the short-range wireless network system 2 practices the 802.11 wireless local area network system.

Figures 1, 19A:
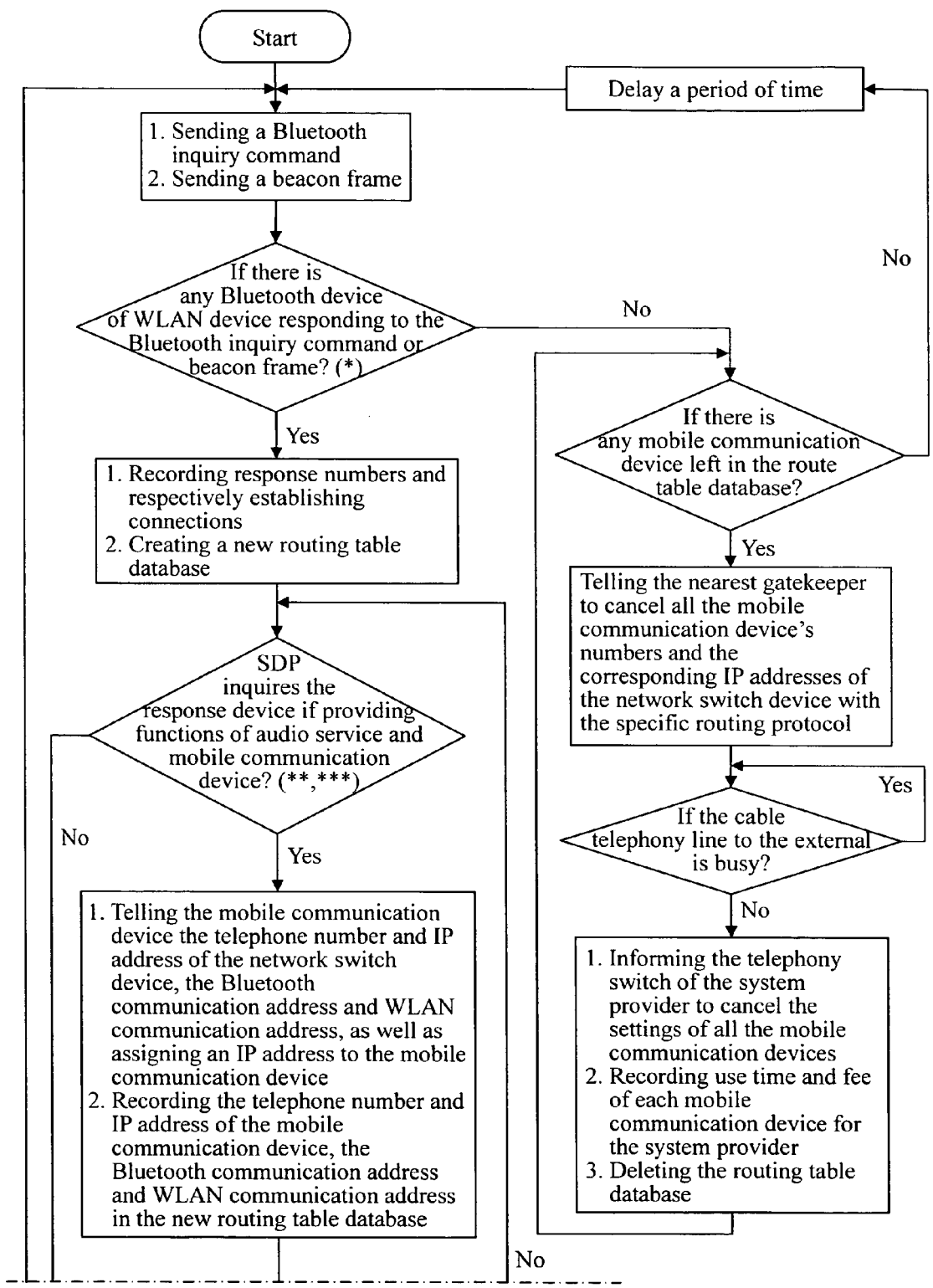
FIG. 19A and FIG. 19B illustrate a flow chart showing a method that the communication network switch device, using the Bluetooth wireless system and 802.11 wireless local area network system realize the short-range wireless network system, actively monitors the activity status of the mobile communication device in the power range of FIG. 4.
Figures 2, 19A:
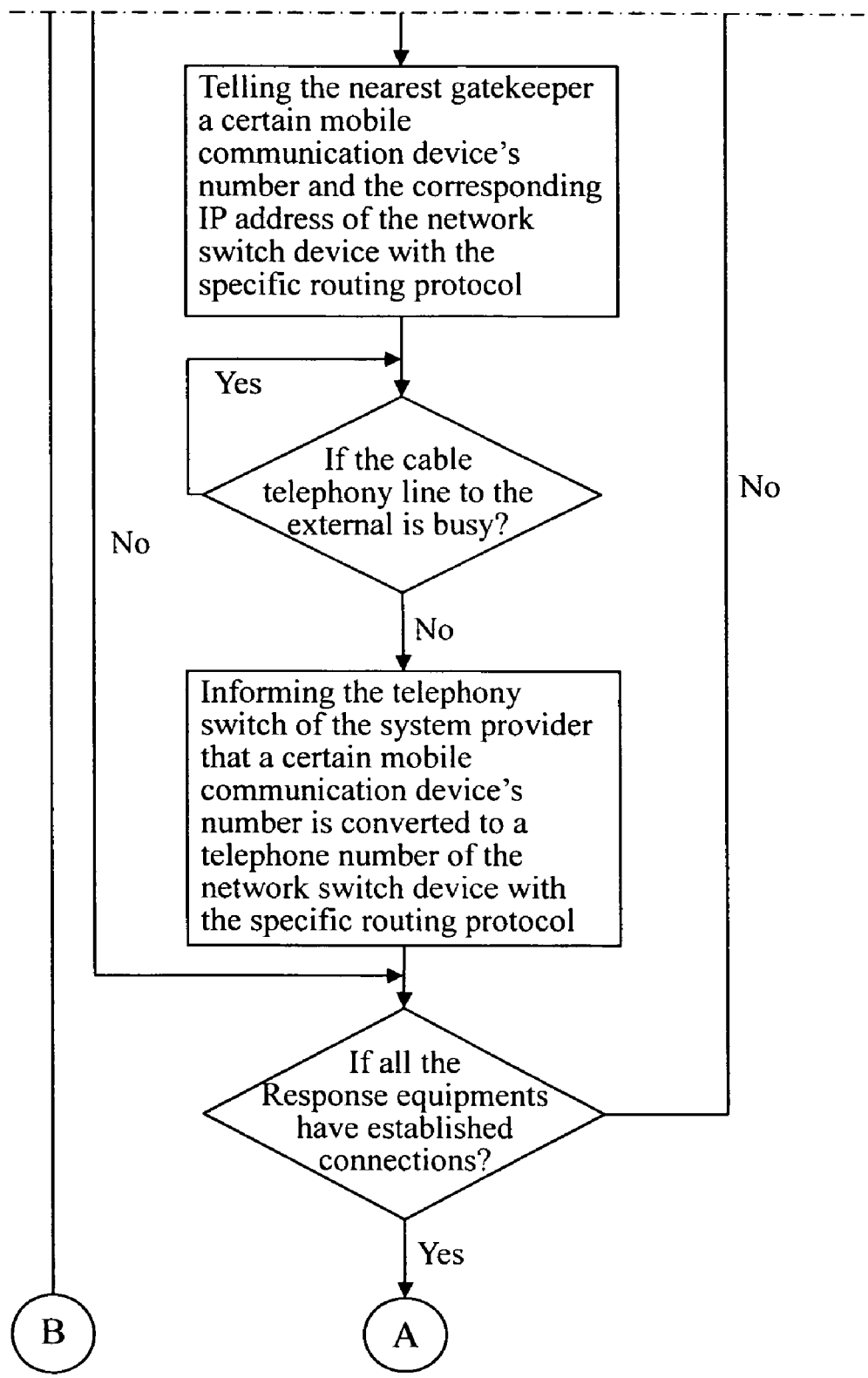
Figure 19B:
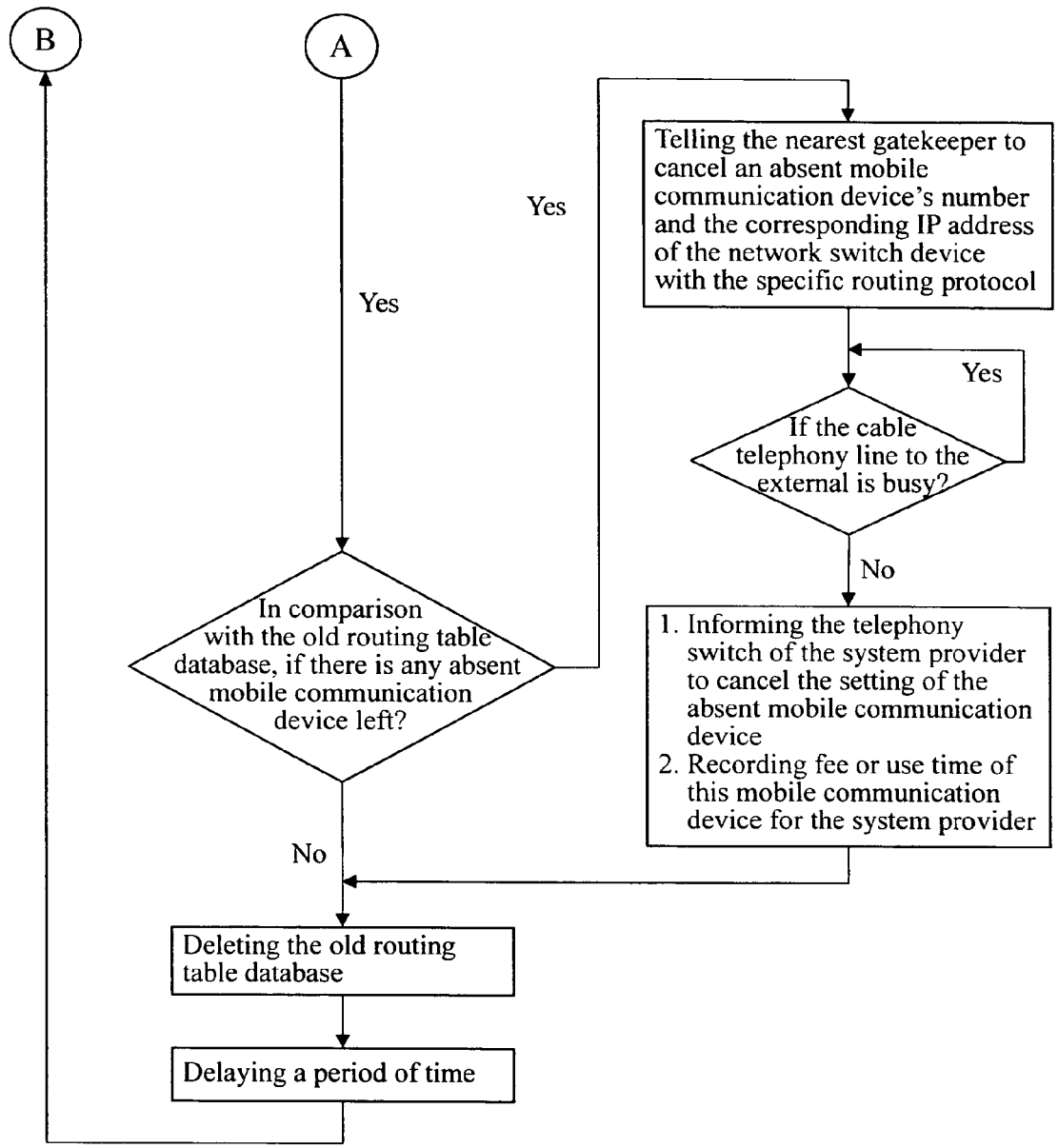

Referring to FIG. 19A and FIG. 19B, illustrate a flow chart showing a method that the communication network switch device, using the Bluetooth wireless network system and the 802.11 wireless local area network system to practice the short-range wireless network systems, actively monitors the activity status of the mobile communication device in the power range. Please also refer to FIG. 1, FIG. 2 and FIG. 4.

1. Referring to FIG. 2, when the communication network switch device 3 starts, the transceiver of the Bluetooth wireless system of the module block 61 and the transceiver of the 802.11 wireless local area network system of the module block 62 send a sequence of initialization commands to execute the initialization action such that the module block 61 and the module block 62 are in standby state. Then, the switch module of the module block 65 through route 89 and line 13 by using the specific routing protocol to tell the nearest gatekeeper the phone number and IP address of the communication network switch device 3, and storing in the phone number database 21 of the gatekeeper 21. At the same time, under the circumstance that line 8 is not busy, the module block 65 through route 88 and line 8 by using message or the specific routing protocol to tell the nearest telephony switch of the system provider the phone number and IP address of the communication network switch device 3, and storing in the phone number database 21 of the telephony switch.

2. Referring to FIG. 1, FIG. 2 and FIG. 19A, the module block 61 and module block 62 of the communication network switch device 3 first time send a Bluetooth inquiry command and beacon frame to monitor Bluetooth devices or 802.11 wireless local area network devices present in the power range through the short-range wireless network system 2, and through SDP (Service Discovery Protocol) to filter the number of the mobile communication devices 1 with audio service, and telling the mobile communication device 1 the information of the communication network switch device 3 (including the phone number, IP address and communication addresses of the Bluetooth wireless system and the 802.11 wireless local area network system of the communication network switch device 3), and assigning an IP address to the mobile communication device 1. As such, the mobile communication device 1 can writes the information obtained in the new routing table database.

3. Referring to FIG. 2 and FIG. 19A, the module block 61 and module block 62 of the communication network switch device 3 through route 83 and route 84 to inform the module block 63 to establish a new routing table database, and sequentially writing the information of the mobile communication device 1 (including the phone number, communication addresses of the Bluetooth wireless system and the 802.11 wireless local area network system and the IP address of the mobile communication device 1) in the new routing table database.

4. Referring to FIG. 1 and FIG. 19A, the communication network switch device 3 uses the specific routing protocol through line 13 to tell the nearest gatekeeper the phone numbers of all the mobile communication devices 1 and their IP addresses corresponding to the communication network switch device 3 in the power of the communication network switch device 3, and storing in the phone number database 21 of the gatekeeper.

5. Referring to FIG. 1 and FIG. 19A, when the cable telephony line 8 to the external of the communication network switch device 3 is not busy, using message or the specific routing protocol through line 8 to tell the nearest telephony switch of the system provider the related information of all the mobile communication device (including the phone number of the communication network switch device 3 and the phone number of the mobile communication device 1), and storing in the phone number database 21 of the telephony switch.

6. Referring to FIG. 1 and FIG. 19B, comparing the old and new routing table database, and filtering the number of the mobile communication devices 1 absent in the power range of the communication network switch device 3. Using the specific protocol to tell the nearest gatekeeper to cancel the related information of all the mobile communication devices 1 absent in the power range of the communication network switch device 3. When the cable telephony line 8 to the external of the communication network switch device 3 is not busy, using message or the specific routing protocol through line 8 to tell the nearest telephony switch of the system provider to cancel the related information of the mobile communication devices 1 absent in the power range of the communication network switch device 3, and recording the use time and charged fee of the mobile communication device 1, and deleting the content of the old routing table database.

7. Referring to FIG. 1 and FIG. 19, if the communication network switch device 3 monitors there is no any mobile communication device 1 present in the power range, it would use the specific routing protocol through line 13 to tell the nearest gatekeeper to cancel the related information of all the mobile communication devices 1 in the power range of the communication network switch device 3. When the cable telephony line 8 to the external of the communication network switch device 3 is not busy, using message or the specific routing protocol through line 8 to tell the nearest telephony switch of the system provider to delete the settings of all the mobile communication devices 1, sequentially telling the system provider the use time and charged fee of each mobile communication device 1, and deleting the content of the routing table database.

8. Referring to FIG. 2 and FIG. 19A, since the communication network switch device 3 actively monitors the activity status of the mobile communication device 1 in the power range, the module block 61 and module block 62 of the communication network switch device 3 constantly or non-constantly send a Bluetooth inquiry command and a beacon frame to ascertain that the activity status of the mobile communication device 1 in the power range.

9. In FIG. 19A, when the 802.11 wireless local area network system of the mobile communication device receives beacon frames from different switches, it is required to send a specific command to tell the communication network switch device 3 the 802.11 wireless local area network system of the mobile communication device is usable.

10. In FIG. 19A, under the circumstance with a multitude of communication network switches 3, it is necessary to prevent the communication network switch device 3 from being regarded as the mobile communication device 1 of the other communication network switch device 3.

11. In FIG. 19A, SDP also needs to perform an inquiry action through the 802.11 wireless local area network system to ascertain that the 802.11 wireless local area network system is the mobile communication device 1 of the communication network switch device 3.

Figure 20:
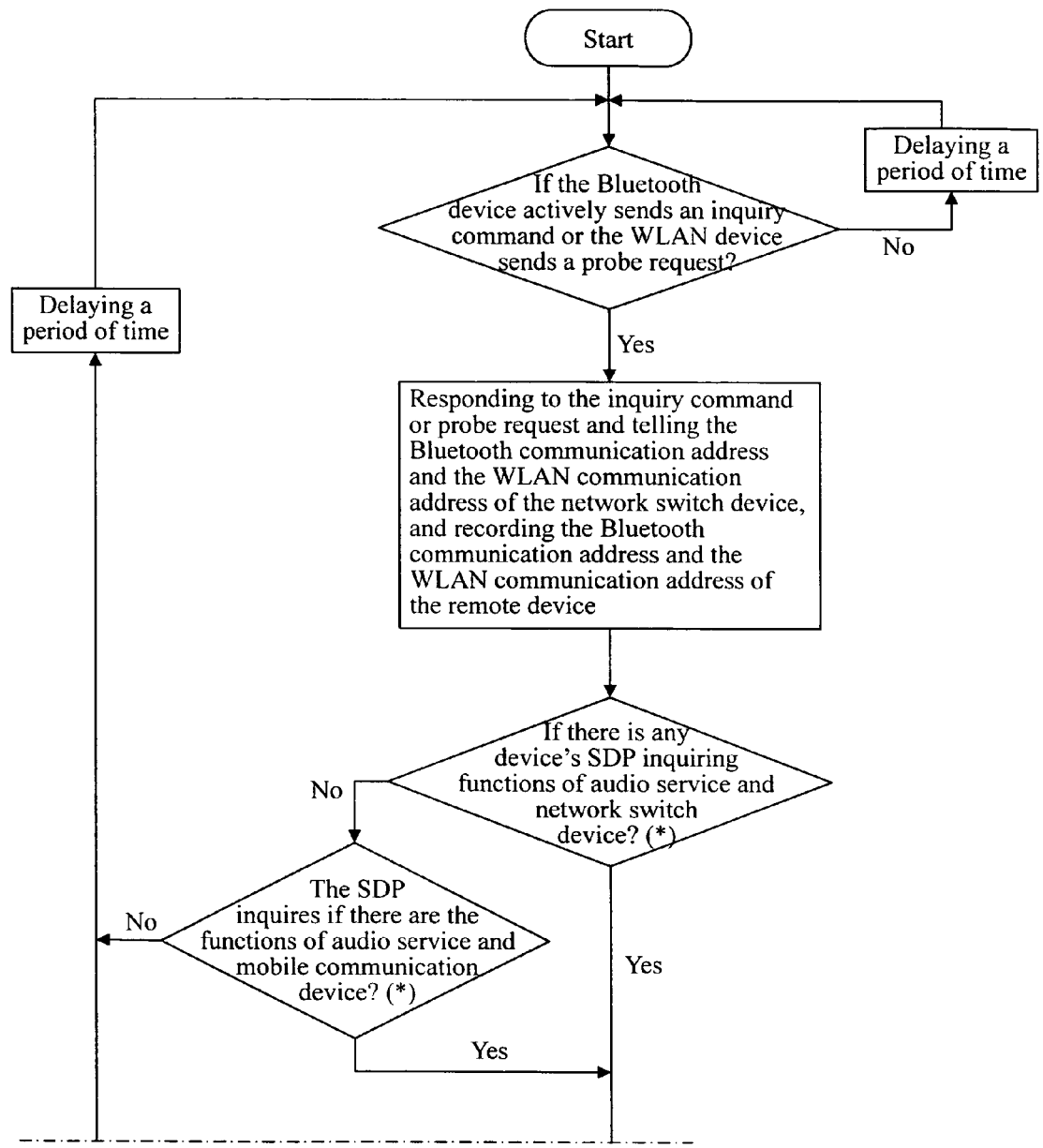
FIG. 20 illustrates a flow chart showing a method that the communication network switch device, using the Bluetooth wireless system and 802.11 wireless local area network system realize the short-range wireless network system, passively monitors the mobile communication device in the power range of FIG. 4.
Figures 1, 20:
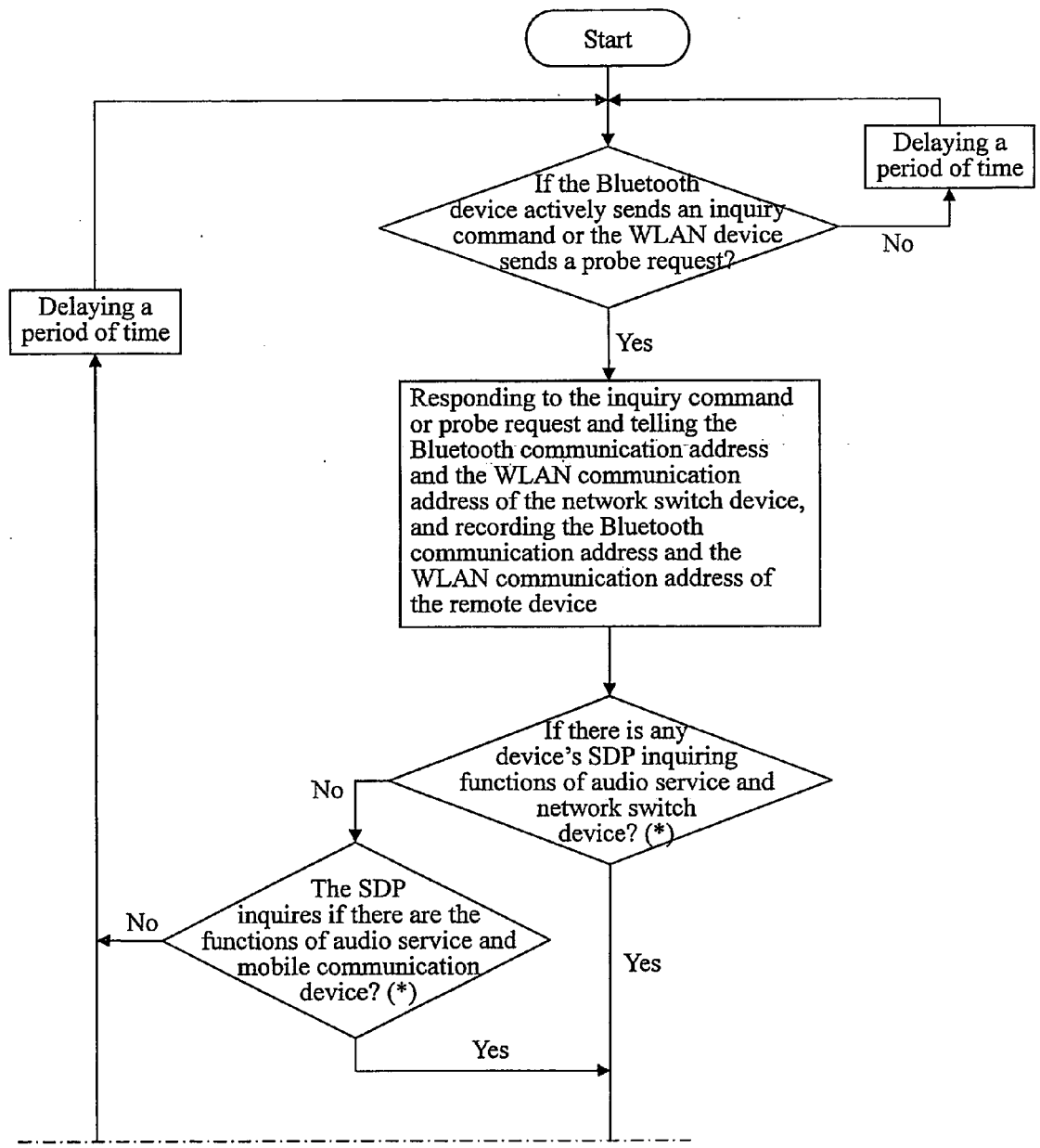
Figures 2, 20:
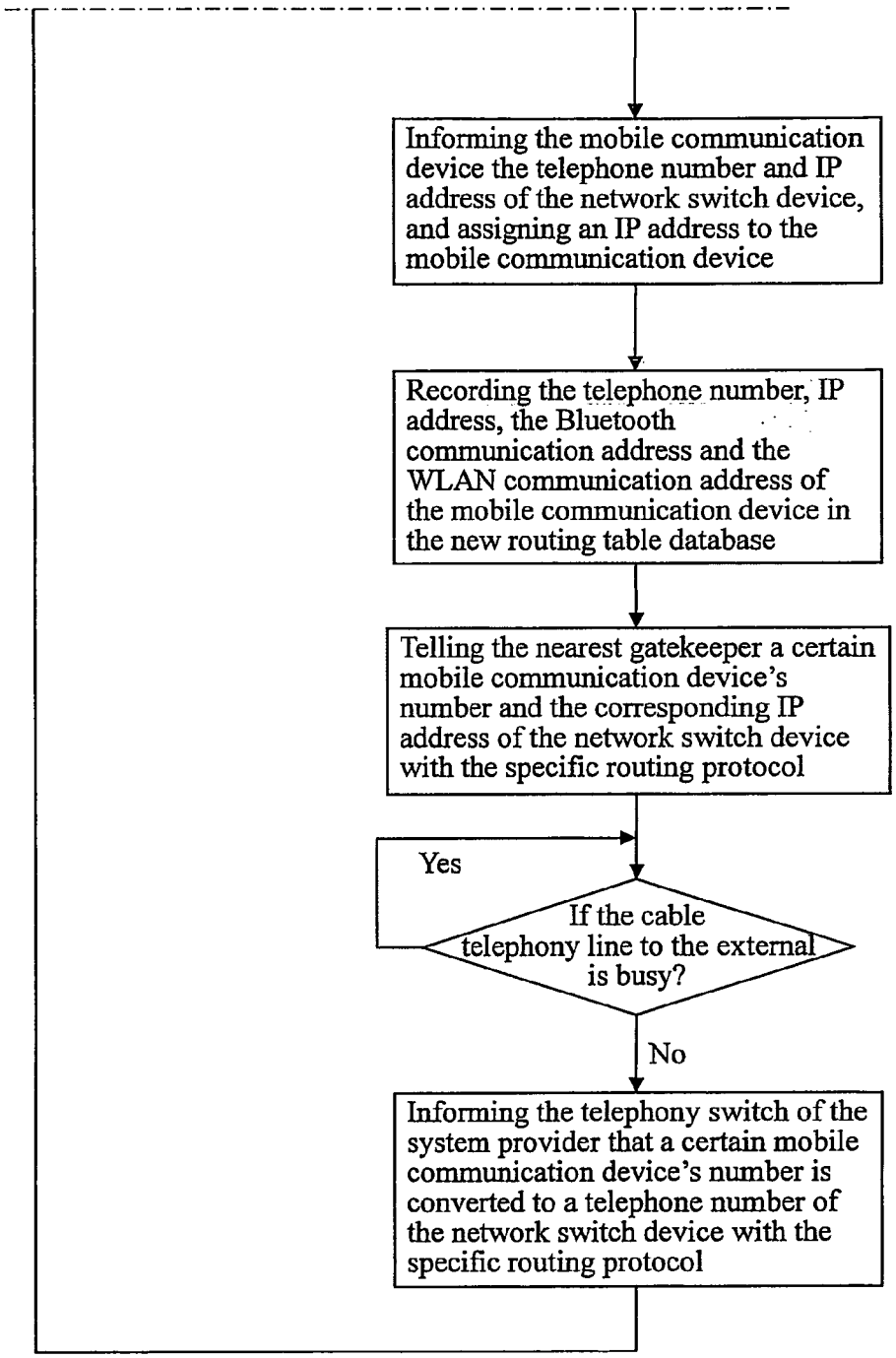

FIG. 20 illustrates a flow chart showing a method that the communication network switch device, using the Bluetooth wireless system and the 802.11 wireless local area network system to realize the short-range wireless network system, passively monitors the activity status of the mobile communication device. Please also refer to FIG. 1 and FIG. 4.

1. Referring to FIG. 1 and FIG. 20, when the communication network switch device 3 receives an inquiry command actively sent by the Bluetooth device or a probe request from the 802.11 wireless local area network device, at first responding to the inquiry command or the probe request, and then telling the Bluetooth communication address of the switch and the communication address of the 802.11 wireless local area network system, and recording the communication address of the Bluetooth device and the communication address of the 802.11 wireless local area network device.

2. Referring to FIG. 1 and FIG. 20, the communication network switch device 3 through SDP (Service Discovery Protocol) to filter the mobile communication device 1 with audio service, and telling the mobile communication device 1 the phone number, IP address, communication addresses of the Bluetooth wireless system and the 802.11 wireless local area network system of the communication network switch device 3 and assigning an IP address for the mobile communication device 1.

3. Referring to FIG. 1 and FIG. 20, the communication network switch device 3 records the phone number, communication addresses of the Bluetooth system and the 802.11 wireless local area network system of the mobile communication device 1 and its assigned IP address in the new routing table database of the communication network switch device 3.

4. Referring to FIG. 1 and FIG. 20, the communication network switch device 3 uses the specific routing protocol through line 13 to tell the nearest gatekeeper the phone numbers of new added mobile communication devices 1 in the power range of the communication network switch device 3 and their IP addresses corresponding to the communication network switch device 3.

5. Referring to FIG. 1 and FIG. 20, when the cable telephony line 8 to the external of the communication network switch device 3 is not busy, using message or the specific routing protocol through line 8 to tell the nearest telephony switch of the system provider the related information of new added mobile communication device (including the phone number of the communication network switch device 3 and the phone number of the mobile communication device 1) in the power range of the communication network switch device 3.

6. In FIG. 20, SDP also needs to perform an inquiry action through the 802.11 wireless local area network system to ascertain that the 802.11 wireless local area network system of the party is the mobile communication device 1 of the communication network switch device 3.

In the aspect of the communication network switch device, the preferred embodiment uses the drawings of FIG. 19 and FIG. 20 to describe the differences with the universal-architecture communication network switch device. However, during the process for communicating with the mobile communication device, whose flow charts and data flows are substantially similar to FIG. 8 through FIG. 12. The differences are as follows:

A. When the communication network switch device uses the cable telephony network system as the communication medium, the Bluetooth wireless system is firstly selected as the short-range wireless network system for the communication between the communication network switch device and the mobile communication device. The communication network switch device and the mobile communication device have to follow the communication protocols of the Bluetooth wireless system and the cable telephony network system to accomplish the communication purpose.

B. When the communication switch device uses the internet system as the communication medium, the 802.11 wireless local area network system is firstly selected as the short-range wireless network system for the communication between the communication network switch device and the mobile communication device. The communication network switch device and the mobile communication device have to follow the communication protocols of the 802.11 wireless local area network system and the internet telephony system (for example H.323 and SIP) to accomplish the communication purpose.

Figure 21:
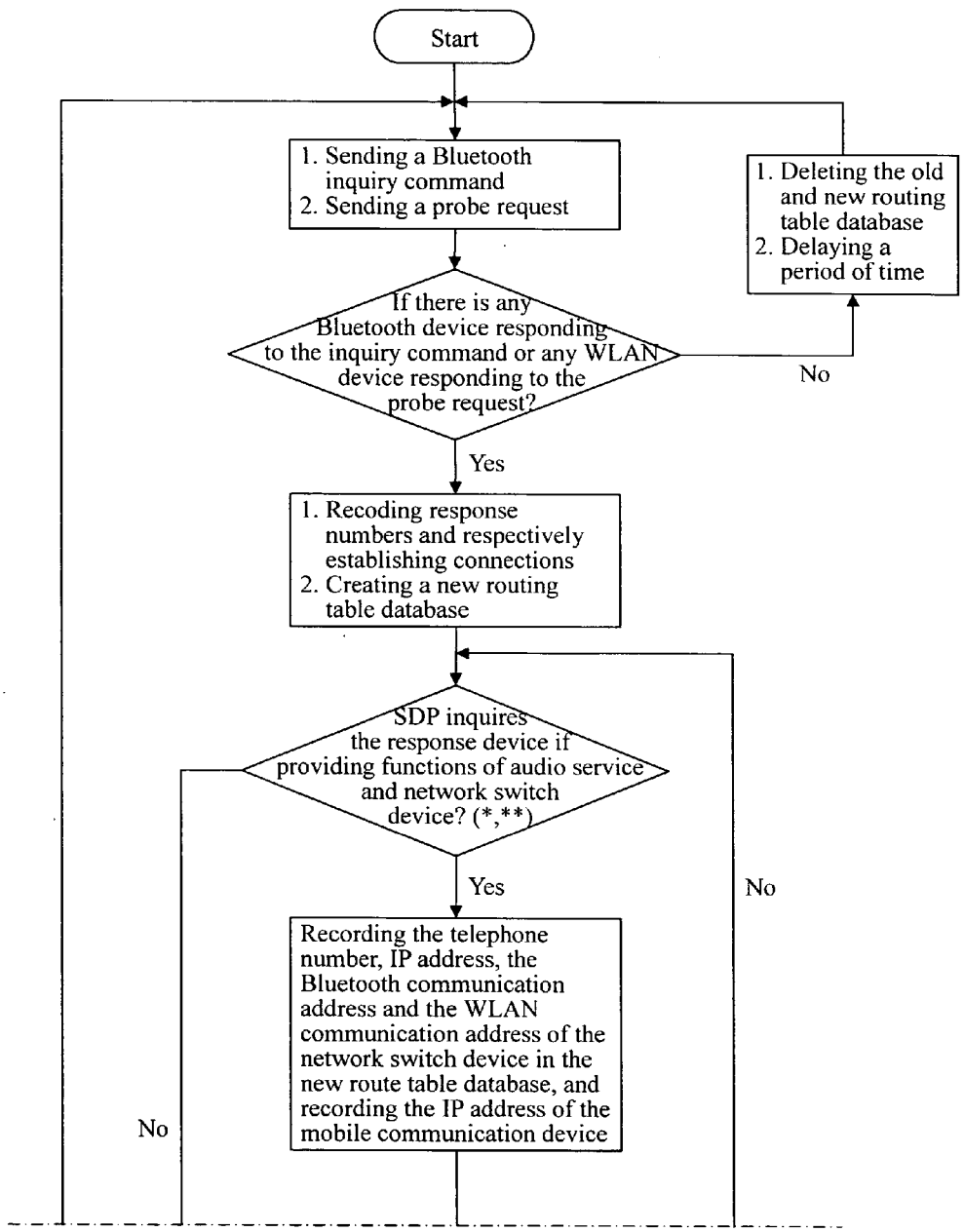
FIG. 21 illustrates a flow chart showing a method that the mobile communication device, using the Bluetooth wireless system and 802.11 wireless local area network system to realize the short-range wireless network system, actively monitors the activity status of the communication network switch device of FIG. 5.
Figure 21:
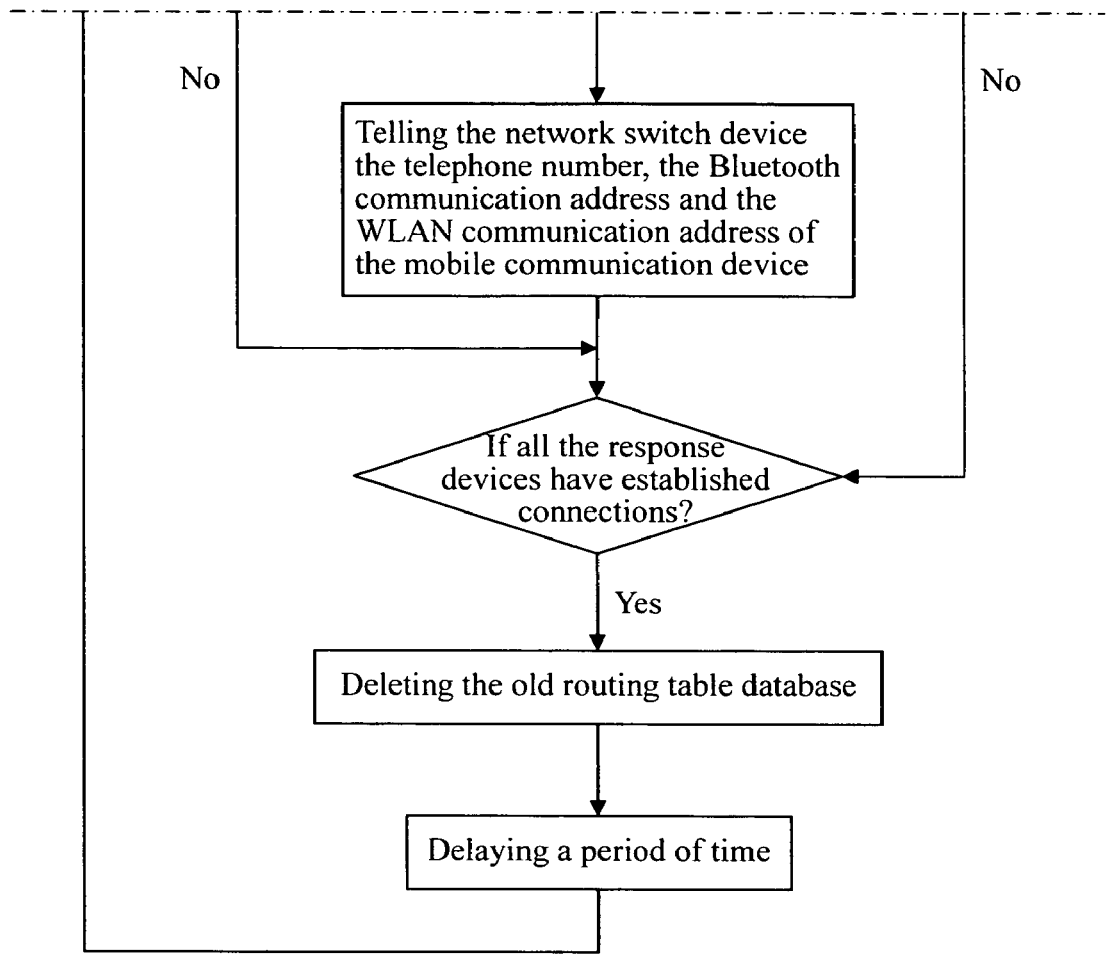

FIG. 21 illustrates a flow chart showing a method that the mobile communication device, using the Bluetooth wireless system and the 802.11 wireless local area network system to realize the short-range wireless network systems, actively monitors the activity status of the communication network switch device in the power range. Please also refer to FIG. 1, FIG. 3 and FIG. 5.

1. Referring to FIG. 3, when the mobile communication device 1 starts, the transceiver module of the long-range wireless network system of the module block 104, the transceiver module of the Bluetooth wireless system of the module block 105 and the transceiver module of the 802.11 wireless local area network system of the module block 106 would send a sequence of initialization commands to execute the initialization action such that the module block 104, module block 105 and the module block 106 are in standby state. The operations of the Bluetooth wireless system and the 802.11 wireless local area network system are described herein, and however the operation of the long-range network system is neglected. Since the operation of the long-range wireless network system is accomplished by its own communication protocol, which is not an important issue of this invention. Therefore, there is no more description about it.

2. Referring to FIG. 1, FIG. 3 and FIG. 21, the module block 105 and the module block 106 of the mobile communication device 1 would first time send a Bluetooth inquiry command and a probe request through the short-range wireless network system 2 to monitor the Bluetooth devices or the 802.11 wireless local area network devices present in the power range, and through SDP (Service Discovery Protocol)

to filter the number of the communication network switch devices 3 with audio service to establish a new routing table database, and sequentially writing the information of the communication network switch devices 3 (including the phone number, IP address and communication addresses of the Bluetooth wireless system and the 802.11 wireless local area network system of the communication network switch device 3) in the new routing table database, and recording the assigned IP address of the mobile communication device 1.

3. Referring to FIG. 3 and FIG. 21, the switch module of the module block 102 of the mobile communication device 1 tells the communication network switch device 3 the information of the mobile communication device 1 (including the phone number and communication addresses of the Bluetooth wireless system and the 802.11 wireless local area network system of the mobile communication device 1) such that the communication network switch device 3 writes the information obtained in its new routing table database.

4. Referring to FIG. 3 and FIG. 21, the module block 102 of the mobile communication device 1 deletes the old routing table database.

5. Referring to FIG. 3 and FIG. 21, the module block 102 of the mobile communication device 1 monitors there is no any communication network switch device 3 present in the power range, and deleting the content of the routing table database.

6. Referring to FIG. 3 and FIG. 21, since the mobile communication device 1 actively monitors the activity status of the communication network switch device 3 in the power range, the module block 105 and module block 106 of the mobile communication device 1 would constantly or non-constantly send a Bluetooth inquiry command and a probe request to ascertain that the activity status of the communication network switch device 3 in the power range.

7. In FIG. 21, SDP also needs to perform an inquiry action through the 802.11 wireless local area network system to ascertain that the 802.11 wireless local area network system of the party is the communication network switch device 3 of the mobile communication device 1.

8. In FIG. 21, under the circumstance with a multitude of mobile communication devices, it is necessary to prevent the mobile communication device from being regarded as the communication network switch device 3 of the other mobile communication device 1.

Figure 22:
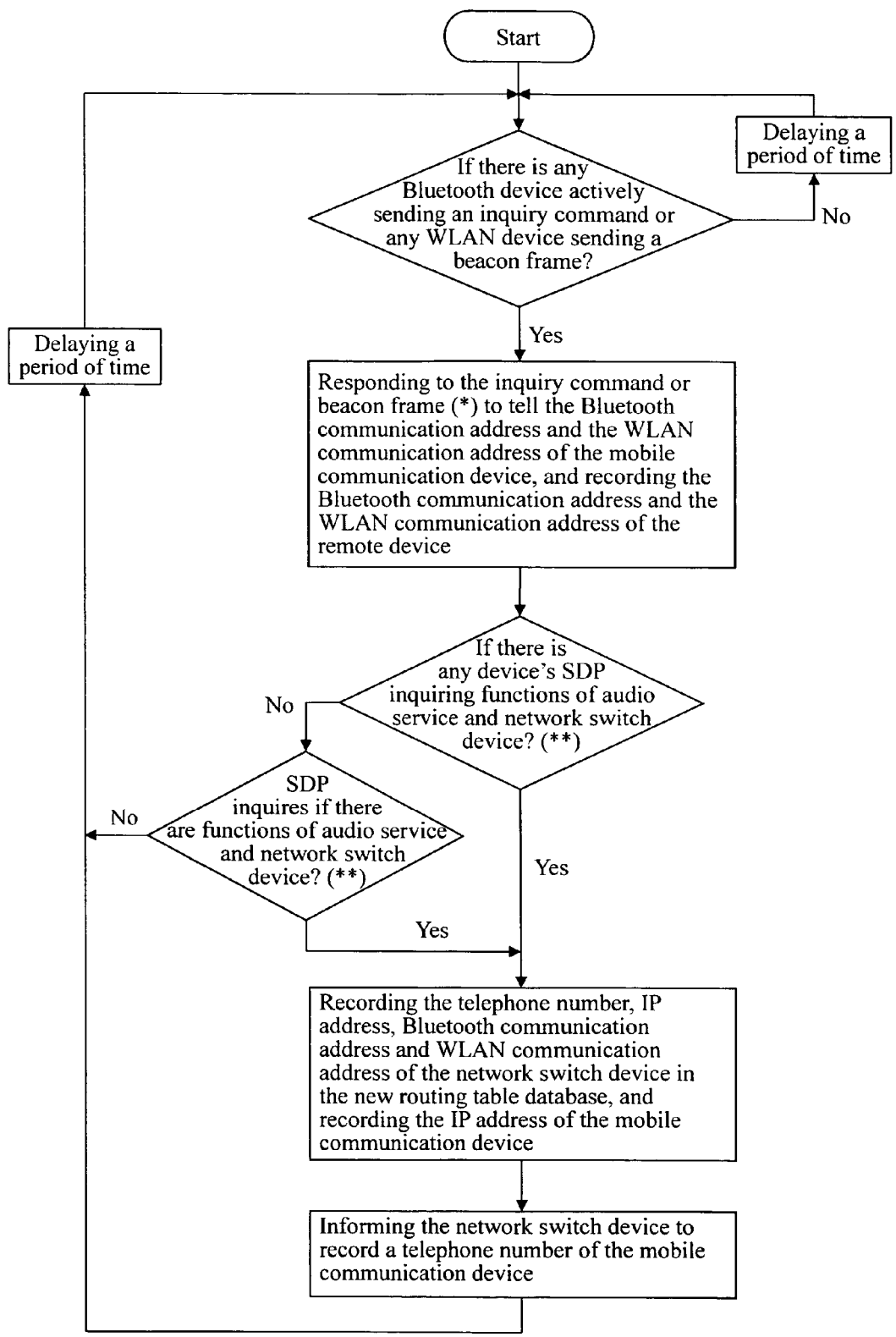
FIG. 22 illustrates a flow chart showing a method that the mobile communication device, using the Bluetooth wireless system and 802.11 wireless local area network system to realize the short-range wireless network system, actively monitors the activity status of the communication network switch device of FIG. 5.

FIG. 22 illustrates a flow chart showing a method that the mobile communication device, using the Bluetooth wireless system and the 802.11 wireless local area network system to realize the short-range wireless network systems, passively monitors the activity status of the communication network switch device in the power range. Please also refer to FIG. 1, FIG. 3 and FIG. 5.

1. Referring to FIG. 1, FIG. 3 and FIG. 22, when the module block 102 of the mobile communication device 1 receives the inquiry command actively sent by the Bluetooth device or the beacon frame of the 802.11 wireless local area network device, firstly responding to the inquiry command or the beacon frame, and then telling the Bluetooth communication address and the 802.11 wireless local area network communication address, and recording the communication address of the Bluetooth device and the communication address of the 802.11 wireless local area network device.

2. Referring to FIG. 1, FIG. 3 and FIG. 22, through SDP (Service Discovery Protocol) to filter the communication network switch device 3 with audio service, and telling the mobile communication device 1, recording the phone number, IP address and communication addresses of the Bluetooth wireless system and the 802.11 wireless local area network system of the communication network switch device 3 and the assigned IP address of the mobile communication device 1.

3. Referring to FIG. 1, FIG. 3 and FIG. 22, responding to the communication network switch device 3 to tell the phone number and communication addresses of the Bluetooth wireless system and the 802.11 wireless local area network system of the mobile communication device 1.

4. In FIG. 22, when the 802.11 wireless local area network system of the mobile communication device receives beacon frames from different switches, it is required to send a specific command to tell the communication network switch device the 802.11 wireless local area network system is usable.

5. In FIG. 22, SDP also needs to perform an inquiry action through the 802.11 wireless local area network system to ascertain that the 802.11 wireless local area network system of the party is the communication network switch device 3 of the mobile communication device 1.

In the aspect of the mobile communication device, the preferred embodiment uses FIG. 21 and FIG. 22 to describe the differences with the universal-architecture mobile communication device. During the process for communicating with the communication network switch device, whose flow charts and data flows are substantially similar to FIG. 15 through FIG. 18. The differences are as follows:

A. When the communication network switch device uses the cable telephony network system as communication medium, the Bluetooth wireless system is firstly selected as the short-range wireless network system for communication between the communication network switch device and the mobile communication device. The communication network switch device and the mobile communication device have to follow the communication protocols of the Bluetooth wireless system and the cable telephony network system to accomplish the communication.

B. When the communication network switch device uses the internet system as communication medium, the 802.11 wireless local area network system is firstly selected as the short-range wireless network system for communication between the communication network switch device and the mobile communication device. The communication network switch device and the mobile communication device have to follow the communication protocols of the 802.11 wireless local area network system and the intent telephony system (for example H.323 and SIP) to accomplish the communication.

Although the present invention has been described in considerable detail with reference to certain preferred embodiments thereof, those skilled in the art can easily understand that all kinds of alterations and changes can be made within the spirit and scope of the appended claims. Therefore, the spirit and scope of the appended claims should not be limited to the description of the preferred embodiments contained herein.

What is claimed is:

1. A communication network switch system, comprising:
   a phone number database accessed by a cable telephony network service provider;
   a plurality of communication network switch devices, said communication network switch devices conducting audio and/or data communications therebetween through a cable telephony network, said communication network switch device switching audio and/or data communications between said cable telephony network and a short-range wireless communication network; and
   a plurality of mobile communication devices, said mobile communication device including a long-range wireless network system transceiver module for transmitting/receiving audio and/or data information of a long-range wireless communication network in accordance with a long-range wireless network protocol; a short-range wireless network system transceiver module for transmitting/receiving audio and/or data information of said short-range wireless communication network in accordance with a short-range wireless network protocol; and a mobile communication device switch module for determining if audio and/or data information of said mobile communication device is transmitted by said short-range wireless network system transceiver module;

wherein said communication network switch device includes a short-range wireless communication network transceiver module establishing wireless connection with said mobile communication device in accordance with said short-range wireless network protocol, and transmitting/receiving audio and/or data information of said short-range wireless communication network by the wireless connection; a cable communication network transceiver module transmitting/receiving audio and/or data information of said cable telephony network in accordance with a specific communication protocol; and a communication network switch module providing audio and/or data information of said short-range wireless communication network to said cable telephony network transceiver module so as to transmit to said cable telephony network, or providing audio and/or data information of said cable telephony network to said short-range wireless communication network transceiver so as to send to said mobile communication device;

wherein said switch module of said communication network switch device stores a communication number of said mobile communication device in said long-range wireless communication network and an assigned phone number representing said communication network switch module of said communication network switch device in said cable telephony network in said phone number database.

2. The communication network switch system of claim 1, wherein said communication network switch device includes a routing table database module for recording a communication address of said mobile communication device in said short-range wireless communication network and a communication number of said mobile communication device in said long-range wireless communication network.

3. The communication network switch system of claim 2, wherein said switch module of said communication network switch device in accordance with said routing table database module provides audio and/or data information of said cable telephony network to said short-range wireless communication network transceiver module so as to send to said mobile communication device.

4. The communication network switch system of claim 1, wherein said mobile communication device includes a routing table database module for recording a communication number of said cable telephony network system and a communication address of said short-range wireless network system within a power range of said short-range wireless network system.

5. The communication network switch system of claim 1, wherein said switch module of said mobile communication device provides three-way call service or inserting call service among said cable telephony network system, said short-range wireless network system and said long-range wireless network system.

6. The communication network switch system of claim 1, wherein said switch module of said communication network switch device provides three-way call service or inserting call service between said cable telephony network system and said short-range wireless network system.

7. A communication network switch system, comprising:
a phone number database accessed by an internet service provider;
a plurality of communication network switch device, said communication network switch device conducting audio and/or data communications therebetween through an internet, said communication network switch device switching audio and/or data information between an internet telephony system and a short-range wireless communication network; and
a plurality of mobile communication devices each of which including a long-range wireless network system transceiver module for transmitting/receiving audio and/or data information of a long-range wireless communication network in accordance with a long-range wireless network protocol; a short-range wireless network system transceiver module for transmitting/receiving audio and/or data information of said short-range wireless communication network in accordance with a short-range wireless network protocol; and a mobile communication device switch module for determining if audio and/or data information of said mobile communication device is transmitted by said short-range wireless network system transceiver module;

wherein said communication network switch device includes a short-range wireless communication network transceiver module for establishing wireless connection with said mobile communication device in accordance with said short-range wireless network protocol, and transmitting/receiving audio and/or data information of said short-range wireless communication network; an internet telephony system drive module for transmitting/receiving audio and/or data information of said internet telephony system; and a communication network switch module for providing audio and/or data information of said short-range wireless communication network to said internet telephony system drive module so as to transmit to said internet telephony system or providing audio and/or data information of said internet telephony system to said short-range wireless communication network transceiver module so as to send to said mobile communication device;

wherein said switch module of said communication network switch device stores a communication number of said mobile communication device in said long-range communication network and an IP address representing said communication network switch module of said communication network switch device in said phone number database.

8. The communication network switch system of claim 7, wherein said communication network switch device includes a routing table database module for recording a communication address of said mobile communication device in said shod-range wireless communication network and a communication number of said mobile communication device in said long-range wireless communication network and an IP address of said mobile communication device in said internet telephony system.

9. The communication network switch system of claim 7, wherein said switch module of said communication network switch device in accordance with said routing table database module provides audio and/or data information of said internet telephony system to said short-range wireless communication network transceiver so as to send to said mobile communication device.

10. The communication network switch system of claim 7, wherein said mobile communication device includes a routing table database for recording an IP address of said internet telephony system and a communication address of said shod-range wireless network system within a power range of said short-range wireless network system.

11. The communication network switch system of claim 7, wherein said switch module of said mobile communication device provides three-way call service or inserting call service an-long said internet telephony system, said shod-range wireless network system and said long-range wireless network.

12. The communication network switch system of claim 7, wherein said switch module of said communication network switch device provides three-way call service or inserting call service between said cable telephony network system and said short-range wireless network system.

13. A communication network switch system, comprising:
- a first phone number database accessed by a cable telephony network service provider;
- a second phone number database accessed by an internet service provider;
- a plurality of communication network switch devices, said communication network switch devices conducting audio and/or data communications therebetween through a cable telephony network or internet, said communication network switch device switching audio and/or data communications between said cable telephony network or an internet telephony system and a short-range wireless communication network; and
- a plurality of mobile communication devices each of which including a long-range wireless network system transceiver module for transmitting/receiving audio and/or data information of a long-range wireless communication network in accordance with a long-range wireless network protocol; a short-range wireless network system transceiver module for transmitting/receiving audio and/or data information of a short-range wireless communication network in accordance with a short-range wireless network protocol; and a switch module for determining if audio and/or data information of said mobile communication device is transmitted by said short-range wireless network system transceiver module;
- wherein said communication switch device includes a short-range wireless communication network transceiver module establishing wireless connection with said mobile communication device in accordance with said short-range wireless network protocol, and transmitting/receiving audio and/or data information by the wireless connection; a cable telephony network transceiver module for transmitting/receiving audio and/or data information of said cable telephony network in accordance with a first communication protocol; an internet telephony system drive module for transmitting/receiving audio and/or data information in accordance with a second communication protocol; a first switch module for providing audio and/or data information of said short-range wireless communication network to said cable telephony network transceiver module so as to transmit to said cable telephony network, or providing audio and/or data information of said cable telephony network to said short-range wireless communication network transceiver module so as to send to said mobile communication device; and a second switch module for providing audio and/or data information of said short-range wireless communication network to said internet telephony system drive module so as to transmit to said internet telephony system, or providing audio and/or data information of said internet telephony system to said short-range wireless communication network transceiver module so as to send to said mobile communication device;
- wherein said first switch module of said communication network switch device stores a communication number of said mobile communication device in said long-range wireless communication network and a phone number representing said first switch module in said cable telephony network in said first phone number database;
- wherein said second switch module of said communication network switch device stores said communication number of said mobile communication device in said long-range wireless communication network and an IP address representing said second switch module in said second phone number database.

14. The communication network switch system of claim 13, wherein said communication network switch device includes a routing table database module for recording an IP address of said mobile communication device in said internet telephony system, a communication address of said mobile communication device in said short-range wireless communication network and said communication number of said mobile communication device in said long-range wireless communication network.

15. The communication network switch system of claim 13, wherein said first switch module of said communication network switch device in accordance with said routing table database module provides audio and/or data information of said cable telephony network to said shod-range wireless communication network transceiver module so as to send to said mobile communication device.

16. The communication network switch system of claim 13, wherein said mobile communication device includes a routing table database module for recording an P address of said internet telephony system, a communication number of said cable telephony network system and a communication address of said short-range wireless network system within a power range of said short-range wireless network system.

17. The communication network switch system of claim 13, wherein each of said communication network switch devices connects to at least one cable network area system or at least one internet system respectively through different routes, and said systems communicate with each other in accordance with said short-range wireless network protocol.

18. The communication network switch system of claim 13, wherein said long-range wireless network protocol of said mobile communication device is selected from a group consisting of GSM, CDMA and 3G communication protocols.

19. The communication network switch system of claim 13, wherein said short-range wireless network protocol is a Bluetooth wireless communication protocol.

20. The communication network switch system of claim 13, wherein said short-range wireless network communication protocol is a 802.11 wireless local area communication protocol.

* * * * *